United States Patent
Jin et al.

(10) Patent No.: US 12,114,219 B2
(45) Date of Patent: *Oct. 8, 2024

(54) METHOD FOR MOVING BETWEEN COMMUNICATIONS SYSTEMS AND APPARATUS

(71) Applicant: Huawei Technologies Co., Ltd., Shenzhen (CN)

(72) Inventors: Hui Jin, Beijing (CN); Fenghui Dou, Beijing (CN); Haorui Yang, Shenzhen (CN); Yue He, Shenzhen (CN); Guowei Ouyang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/328,825

(22) Filed: May 24, 2021

(65) Prior Publication Data

US 2021/0360501 A1    Nov. 18, 2021

Related U.S. Application Data

(63) Continuation of application No. 16/677,257, filed on Nov. 7, 2019, now Pat. No. 11,051,224, which is a
(Continued)

(30) Foreign Application Priority Data

May 8, 2017    (WO) ................ PCT/CN2017/083522

(51) Int. Cl.
*H04L 12/28*    (2006.01)
*H04W 28/02*    (2009.01)
(Continued)

(52) U.S. Cl.
CPC ....... *H04W 36/14* (2013.01); *H04W 28/0252* (2013.01); *H04W 28/0268* (2013.01); *H04W 36/0005* (2013.01); *H04W 76/10* (2018.02)

(58) Field of Classification Search
CPC .. H04L 43/026; H04L 47/24; H04M 15/8228; H04W 28/0252; H04W 28/0268;
(Continued)

(56) References Cited

U.S. PATENT DOCUMENTS 9,930,650 B2    3/2018    Jeong et al.
11,457,500 B2    9/2022    Jin et al.
(Continued)

FOREIGN PATENT DOCUMENTS

CN    101478743 A    7/2009
CN    101621788 A    1/2010
(Continued)

OTHER PUBLICATIONS

3GPP TS 23.502 V0.2.0 "3rd Generation Partnership Project; Technical Specification Group Services and System Aspects; Procedures for the 5G System;Stage 2; (Release 15)," Feb. 2017, 71 pages.
(Continued)

*Primary Examiner* — John Pezzlo
(74) *Attorney, Agent, or Firm* — Conley Rose, P.C.

(57) ABSTRACT

A method for moving between communications systems and an apparatus, where the method includes: receiving, by a user equipment (UE), a first message, where the first message is used to set up or modify a first evolved packet system (EPS) bearer for the UE in the first communications system, and the first message includes first quality of service (QoS) flow information that is of the second communications system and corresponds to the first EPS bearer; storing, by the UE, the first QoS flow information; moving, by the UE, from the first communications system to the second com-
(Continued)

munications system; and determining, by the UE based on a first condition, QoS flow information used by the UE in the second communications system, where the first condition includes the first QoS flow information.

21 Claims, 21 Drawing Sheets

Related U.S. Application Data continuation of application No. PCT/CN2017/088814, filed on Jun. 16, 2017.

(51) Int. Cl.
| | |
|---|---|
| *H04W 36/00* | (2009.01) |
| *H04W 36/14* | (2009.01) |
| *H04W 76/10* | (2018.01) |
| *H04J 1/16* | (2006.01) |

(58) Field of Classification Search
CPC ......... H04W 36/0005; H04W 36/0022; H04W 36/14; H04W 18/0252
USPC ........................................ 370/252, 329, 331
See application file for complete search history.

(56) References Cited

U.S. PATENT DOCUMENTS

| | | | |
|---|---|---|---|
| 2005/0157660 | A1 | 7/2005 | Mandato et al. |
| 2008/0025263 | A1 | 1/2008 | Pelkonen |
| 2009/0116384 | A1 | 5/2009 | Kim et al. |
| 2009/0129342 | A1 | 5/2009 | Hwang et al. |
| 2009/0232022 | A1* | 9/2009 | Savolainen ........... H04L 69/167 370/254 |
| 2010/0074109 | A1 | 3/2010 | Klingenbrunn et al. |
| 2010/0208698 | A1* | 8/2010 | Lu ........................ H04W 36/14 370/331 |
| 2010/0220665 | A1 | 9/2010 | Govindan et al. |
| 2011/0138066 | A1* | 6/2011 | Kopplin ............ H04W 28/0247 709/228 |
| 2013/0039244 | A1 | 2/2013 | Sun |
| 2014/0064124 | A1 | 3/2014 | Paladugu et al. |
| 2014/0335830 | A1 | 11/2014 | Wu |
| 2015/0289167 | A1 | 10/2015 | Alex et al. |
| 2015/0304953 | A1 | 10/2015 | Sun |
| 2015/0358180 | A1 | 12/2015 | Kamachi et al. |
| 2015/0365963 | A1 | 12/2015 | Won et al. |
| 2016/0142954 | A1* | 5/2016 | Cho ..................... H04W 36/36 370/331 |
| 2017/0156086 | A1 | 6/2017 | Tomici et al. |
| 2017/0251405 | A1 | 8/2017 | Stojanovski et al. |
| 2017/0289019 | A1 | 10/2017 | Faccin et al. |
| 2018/0192333 | A1 | 7/2018 | Wu |
| 2018/0192334 | A1 | 7/2018 | Wu |
| 2018/0242205 | A1 | 8/2018 | Mildh et al. |
| 2018/0310162 | A1 | 10/2018 | Kim et al. |
| 2019/0053045 | A1* | 2/2019 | Cho ..................... H04W 68/02 |
| 2019/0058997 | A1 | 2/2019 | Futaki et al. |
| 2019/0141515 | A1* | 5/2019 | Kim ..................... H04W 8/08 |
| 2019/0150219 | A1* | 5/2019 | Wang ................... H04W 76/30 370/329 |
| 2019/0191348 | A1 | 6/2019 | Futaki et al. |
| 2019/0261240 | A1 | 8/2019 | Fang et al. |
| 2019/0289646 | A1* | 9/2019 | Kim ..................... H04W 76/18 |
| 2019/0297541 | A1 | 9/2019 | Chandramouli et al. |
| 2019/0327642 | A1 | 10/2019 | Peng et al. |
| 2019/0335365 | A1 | 10/2019 | Ying et al. |
| 2019/0357093 | A1 | 11/2019 | Xu et al. |
| 2019/0357295 | A1* | 11/2019 | Kim ..................... H04W 76/25 |
| 2019/0387428 | A1* | 12/2019 | Ahmad ................. H04W 28/12 |
| 2020/0022031 | A1 | 1/2020 | Li et al. |
| 2020/0059525 | A1 | 2/2020 | Zhu et al. |
| 2020/0092780 | A1* | 3/2020 | Koshimizu ........... H04W 36/36 |
| 2020/0267753 | A1* | 8/2020 | Adjakple .......... H04W 72/1268 |
| 2020/0275331 | A1 | 8/2020 | Kim et al. |
| 2020/0383151 | A1* | 12/2020 | Wang ................... H04W 36/14 |
| 2021/0195490 | A1 | 6/2021 | Rommer et al. |
| 2021/0211960 | A1* | 7/2021 | Ryu .................. H04W 36/0011 |
| 2021/0289402 | A1 | 9/2021 | Ke et al. |
| 2023/0239745 | A1 | 7/2023 | Ke et al. |

FOREIGN PATENT DOCUMENTS

| | | |
|---|---|---|
| CN | 101640879 A | 2/2010 |
| CN | 102355744 A | 2/2012 |
| CN | 105992293 A | 10/2013 |
| CN | 103858454 A | 6/2014 |
| CN | 102883381 B | 12/2016 |
| CN | 106465080 A | 2/2017 |
| CN | 106576395 A | 4/2017 |
| CN | 108605259 A | 9/2018 |
| CN | 111247832 A | 6/2020 |
| CN | 108886722 B | 3/2021 |
| CN | 108886730 B | 3/2021 |
| CN | 108282832 B | 11/2021 |
| CN | 111165014 B | 6/2022 |
| EP | 2611085 A1 | 7/2013 |
| EP | 2190222 B1 | 8/2014 |
| EP | 2785106 B1 | 6/2017 |
| EP | 3563607 B1 | 5/2022 |
| EP | 3675557 B1 | 6/2022 |
| JP | 2005527133 A | 9/2005 |
| JP | 2012503447 A | 2/2012 |
| JP | 2014528194 A | 10/2014 |
| KR | 20090047092 A | 5/2009 |
| KR | 20150048618 A | 5/2015 |
| KR | 20170038897 A | 4/2017 |
| KR | 102366257 B1 | 2/2022 |
| WO | 2008154548 A1 | 12/2008 |
| WO | 2009087120 A1 | 7/2009 |
| WO | 2011011458 A9 | 1/2011 |
| WO | 2012103503 A1 | 8/2012 |
| WO | 2015160329 A1 | 10/2015 |
| WO | 2019024677 A1 | 2/2019 |
| WO | 2019071900 A1 | 4/2019 |
| WO | 2020155906 A1 | 8/2020 |

OTHER PUBLICATIONS

Huawei: "TS 23.502: Discussion about QoS parameter mapping from 5GS to EPS and how to allocate TFT," 3GPP Draft; SA WG2 Meeting #120, S2-172012, Mar. 27-31, 2017, 3 pages.
S2-170802, Ericsson, "[23.501] Cleanup of QoS framework description," SA WG2 Meeting #119, Feb. 13-17, 2017, Dubrovnik, Croatia, 8 pages.
S2-171013, Nokia, "TS 23.502: P-CR for Single Registration-based Interworking from EPS to 5GS procedure," SA WG2 Meeting #119, Feb. 13-17, 2017, Dubrovnik, Croatia, 5 pages.
S2-171718, Qualcomm Incorporated, "TS 23.501: Eliminate terminology of A/B-type QoS Flows," SA WG2 Meeting #120, Busan, Korea, Mar. 27-31, 2017, 6 pages.
S2-171755, Ericsson, "23 501: Cleanup of QoS framework description," SA WG2 Meeting #120, Mar. 27-31, 2017, Busan, Korea, 12 pages.
S2-172050, Nokia, "TS 23.502: P-CR for Single Registration-based Interworking from EPS to 5GS procedure," SA WG2 Meeting #120, Mar. 27-31, 2017, Busan, Korea, 5 pages.
S2-172318, Qualcomm Incorporated, et al., "TS 23.501: Eliminate terminology of A/B-type QoS Flows," SA WG2 Meeting #120, Busan, Korea, Mar. 27-31, 2017, 6 pages.
S2-172390, Qualcomm Incorporated, et al., "TS 23.501: Eliminate terminology of A/B-type QoS Flows," QoS-ABtype-definition-r9, SA WG2 Meeting #120, Busan, Korea, Mar. 27-31, 2017, 6 pages.
S2-172391, Ericsson et al., "23.501: Cleanup of QoS framework description," SA WG2 Meeting #120, Mar. 27-31, 2017, Busan, Korea, 10 pages.
S2-172748, Qualcomm Incorporated, et al., "TS 23.501: Eliminate terminology of A/B-type QoS Flows," QoS-ABtype-definition-r10, SA WG2 Meeting #120, Busan, Korea, Mar. 27-31, 2017, 6 pages.

(56) References Cited

OTHER PUBLICATIONS

3GPP TS 23.401, V13.10.0, "3rd Generation Partnership Project; Technical Specification Group Services and System Aspects; General Packet Radio Service (GPRS) enhancements for Evolved Universal Terrestrial Radio Access Network (E-UTRAN) access (Release 13)," Mar. 2017, 374 pages.

ZTE, "TS 23.502 P-CR to handover from EPS to NGS," S2-172154, SA WG2 Meeting #120, Mar. 27-31, 2017, Busan, Korea, 4 pages.

Huawei, "Handover procedure from 4G to 5G in Single Registration mode," S2-173296, SA WG2 Meeting #121, May 15-19, 2017, Hangzhou,China, 8 pages.

"3rd Generation Partnership Project; Technical Specification Group Services and System Aspects; System Architecture for the 5G System; Stage 2 (Release 15)," 3GPP TS 23.501, V0.4.0, Apr. 2017, 124 pages.

"3rd Generation Partnership Project; Technical Specification Group Services and System Aspects; Procedures for the 5G System; Stage 2 (Release 15)," 3GPP TS 23.502, V0.3.0, Mar. 2017, 115 pages.

"3rd Generation Partnership Project; Technical Specification Group Core Network and Terminals; Non-Access-Stratum (NAS) protocol for Evolved Packet System (EPS); Stage 3 (Release 14)," 3GPP TS 24.301, V14.3.0, Mar. 2017, 476 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.2.0, Mar. 2017, 330 pages.

Huawei, et al., "Inter-RAT mobility for inactive UE," R2-1704880, 3GPP TSG-RAN WG2 #98, Hangzhou, China, May 15-19, 2017, 4 pages.

3GPP TS 23.402 V14.3.0 (Mar. 2017), 3rd Generation Partnership Project;Technical Specification Group Services and System Aspects;Architecture enhancements for non-3GPP accesses(Release 14), total 308 pages.

ZTE, "TS 23.502 P-CR to handover from EPS to NGS," SA WG Temporary Document, SA WG2 Meeting #S2-121, S2-173474, May 15-19, 2017, Hangzhou, China, XP051268916, 6 pages.

* cited by examiner

METHOD FOR MOVING BETWEEN COMMUNICATIONS SYSTEMS AND APPARATUS

CROSS-REFERENCE TO RELATED APPLICATIONS

This application is a continuation of U.S. patent application Ser. No. 16/677,257, filed on Nov. 7, 2019, which is a continuation of International Patent Application No. PCT/CN2017/088814, filed on Jun. 16, 2017, which claims priority to International Patent Application No. PCT/CN2017/083522, filed on May 8, 2017. The disclosures of the aforementioned applications are hereby incorporated by reference in their entireties.

TECHNICAL FIELD

This application relates to the field of communications technologies, and in particular, to a method for moving between communications systems and an apparatus.

BACKGROUND

With rapid development of communications technologies, various user terminals (e.g., a user equipment (UE)) such as a smartphone, a tablet computer, and a portable device emerge. These UEs can support mobile communications networks of different generations, and can be handed over between the mobile communications networks of different generations. A fifth ($5^{th}$) Generation (5G) mobile communications technology is an extension to a fourth ($4^{th}$) Generation (4G) mobile communications technology, and is characterized by high performance, low latency, and a large capacity. A maximum data transmission speed of the fifth generation mobile communications technology can reach tens of gigabits per second (Gbps), and is 1000 times a data transmission speed of an existing 4G network. Therefore, when the UE is in the 4G network and supports a 5G network, the UE can be handed over from the 4G network to the 5G network, to achieve a higher data transmission speed.

In other approaches, the UE can move from the 4G network to a third ($3^{rd}$) Generation (3G) network. This is because an evolved packet system (EPS) bearer of the UE in the 4G network is in a one-to-one mapping relationship with a packet data protocol (PDP) context in the 3G network, and a quality of service (QoS) parameter of the 4G network is also in a one-to-one mapping relationship with a QoS parameter of the 3G network. Therefore, the UE can directly move from the 4G network to the 3G network. The moving described herein includes two cases: When the UE is in an idle state, the UE reselects the 3G network; and when the UE is in a connected state, the UE is handed over to the 3G network. Specifically, when the UE is in an idle state, the UE may send non-access stratum (NAS) routing area update (RAU) signaling to a serving general packet radio service (GPRS) support node (SGSN), such that the UE locally maps a QoS context to a packet data network (PDN) gateway (PGW), and the UE maps an EPS bearer context to a PDP context. When the UE is in a connected state, after the UE receives a handover command from a 4G base station, the UE locally maps a QoS context.

However, because the EPS bearer in the 4G network is replaced with a QoS flow in the 5G network, the QoS flow is not in a one-to-one mapping relationship with the EPS bearer, and QoS parameters are not in a one-to-one mapping relationship either, the UE cannot move from the 4G network to the 5G network using a method used by the UE to move from the 4G network to the 3G network.

SUMMARY

Embodiments of this application provide a method for moving between communications systems and an apparatus, to move a UE from a first communications system to a second communications system.

To achieve the foregoing objectives, the following technical solutions are used in the embodiments of this application.

According to a first aspect, a method for moving between communications systems is provided, and is used to move a user equipment (UE) from a first communications system to a second communications system. The method includes: receiving, by the UE, a first message, where the first message is used to set up or modify a first EPS bearer for the UE in the first communications system, and the first message includes first quality of service (QoS) flow information that is of the second communications system and that is corresponding to the first EPS bearer; storing, by the UE, the first QoS flow information, and moving from the first communications system to the second communications system, for example, moving, by the UE, from a 4G communications system to a 5G communications system; and determining, by the UE based on a first condition, QoS flow information used by the UE in the second communications system, where the first condition includes the first QoS flow information. In the foregoing technical solution, the UE may pre-store the first QoS flow information, and directly use the stored first QoS flow information after moving from the first communications system to the second communications system, such that the UE is moved to the second communications system and has corresponding QoS context information in the second communications system, and a service is run normally without interruption.

With reference to the first aspect, in a first possible implementation of the first aspect, before receiving, by the UE, a first message, the method further includes sending, by the UE, first information to a first core network entity in a process of establishing a PDN connection in the first communications system, where the first information is used by the first core network entity to determine that the PDN connection can be moved from the first communications system to the second communications system. In the foregoing possible technical solution, the UE may enable, using the first information, the first core network entity to determine that the PDN connection can be moved to the second communications system, such that the first core network entity sends the first QoS flow information to the UE.

With reference to the first possible implementation of the first aspect, in a second possible implementation of the first aspect, the first information includes information used to indicate that the PDN connection can be moved to the second communications system, or the first information includes information used to indicate that a service and session continuity (SSC) mode of a protocol data unit (PDU) session corresponding to the PDN connection in the second communications system is a specified mode.

With reference to the first aspect, in a third possible implementation of the first aspect, before receiving, by the UE, a first message, the method further includes sending, by the UE, second information to a first core network entity in a process of establishing a PDN connection in the first communications system, where the second information is used to indicate an SSC mode of a PDU session corresponding to the PDN connection in the second communications system.

With reference to any one of the first aspect to the third possible implementation of the first aspect, in a fourth possible implementation of the first aspect, the first QoS flow information includes one or more QoS rules.

With reference to any one of the first aspect to the fourth possible implementation of the first aspect, in a fifth possible implementation of the first aspect, the first EPS bearer is a default bearer, and the first QoS flow information includes one or more of the following information: a session aggregation maximum bit rate, an SSC mode, a PDU session identifier, or a QoS rule.

With reference to any one of the first aspect to the fifth possible implementation of the first aspect, in a sixth possible implementation of the first aspect, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier.

With reference to the first aspect, in a seventh possible implementation of the first aspect, the method further includes obtaining, by the UE, a first QoS flow identifier, where the first QoS flow identifier is obtained after the UE adds a specific value to a first EPS bearer identifier, or the first QoS flow identifier is obtained after the UE adds a specific field to a first EPS bearer identifier.

With reference to any one of the first aspect to the seventh possible implementation of the first aspect, in an eighth possible implementation of the first aspect, storing, by the UE, the first QoS flow information includes: storing, by the UE, a correspondence between a bearer identifier of the first EPS bearer and the first QoS flow information; or storing, by the UE, a correspondence between a first EPS bearer context and the first QoS flow information; or storing, by the UE, a correspondence between a first EPS bearer context and index information of the first QoS flow, where the index information includes the first QoS flow identifier or a combination of the first QoS flow identifier and a PDU session identifier.

With reference to any one of the first aspect to the eighth possible implementation of the first aspect, in a ninth possible implementation of the first aspect, moving, by the UE, from the first communications system to the second communications system includes: sending, by the UE, first EPS bearer status information to a second core network entity, where the second core network entity is a core network entity that is in the second communications system and that is responsible for UE access and mobility management, and the first EPS bearer status information is used to identify an active-state EPS bearer that is of the UE and that has corresponding QoS flow information; and receiving, by the UE, a second message sent by the second core network entity, where the second message includes second EPS bearer status information, the second EPS bearer status information is used to identify an active-state EPS bearer that is of the UE and has corresponding QoS flow information and that is determined by the second core network entity, and accordingly, the first condition further includes the second EPS bearer status information. In the foregoing possible technical solution, the UE reports the first EPS bearer status information, such that it is ensured that after the UE moves to the second communications system, the UE keeps consistent with a QoS flow status or a QoS flow quantity recorded by a network.

With reference to any one of the first aspect to the eighth possible implementation of the first aspect, in a tenth possible implementation of the first aspect, moving, by the UE, from the first communications system to the second communications system includes: sending, by the UE, first QoS flow status information to a second core network entity, where the second core network entity is a core network entity that is in the second communications system and that is responsible for UE access and mobility management, and the first QoS flow status information is used to identify a QoS flow corresponding to an active-state EPS bearer of the UE; and receiving, by the UE, a second message sent by the second core network entity, where the second message includes second QoS flow status information, the second QoS flow status information is used to identify a QoS flow that is corresponding to the active-state EPS bearer of the UE and that is determined by the second core network entity, and accordingly, the first condition further includes the second QoS flow status information. In the foregoing possible technical solution, the UE reports the first QoS flow status information, such that it is ensured that after the UE moves to the second communications system, the UE keeps consistent with a QoS flow status or a QoS flow quantity recorded by a network.

With reference to any one of the first aspect to the tenth possible implementation of the first aspect, in an eleventh possible implementation of the first aspect, moving, by the UE, from the first communications system to the second communications system includes receiving, by the UE, a handover command sent by a base station in the first communications system, where the handover command includes a session identifier and a QoS flow identifier, and accordingly, the first condition further includes the session identifier and the QoS flow identifier. In the foregoing possible technical solution, the UE receives the session identifier and the QoS flow identifier, such that it is ensured that the UE keeps consistent with the QoS flow status or the QoS flow quantity recorded by the network.

With reference to any one of the first aspect to the eleventh possible implementation of the first aspect, in a twelfth possible implementation of the first aspect, after receiving, by the UE, a first message and before moving, by the UE, from the first communications system to the second communications system, the method further includes: receiving, by the UE, a fourth message, where the fourth message is used to delete the first EPS bearer; and deleting, by the UE, the first EPS bearer and the first QoS flow information corresponding to the first EPS bearer. In the foregoing possible technical solution, the UE deletes the first QoS flow information corresponding to the first EPS bearer, such that it is ensured that the UE keeps consistent with the QoS flow status or the QoS flow quantity recorded by the network.

With reference to any one of the first aspect to the twelfth possible implementation of the first aspect, in a thirteenth possible implementation of the first aspect, the first QoS flow information is included in a protocol configuration option (PCO). In the foregoing possible technical solution, the UE receives the first QoS flow information carried in the PCO, such that it is ensured that the current first communications system is changed to a minimum extent.

With reference to the first or the second possible implementation of the first aspect, in a fourteenth possible implementation of the first aspect, the first information is included in a protocol configuration option PCO. In the foregoing possible technical solution, the UE sends the carried first QoS flow information using the PCO, such that it is ensured that the current first communications system is changed to a minimum extent.

With reference to the third possible implementation of the first aspect, in a fifteenth possible implementation of the first aspect, the second information is included in a PCO.

With reference to any one of the first aspect to the fifteenth possible implementation of the first aspect, in a sixteenth possible implementation of the first aspect, storing, by the UE, the first QoS flow information includes: storing, by the UE, the first QoS flow information in the first EPS bearer context; or storing, by the UE, index information of the first QoS flow information in context information of the first EPS bearer, where the index information includes the first QoS flow identifier or a combination of the first QoS flow identifier and the PDU session identifier.

With reference to any one of the first aspect to the sixteenth possible implementation of the first aspect, in a seventeenth possible implementation of the first aspect, after determining, by the UE based on a first condition, QoS flow information used by the UE in the second communications system, the method further includes deleting, by the UE, a second EPS bearer context, where a second EPS bearer is an EPS bearer that is on the UE and that has no corresponding QoS flow information.

With reference to any one of the first aspect to the seventeenth possible implementation of the first aspect, in an eighteenth possible implementation of the first aspect, moving, by the UE, from the first communications system to the second communications system includes: receiving, by the UE, a handover command, where the handover command includes index information of one or more QoS flows, and the index information includes a QoS flow identifier or a combination of a QoS flow identifier and a PDU session identifier; and moving, by the UE, from the first communications system to the second communications system based on the handover command.

With reference to the eighteenth possible implementation of the first aspect, in a nineteenth possible implementation of the first aspect, determining, by the UE based on a first condition, QoS flow information used by the UE in the second communications system includes: associating, by the UE, a currently used EPS bearer with the index information that is of the QoS flow and that is included in the handover command; and deleting, by the UE, an EPS bearer that is in the currently used EPS bearer and that fails to be associated with the index information of the QoS flow.

With reference to the nineteenth possible implementation of the first aspect, in a twentieth possible implementation of the first aspect, associating, by the UE, a currently used EPS bearer with the index information that is of the QoS flow and that is included in the handover command includes: obtaining, by the UE, an EPS bearer context corresponding to the index information of the QoS flow; or obtaining, by the UE, an EPS bearer identifier corresponding to the index information of the QoS flow.

With reference to any one of the first aspect to the twentieth possible implementation of the first aspect, in a twenty-first possible implementation of the first aspect, the first communications system is a fourth generation communications system, the second communications system is a fifth generation communications system, and/or the first core network entity is a session management function (SMF) entity+control plane PDN gateway (SMF+PGW-C).

According to a second aspect, a method for moving between communications systems is provided, and is used to move a UE from a first communications system to a second communications system. The method includes: determining, by a first core network entity, first QoS flow information that is of the second communications system and that is corresponding to a first EPS bearer of the UE in the first communications system; sending, by the first core network entity, a first message, where the first message is used to set up or modify the first EPS bearer for the UE in the first communications system, and the first message includes the first QoS flow information; storing, by the first core network entity, the first QoS flow information; and when the UE moves from the first communications system to the second communications system, determining, by the first core network entity based on a fourth condition, QoS flow information used by the UE in the second communications system, where the fourth condition includes the first QoS flow information.

With reference to the second aspect, in a first possible implementation of the second aspect, before determining, by a first core network entity, first QoS flow information that is of the second communications system and that is corresponding to a first EPS bearer of the UE in the first communications system, the method further includes: receiving, by the first core network entity in a process of establishing a PDN connection in the first communications system, first information sent by the UE; and determining, by the first core network entity based on the first information, that the PDN connection can be moved from the first communications system to the second communications system.

With reference to the first possible implementation of the second aspect, in a second possible implementation of the second aspect, the first information includes information used to indicate that the PDN connection can be moved to the second communications system, or the first information includes information used to indicate that a service and session continuity (SSC) mode of a PDU session corresponding to the PDN connection in the second communications system is a specified mode.

With reference to the second aspect, in a third possible implementation of the second aspect, before sending, by the first core network entity, a first message, the method further includes receiving, by the first core network entity in a process of establishing a PDN connection in the first communications system, second information sent by the UE, where the second information is used to indicate an SSC mode of a PDU session corresponding to the PDN connection in the second communications system.

With reference to any one of the second aspect to the third possible implementation of the second aspect, in a fourth possible implementation of the second aspect, the first QoS flow information includes one or more QoS rules.

With reference to any one of the second aspect to the fourth possible implementation of the second aspect, in a fifth possible implementation of the second aspect, the first EPS bearer is a default bearer, and the first QoS flow information includes one or more of the following information: a session aggregation maximum bit rate, an SSC mode, a PDU session identifier, or a QoS rule.

With reference to the fourth or the fifth possible implementation of the second aspect, in a sixth possible implementation of the second aspect, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier.

With reference to the second aspect, in a seventh possible implementation of the second aspect, the method further includes obtaining, by the first core network entity, a first QoS flow identifier, where the first QoS flow identifier is obtained after the UE adds a specific value to a first EPS bearer identifier, or the first QoS flow identifier is obtained after the UE adds a specific field to a first EPS bearer identifier.

With reference to any one of the second aspect to the seventh possible implementation of the second aspect, in an eighth possible implementation of the second aspect, determining, by a first core network entity, first QoS flow information that is of the second communications system and that is corresponding to a first EPS bearer of the UE in the first communications system includes: when the first message is used to set up the first EPS bearer for the UE in the first communications system, mapping, by the first core network entity, a first EPS bearer context to the first QoS flow information of the second communications system; or when the first message is used to modify the first EPS bearer for the UE in the first communications system, mapping, by the first core network entity, a context of the modified first EPS bearer to the first QoS flow information of the second communications system.

With reference to the eighth possible implementation of the second aspect, in a ninth possible implementation of the second aspect, the first message is used to set up the first EPS bearer for the UE in the first communications system, and the method further includes: allocating, by the first core network entity, a QoS flow identifier to the UE; or mapping a bearer identifier of the first EPS bearer to a QoS flow identifier.

With reference to the eighth possible implementation of the second aspect, in a tenth possible implementation of the second aspect, the first message is used to modify the first EPS bearer for the UE in the first communications system, and the method further includes determining, by the first core network entity, that the first EPS bearer has the corresponding first QoS flow information of the second communications system.

With reference to the second aspect to the tenth possible implementation of the second aspect, in an eleventh possible implementation of the second aspect, storing, by the first core network entity, the first QoS flow information includes: storing, by the first core network entity, a correspondence between the bearer identifier of the first EPS bearer and the first QoS flow information; or storing, by the first core network entity, a correspondence between the first EPS bearer context and the first QoS flow information; or storing, by the first core network entity, a correspondence between the first EPS bearer context and index information of the first QoS flow, where the index information includes the first QoS flow identifier or a combination of the first QoS flow identifier and a PDU session identifier; or storing, by the UE, a correspondence between the first EPS bearer and the first QoS flow; or storing, by the UE, a correspondence between the first EPS bearer and index information of the first QoS flow, where the index information includes the first QoS flow identifier or a combination of the first QoS flow identifier and a PDU session identifier.

With reference to the eleventh possible implementation of the second aspect, in a twelfth possible implementation of the second aspect, the method further includes: receiving, by the first core network entity, second information sent by a second core network entity, where the second information includes a linked bearer identifier and a bearer identifier that can be moved to the second communications system, or includes a PDN connection context, where the PDN connection context includes an EPS bearer context that can be moved to the second communications system, and the second core network entity is a core network entity that is in the second communications system and that is responsible for UE access and mobility management; and generating, by the first core network entity, second QoS flow information of the second communications system based on a fifth condition, where the second QoS flow information includes QoS flow information that is corresponding to an active-state EPS bearer of the UE and that is determined by the second core network entity, and the fifth condition includes the second information and the correspondence.

With reference to the twelfth possible implementation of the second aspect, in a thirteenth possible implementation of the second aspect, the method further includes: receiving, by the first core network entity, a PDN connection context and first QoS flow status information that are sent by the second core network entity, where the first QoS flow status information is used to identify a QoS flow corresponding to the active-state EPS bearer of the UE; and generating, by the first core network entity, the second QoS flow information of the second communications system based on the fifth condition, where the second QoS flow information includes a QoS flow that is corresponding to the active-state EPS bearer of the UE and that is determined by the second core network entity, and the fifth condition includes the first QoS flow information and the correspondence.

With reference to any one of the second aspect to the thirteenth possible implementation of the second aspect, in a fourteenth possible implementation of the second aspect, the first QoS flow information is included in a PCO.

With reference to the first or the second possible implementation of the second aspect, in a fifteenth possible implementation of the second aspect, the first information is included in a PCO.

With reference to the third possible implementation of the second aspect, in a sixteenth possible implementation of the second aspect, the second information is included in a PCO.

With reference to any one of the second aspect to the sixteenth possible implementation of the second aspect, in a seventeenth possible implementation of the second aspect, the first communications system is a fourth generation communications system, the second communications system is a fifth generation communications system, and/or the first core network entity is a session management function entity+control plane PDN gateway (SMF+PGW-C).

According to a third aspect, a method for moving between communications systems is provided, and is used to move a UE from a first communications system to a second communications system. The method includes: when the UE moves from the first communications system to the second communications system, obtaining, by a second core network entity, first status information and a PDN connection context, where the second core network entity is a core network entity that is in the second communications system and that is responsible for UE access and mobility management; determining, by the second core network entity, second information based on a sixth condition, where the second information is used by a first core network entity to determine QoS flow information used by the UE in the second communications system, and the sixth condition includes the first status information and the PDN connection context; sending, by the second core network entity, the second information to the first core network entity, and receiving third information sent by the first core network entity; generating, by the second core network entity, second status information based on a seventh condition, where the seventh condition includes the third information; and sending, by the second core network entity, a second message to the UE, where the second message includes the second status information, and the second status information is used by the UE to determine the QoS flow information used in the second communications system.

With reference to the third aspect, in a first possible implementation of the third aspect, the first status information is first EPS bearer status information, the second status information is second EPS bearer status information, the first EPS bearer status information is used to identify an active-state EPS bearer that is of the UE and that has corresponding QoS flow information, and the second EPS bearer status information is used to identify an active-state EPS bearer that is of the UE and has corresponding QoS flow information and that is determined by the second core network entity.

With reference to the third aspect, in a second possible implementation of the third aspect, the first status information is first QoS flow status information, the second status information is second QoS flow status information, the first QoS flow status information is used to identify a QoS flow corresponding to an active-state EPS bearer of the UE, and the second QoS flow status information is used to identify a QoS flow that is corresponding to the active-state EPS bearer of the UE and that is determined by the second core network entity.

With reference to the first possible implementation of the third aspect, in a third possible implementation of the third aspect, the third information includes a bearer identifier of an active-state EPS bearer that is of the UE and that is determined by the first core network entity, or the third information includes second QoS flow status information determined by the first core network entity.

With reference to the first possible implementation of the third aspect, in a fourth possible implementation of the third aspect, determining, by the second core network entity, second information based on the first status information and the PDN connection context includes determining, by the second core network entity, the second information based on an EPS bearer intersection set between the first EPS bearer status information and the PDN connection context, where the second information includes a linked bearer identifier and a bearer identifier that can be moved to the second communications system, or includes the PDN connection context, where the PDN connection context includes an EPS bearer context that can be moved to the second communications system.

With reference to the second possible implementation of the third aspect, in a fifth possible implementation of the third aspect, determining, by the second core network entity, second information based on the first status information and the PDN connection context includes: mapping, by the second core network entity, the PDN connection context to QoS flow information of the second communications system; and determining the second information based on a QoS flow intersection set between the mapped QoS flow information and the first QoS flow status information, where the second information includes the second QoS flow status information.

With reference to any one of the third aspect to the fifth possible implementation of the third aspect, in a sixth possible implementation of the third aspect, the first communications system is a fourth generation communications system, the second communications system is a fifth generation communications system, and/or the first core network entity is a session management function entity+control plane PDN gateway (SMF+PGW-C).

According to a fourth aspect, a method for moving between communications systems is provided, and is used to move a UE from a first communications system to a second communications system. The method includes: setting up, by the UE, a first EPS bearer in the first communications system; moving, by the UE, from the first communications system to the second communications system; receiving, by the UE, a first message, where the first message includes first QoS flow information that is of the second communications system and that is corresponding to the first EPS bearer; and determining, by the UE based on a first condition, QoS flow information used by the UE in the second communications system, where the first condition includes the first QoS flow information.

With reference to the fourth aspect, in a first possible implementation of the fourth aspect, the first QoS flow information includes one or more of the following information: a session aggregation maximum bit rate, an SSC mode, a PDU session identifier, or a QoS rule.

With reference to the first possible implementation of the fourth aspect, in a second possible implementation of the fourth aspect, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier.

With reference to the fourth aspect, in a third possible implementation of the fourth aspect, the method further includes obtaining, by the UE, a first QoS flow identifier, where the first QoS flow identifier is obtained after the UE adds a specific value to a first EPS bearer identifier, or the first QoS flow identifier is obtained after the UE adds a specific field to a first EPS bearer identifier.

With reference to any one of the fourth aspect to the third possible implementation of the fourth aspect, in a fourth possible implementation of the fourth aspect, moving, by the UE, from the first communications system to the second communications system includes sending, by the UE, first EPS bearer status information to a second core network entity, where the first EPS bearer status information is used to identify an active-state EPS bearer of the UE, and the second core network entity is a core network entity that is in the second communications system and that is responsible for UE access and mobility management.

With reference to any one of the fourth aspect to the third possible implementation of the fourth aspect, in a fifth possible implementation of the fourth aspect, moving, by the UE, from the first communications system to the second communications system includes sending, by the UE, first QoS flow status information to a second core network entity, where the second core network entity is a core network entity that is in the second communications system and that is responsible for UE access and mobility management, and the first QoS flow status information is used to identify a QoS flow corresponding to an active-state EPS bearer of the UE.

With reference to the fourth aspect, in a sixth possible implementation of the fourth aspect, the first message is a registration accept message, and an N1 session management information parameter of the registration accept message includes the first QoS flow information; or the first message is a PDU session modification message, and an N1 session management information parameter of the PDU session modification message includes the first QoS flow information.

With reference to the fourth aspect, in a seventh possible implementation of the fourth aspect, the first message is a handover command message, and the handover command message includes the first QoS flow information.

With reference to the seventh possible implementation of the fourth aspect, in an eighth possible implementation of the fourth aspect, a target to source transparent container of the handover command message includes the first QoS flow information.

With reference to the eighth possible implementation of the fourth aspect, in a ninth possible implementation of the fourth aspect, an access stratum of the UE obtains the first QoS flow information from the target to source transparent container, and sends the first QoS flow information to a non-access stratum of the UE.

With reference to any one of the fourth aspect to the ninth possible implementation of the fourth aspect, in a tenth possible implementation of the fourth aspect, the first message further includes information about the first EPS bearer corresponding to the first QoS flow information.

With reference to the tenth possible implementation of the fourth aspect, in an eleventh possible implementation of the fourth aspect, the information about the first EPS bearer includes a bearer identifier of the first EPS bearer.

With reference to the tenth or the eleventh possible implementation of the fourth aspect, in a twelfth possible implementation of the fourth aspect, after determining, by the UE based on a first condition, QoS flow information used by the UE in the second communications system, the method further includes deleting, by the UE, a second EPS bearer context, where a second EPS bearer is an EPS bearer that is of the UE and that is not included in the first message, or a second EPS bearer is an EPS bearer that is of the UE and that has no corresponding QoS flow information.

With reference to any one of the fourth aspect to the twelfth possible implementation of the fourth aspect, in a thirteenth possible implementation of the fourth aspect, the first communications system is a fourth generation communications system, the second communications system is a fifth generation communications system, and/or the first core network entity is a session management function entity+control plane PDN gateway (SMF+PGW-C).

According to a fifth aspect, a method for moving between communications systems is provided, and is used to move a UE from a first communications system to a second communications system. The method includes: when the UE moves from the first communications system to the second communications system, receiving, by a first core network entity, first information sent by a second core network entity, where the first information includes a PDN connection context, the PDN connection context includes an EPS bearer context that can be moved to the second communications system, and the second core network entity is a core network entity that is in the second communications system and that is responsible for UE access and mobility management; and determining, by the first core network entity based on a first condition, QoS flow information used by the UE in the second communications system, where the first condition includes the PDN connection context.

Alternatively, the method includes: when the UE moves from the first communications system to the second communications system, receiving, by a first core network entity, second information sent by a second core network entity, where the second information includes a PDN connection that can be moved to the second communications system and QoS flow status information corresponding to the PDN, and the second core network entity is a core network entity that is in the second communications system and that is responsible for UE access and mobility management; and determining, by the first core network entity based on a first condition, QoS flow information used by the UE in the second communications system, where the first condition includes the PDN connection and the QoS flow status information. Further, the PDN connection includes all PDN connections of the UE in the first communications system, and the method further includes deleting, by the first core network entity, a QoS flow that is in a QoS flow corresponding to an EPS bearer of the PDN connection and that is not in the QoS flow status information.

With reference to the fifth aspect, in a first possible implementation of the fifth aspect, the QoS flow information includes one or more of the following information: a session aggregation maximum bit rate, an SSC mode, a PDU session identifier, or a QoS rule.

With reference to the first possible implementation of the fifth aspect, in a second possible implementation of the fifth aspect, the QoS rule includes one or more of the following information: a QoS rule identifier, a QoS flow identifier, precedence, and a packet filter. Alternatively, the QoS rule includes one or more of the following information: a QoS rule identifier, a QoS flow identifier, precedence, or a packet filter identifier.

With reference to any one of the fifth aspect to the second possible implementation of the fifth aspect, in a third possible implementation of the fifth aspect, the first communications system is a fourth generation communications system, the second communications system is a fifth generation communications system, and/or the first core network entity is a session management function entity+control plane PDN gateway (SMF+PGW-C).

According to a sixth aspect, a method for moving between communications systems is provided, and is used to move a UE from a first communications system to a second communications system. The method includes: when the UE moves from the first communications system to the second communications system, receiving, by a second core network entity, first QoS flow information, of the second communications system, corresponding to a first EPS bearer that is set up by the UE in the first communications system; and sending, by the second core network entity, a first message to the UE, where the first message includes the first QoS flow information.

With reference to the sixth aspect, in a first possible implementation of the sixth aspect, the first QoS flow information includes one or more of the following information: a session aggregation maximum bit rate, an SSC mode, a PDU session identifier, or a QoS rule.

With reference to the first possible implementation of the sixth aspect, in a second possible implementation of the sixth aspect, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier.

With reference to any one of the sixth aspect to the second possible implementation of the sixth aspect, in a third possible implementation of the sixth aspect, the method further includes: obtaining, by the second core network entity, first EPS bearer status information and a PDN connection context, where the first EPS bearer status information is used to identify an active-state EPS bearer of the UE; and determining, by the second core network entity, third information based on the first EPS bearer status information and the PDN connection context, where the third information includes a PDN connection that can be moved to the second communications system and an EPS bearer on the PDN connection, or includes a PDN connection context that can be moved to the second communications system.

With reference to any one of the sixth aspect to the second possible implementation of the sixth aspect, in a fourth possible implementation of the sixth aspect, the method further includes: obtaining, by the second core network entity, first QoS flow status information and a PDN connection context, where the first QoS flow status information is used to identify a QoS flow corresponding to an active-state EPS bearer of the UE; and sending, by the second core network entity, the first QoS flow status information and the PDN connection context to a first core network entity, and receiving second QoS flow information sent by the first core network entity, where the second QoS flow information is used to identify a QoS flow that is corresponding to the active-state EPS bearer of the UE and that is determined by the first core network entity.

With reference to the sixth aspect, in a fifth possible implementation of the sixth aspect, the first message is a registration accept message, and an N1 session management information parameter of the registration accept message includes the first QoS flow information; or the first message is a PDU session modification message, and an N1 session management information parameter of the PDU session modification message includes the first QoS flow information.

With reference to the sixth aspect, in a sixth possible implementation of the sixth aspect, the first message is a handover command message, and the handover command message includes the first QoS flow information.

With reference to the sixth possible implementation of the sixth aspect, in a seventh possible implementation of the sixth aspect, a target to source transparent container of the handover command message includes the first QoS flow information.

With reference to any one of the sixth aspect to the seventh possible implementation of the sixth aspect, in an eighth possible implementation of the sixth aspect, the first message further includes information about the first EPS bearer corresponding to the first QoS flow information.

With reference to the eighth possible implementation of the sixth aspect, in a ninth possible implementation of the sixth aspect, the information about the first EPS bearer includes a bearer identifier of the first EPS bearer.

With reference to any one of the sixth aspect to the ninth possible implementation of the sixth aspect, in a tenth possible implementation of the sixth aspect, the first communications system is a fourth generation communications system, and the second communications system is a fifth generation communications system.

According to a seventh aspect, a UE is provided and is configured to move the UE from a first communications system to a second communications system. The UE includes: a receiving unit configured to receive a first message, where the first message is used to set up or modify a first EPS bearer for the UE in the first communications system, and the first message includes first QoS flow information that is of the second communications system and that is corresponding to the first EPS bearer; a storage unit configured to store the first QoS flow information; a moving unit configured to move from the first communications system to the second communications system; and a determining unit configured to determine, based on a first condition, QoS flow information used by the UE in the second communications system, where the first condition includes the first QoS flow information.

With reference to the seventh aspect, in a first possible implementation of the seventh aspect, before receiving the first message, the UE further includes a sending unit configured to send first information to a first core network entity in a process of establishing a PDN connection in the first communications system, where the first information is used by the first core network entity to determine that the PDN connection can be moved from the first communications system to the second communications system.

With reference to the first possible implementation of the seventh aspect, in a second possible implementation of the seventh aspect, the first information includes information used to indicate that the PDN connection can be moved to the second communications system, or the first information includes information used to indicate that a service and session continuity (SSC) mode of a PDU session corresponding to the PDN connection in the second communications system is a specified mode.

With reference to the seventh aspect, in a third possible implementation of the seventh aspect, the UE further includes a sending unit configured to send second information to a first core network entity in a process of establishing a PDN connection in the first communications system, where the second information is used to indicate an SSC mode of a PDU session corresponding to the PDN connection in the second communications system.

With reference to any one of the seventh aspect to the third possible implementation of the seventh aspect, in a fourth possible implementation of the seventh aspect, the first QoS flow information includes one or more QoS rules.

With reference to any one of the seventh aspect to the fourth possible implementation of the seventh aspect, in a fifth possible implementation of the seventh aspect, the first EPS bearer is a default bearer, and the first QoS flow information includes one or more of the following information: a session aggregation maximum bit rate, an SSC mode, a PDU session identifier, or a QoS rule.

With reference to any one of the seventh aspect to the fifth possible implementation of the seventh aspect, in a sixth possible implementation of the seventh aspect, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier.

With reference to the seventh aspect, in a seventh possible implementation of the seventh aspect, the determining unit is further configured to obtain a first QoS flow identifier, where the first QoS flow identifier is obtained after the UE adds a specific value to a first EPS bearer identifier, or the first QoS flow identifier is obtained after the UE adds a specific field to a first EPS bearer identifier.

With reference to any one of the seventh aspect to the seventh possible implementation of the seventh aspect, in an eighth possible implementation of the seventh aspect, the storage unit is configured to: store a correspondence between a bearer identifier of the first EPS bearer and the first QoS flow information; or store a correspondence between a first EPS bearer context and the first QoS flow information; or store a correspondence between a first EPS bearer context and index information of the first QoS flow, where the index information includes the first QoS flow identifier or a combination of the first QoS flow identifier and a PDU session identifier.

With reference to any one of the seventh aspect to the eighth possible implementation of the seventh aspect, in a ninth possible implementation of the seventh aspect, the sending unit is further configured to send first EPS bearer status information to a second core network entity, where the second core network entity is a core network entity that is in the second communications system and that is responsible for UE access and mobility management, and the first EPS bearer status information is used to identify an active-state EPS bearer that is of the UE and that has corresponding QoS flow information; and the receiving unit is further configured to receive a second message sent by the second core network entity, where the second message includes second EPS bearer status information, the second EPS bearer status information is used to identify an active-state EPS bearer that is of the UE and has corresponding QoS flow information and that is determined by the second core network entity, and accordingly, the first condition further includes the second EPS bearer status information.

With reference to any one of the seventh aspect to the eighth possible implementation of the seventh aspect, in a tenth possible implementation of the seventh aspect, the sending unit is further configured to send first QoS flow status information to a second core network entity, where the second core network entity is a core network entity that is in the second communications system and that is responsible for UE access and mobility management, and the first QoS flow status information is used to identify a QoS flow corresponding to an active-state EPS bearer of the UE; and the receiving unit is further configured to receive a second message sent by the second core network entity, where the second message includes second QoS flow status information, the second QoS flow status information is used to identify a QoS flow that is corresponding to the active-state EPS bearer of the UE and that is determined by the second core network entity, and accordingly, the first condition further includes the second QoS flow status information.

With reference to any one of the seventh aspect to the tenth possible implementation of the seventh aspect, in an eleventh possible implementation of the seventh aspect, the receiving unit is further configured to receive a handover command sent by a base station in the first communications system, where the handover command includes a session identifier and a QoS flow identifier, and accordingly, the first condition further includes the session identifier and the QoS flow identifier.

With reference to any one of the seventh aspect to the eleventh possible implementation of the seventh aspect, in a twelfth possible implementation of the seventh aspect, the receiving unit is further configured to receive a fourth message, where the fourth message is used to delete the first EPS bearer, and the UE further includes a deletion unit configured to delete the first EPS bearer and the first QoS flow information corresponding to the first EPS bearer.

With reference to any one of the seventh aspect to the twelfth possible implementation of the seventh aspect, in a thirteenth possible implementation of the seventh aspect, the first QoS flow information is included in a PCO.

With reference to the first or the second possible implementation of the seventh aspect, in a fourteenth possible implementation of the seventh aspect, the first information is included in a PCO.

With reference to the third possible implementation of the seventh aspect, in a fifteenth possible implementation of the seventh aspect, the second information is included in a PCO.

With reference to any one of the seventh aspect to the fifteenth possible implementation of the seventh aspect, in a sixteenth possible implementation of the seventh aspect, the storage unit is configured to: store the first QoS flow information in the first EPS bearer context; or store index information of the first QoS flow information in context information of the first EPS bearer, where the index information includes the first QoS flow identifier or a combination of the first QoS flow identifier and the PDU session identifier.

With reference to any one of the seventh aspect to the sixteenth possible implementation of the seventh aspect, in a seventeenth possible implementation of the seventh aspect, the UE further includes a deletion unit configured to delete a second EPS bearer context, where a second EPS bearer is an EPS bearer an EPS bearer that is on the UE and that has no corresponding QoS flow information.

With reference to any one of the seventh aspect to the seventeenth possible implementation of the seventh aspect, in an eighteenth possible implementation of the seventh aspect, the receiving unit is further configured to receive a handover command, where the handover command includes index information of one or more QoS flows, and the index information includes a QoS flow identifier or a combination of a QoS flow identifier and a PDU session identifier; and accordingly, the moving unit is configured to move from the first communications system to the second communications system based on the handover command.

With reference to the eighteenth possible implementation of the seventh aspect, in a nineteenth possible implementation of the seventh aspect, the determining unit is configured to associate a currently used EPS bearer with the index information that is of the QoS flow and that is included in the handover command, and delete an EPS bearer that is in the currently used EPS bearer and that fails to be associated with the index information of the QoS flow.

With reference to the nineteenth possible implementation of the seventh aspect, in a twentieth possible implementation of the seventh aspect, the determining unit is further configured to: obtain an EPS bearer context corresponding to the index information of the QoS flow; or obtain an EPS bearer identifier corresponding to the index information of the QoS flow.

With reference to any one of the seventh aspect to the twentieth possible implementation of the seventh aspect, in a twenty-first possible implementation of the seventh aspect, the first communications system is a fourth generation communications system, the second communications system is a fifth generation communications system, and/or the first core network entity is a session management function entity+control plane PDN gateway (SMF+PGW-C).

According to an eighth aspect, a core network entity is provided, and is configured to move a UE from a first communications system to a second communications system. The core network entity includes: a determining unit configured to determine first QoS flow information that is of the second communications system and that is corresponding to a first EPS bearer of the UE in the first communications system; a sending unit configured to send a first message, where the first message is used to set up or modify the first EPS bearer for the UE in the first communications system, and the first message includes the first QoS flow information; a storage unit configured to store the first QoS flow information; and a determining unit configured to, when the UE moves from the first communications system to the second communications system, determine, based on a fourth condition, QoS flow information used by the UE in the second communications system, where the fourth condition includes the first QoS flow information.

With reference to the eighth aspect, in a first possible implementation of the eighth aspect, the core network entity further includes: a receiving unit configured to receive, in a process of establishing a PDN connection in the first communications system, first information sent by the UE; and the determining unit is further configured to determine, based on the first information, that the PDN connection can be moved from the first communications system to the second communications system.

With reference to the first possible implementation of the eighth aspect, in a second possible implementation of the eighth aspect, the first information includes information used to indicate that the PDN connection can be moved to the second communications system, or the first information includes information used to indicate that a service and session continuity (SSC) mode of a PDU session corresponding to the PDN connection in the second communications system is a specified mode.

With reference to the eighth aspect, in a third possible implementation of the eighth aspect, the core network entity further includes a receiving unit configured to receive, in a process of establishing a PDN connection in the first communications system, second information sent by the UE, where the second information is used to indicate an SSC mode of a PDU session corresponding to the PDN connection in the second communications system.

With reference to any one of the eighth aspect to the third possible implementation of the eighth aspect, in a fourth possible implementation of the eighth aspect, the first QoS flow information includes one or more QoS rules.

With reference to any one of the eighth aspect to the fourth possible implementation of the eighth aspect, in a fifth possible implementation of the eighth aspect, the first EPS bearer is a default bearer, and the first QoS flow information includes one or more of the following information: a session aggregation maximum bit rate, an SSC mode, a PDU session identifier, or a QoS rule.

With reference to the fourth or the fifth possible implementation of the eighth aspect, in a sixth possible implementation of the eighth aspect, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier.

With reference to the eighth aspect, in a seventh possible implementation of the eighth aspect, the determining unit is further configured to obtain a first QoS flow identifier, where the first QoS flow identifier is obtained after a specific value is added to a first EPS bearer identifier, or the first QoS flow identifier is obtained after a specific field is added to a first EPS bearer identifier.

With reference to any one of the eighth aspect to the seventh possible implementation of the eighth aspect, in an eighth possible implementation of the eighth aspect, the first message is used to set up the first EPS bearer for the UE in the first communications system, and the determining unit is configured to map a first EPS bearer context to the first QoS flow information of the second communications system; or the first message is used to modify the first EPS bearer for the UE in the first communications system, and the determining unit is configured to map a context of the modified first EPS bearer to the first QoS flow information of the second communications system.

With reference to the eighth possible implementation of the eighth aspect, in a ninth possible implementation of the eighth aspect, the first message is used to set up the first EPS bearer for the UE in the first communications system, and the determining unit is further configured to: allocate a QoS flow identifier to the UE; or map a bearer identifier of the first EPS bearer to a QoS flow identifier.

With reference to the eighth possible implementation of the eighth aspect, in a tenth possible implementation of the eighth aspect, the first message is used to modify the first EPS bearer for the UE in the first communications system, and the determining unit is further configured to determine that the first EPS bearer has the corresponding first QoS flow information of the second communications system.

With reference to the eighth aspect to the tenth possible implementation of the eighth aspect, in an eleventh possible implementation of the eighth aspect, the storage unit is configured to: store a correspondence between the bearer identifier of the first EPS bearer and the first QoS flow information; or store a correspondence between the first EPS bearer context and the first QoS flow information; or store a correspondence between the first EPS bearer context and index information of the first QoS flow, where the index information includes the first QoS flow identifier or a combination of the first QoS flow identifier and a PDU session identifier; or store, by the UE, a correspondence between the first EPS bearer and the first QoS flow; or store, by the UE, a correspondence between the first EPS bearer and index information of the first QoS flow, where the index information includes the first QoS flow identifier or a combination of the first QoS flow identifier and a PDU session identifier.

With reference to the eleventh possible implementation of the eighth aspect, in a twelfth possible implementation of the eighth aspect, the receiving unit is further configured to receive second information sent by a second core network entity, where the second information includes a linked bearer identifier and a bearer identifier that can be moved to the second communications system, or includes a PDN connection context, where the PDN connection context includes an EPS bearer context that can be moved to the second communications system, and the second core network entity is a core network entity that is in the second communications system and that is responsible for UE access and mobility management; and the determining unit is further configured to generate second QoS flow information of the second communications system based on a fifth condition, where the second QoS flow information includes QoS flow information that is corresponding to an active-state EPS bearer of the UE and that is determined by the second core network entity, and the fifth condition includes the second information and the correspondence.

With reference to the twelfth possible implementation of the second aspect, in a thirteenth possible implementation of the second aspect, the receiving unit is further configured to receive a PDN connection context and first QoS flow status information that are sent by the second core network entity, where the first QoS flow status information is used to identify a QoS flow corresponding to the active-state EPS bearer of the UE; and the determining unit is further configured to determine the second QoS flow information of the second communications system based on the fifth condition, where the second QoS flow information includes a QoS flow that is corresponding to the active-state EPS bearer of the UE and that is determined by the second core network entity, and the fifth condition includes the first QoS flow information and the correspondence.

With reference to any one of the eighth aspect to the thirteenth possible implementation of the eighth aspect, in a fourteenth possible implementation of the eighth aspect, the first QoS flow information is included in a PCO.

With reference to the first or the second possible implementation of the eighth aspect, in a fifteenth possible implementation of the eighth aspect, the first information is included in a PCO.

With reference to the third possible implementation of the eighth aspect, in a sixteenth possible implementation of the eighth aspect, the second information is included in a PCO.

With reference to any one of the eighth aspect to the sixteenth possible implementation of the eighth aspect, in a seventeenth possible implementation of the eighth aspect, the first communications system is a fourth generation communications system, the second communications system is a fifth generation communications system, and/or a first core network entity is a session management function entity+control plane PDN gateway (SMF+PGW-C).

According to a ninth aspect, a core network entity is provided, and is configured to move a UE from a first communications system to a second communications system. The core network entity includes: an obtaining unit configured such that when the UE moves from the first communications system to the second communications system, the obtaining unit obtains first status information and a PDN connection context; a determining unit configured to determine second information based on a sixth condition, where the second information is used by a first core network entity to determine QoS flow information used by the UE in the second communications system, and the sixth condition includes the first status information and the PDN connection context; and a sending unit configured to send the second information; where the obtaining unit is further configured to receive third information sent by the first core network entity. The determining unit is further configured to generate second status information based on a seventh condition, and the seventh condition includes the third information. The sending unit is further configured to send a second message to the UE, where the second message includes the second status information, and the second status information is used by the UE to determine the QoS flow information used in the second communications system.

With reference to the ninth aspect, in a first possible implementation of the ninth aspect, the first status information is first EPS bearer status information, the second status information is second EPS bearer status information, the first EPS bearer status information is used to identify an active-state EPS bearer that is of the UE and that has corresponding QoS flow information, and the second EPS bearer status information is used to identify an active-state EPS bearer that is of the UE and has corresponding QoS flow information and that is determined by a second core network entity.

With reference to the ninth aspect, in a second possible implementation of the ninth aspect, the first status information is first QoS flow status information, the second status information is second QoS flow status information, the first QoS flow status information is used to identify a QoS flow corresponding to an active-state EPS bearer of the UE, and the second QoS flow status information is used to identify a QoS flow that is corresponding to the active-state EPS bearer of the UE and that is determined by the second core network entity.

With reference to the first possible implementation of the ninth aspect, in a third possible implementation of the ninth aspect, the third information includes a bearer identifier of an active-state EPS bearer that is of the UE and that is determined by the first core network entity, or the third information includes second QoS flow status information determined by the first core network entity.

With reference to the first possible implementation of the ninth aspect, in a fourth possible implementation of the ninth aspect, the determining unit is configured to determine second information based on an EPS bearer intersection set between the first EPS bearer status information and the PDN connection context, where the second information includes a linked bearer identifier and a bearer identifier that can be moved to the second communications system, or includes the PDN connection context, where the PDN connection context includes an EPS bearer context that can be moved to the second communications system.

With reference to the second possible implementation of the ninth aspect, in a fifth possible implementation of the ninth aspect, the determining unit is configured to map the PDN connection context to QoS flow information of the second communications system, and determine the second information based on a QoS flow intersection set between the mapped QoS flow information and the first QoS flow status information, where the second information includes the second QoS flow status information.

With reference to any one of the ninth aspect to the fifth possible implementation of the ninth aspect, in a sixth possible implementation of the ninth aspect, the first communications system is a fourth generation communications system, the second communications system is a fifth generation communications system, and/or the first core network entity is a session management function entity+control plane PDN gateway (SMF+PGW-C).

According to a tenth aspect, a UE is provided, and is configured to move the UE from a first communications system to a second communications system. The UE includes: a setup unit configured to set up a first EPS bearer in the first communications system; a moving unit configured to move from the first communications system to the second communications system; a receiving unit configured to receive a first message, where the first message includes first QoS flow information that is of the second communications system and that is corresponding to the first EPS bearer; and a determining unit configured to determine, based on a first condition, QoS flow information used by the UE in the second communications system, where the first condition includes the first QoS flow information.

With reference to the tenth aspect, in a first possible implementation of the tenth aspect, the first QoS flow information includes one or more of the following information: a session aggregation maximum bit rate, an SSC mode, a PDU session identifier, or a QoS rule.

With reference to the first possible implementation of the tenth aspect, in a second possible implementation of the tenth aspect, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier.

With reference to the tenth aspect, in a third possible implementation of the tenth aspect, the determining unit is further configured to obtain a first QoS flow identifier, where the first QoS flow identifier is obtained after the UE adds a specific value to a first EPS bearer identifier, or the first QoS flow identifier is obtained after the UE adds a specific field to a first EPS bearer identifier.

With reference to any one of the tenth aspect to the third possible implementation of the tenth aspect, in a fourth possible implementation of the tenth aspect, the UE further includes a sending unit configured to send first EPS bearer status information to a second core network entity, where the first EPS bearer status information is used to identify an active-state EPS bearer of the UE, and the second core network entity is a core network entity that is in the second communications system and that is responsible for UE access and mobility management.

With reference to any one of the tenth aspect to the third possible implementation of the fourth aspect, in a fifth possible implementation of the tenth aspect, the UE further includes a sending unit configured to send first QoS flow status information to a second core network entity, where the second core network entity is a core network entity that is in the second communications system and that is responsible for UE access and mobility management, and the first QoS flow status information is used to identify a QoS flow corresponding to an active-state EPS bearer of the UE.

With reference to the tenth aspect, in a sixth possible implementation of the tenth aspect, the first message is a registration accept message, and an N1 session management information parameter of the registration accept message includes the first QoS flow information; or the first message is a PDU session modification message, and an N1 session management information parameter of the PDU session modification message includes the first QoS flow information.

With reference to the tenth aspect, in a seventh possible implementation of the tenth aspect, the first message is a handover command message, and the handover command message includes the first QoS flow information.

With reference to the seventh possible implementation of the tenth aspect, in an eighth possible implementation of the tenth aspect, a target to source transparent container of the handover command message includes the first QoS flow information.

With reference to the eighth possible implementation of the tenth aspect, in a ninth possible implementation of the tenth aspect, an access stratum of the UE obtains the first QoS flow information from the target to source transparent container, and sends the first QoS flow information to a non-access stratum of the UE.

With reference to any one of the tenth aspect to the ninth possible implementation of the tenth aspect, in a tenth possible implementation of the tenth aspect, the first message further includes information about the first EPS bearer corresponding to the first QoS flow information.

With reference to the tenth possible implementation of the tenth aspect, in an eleventh possible implementation of the tenth aspect, the information about the first EPS bearer includes a bearer identifier of the first EPS bearer.

With reference to the tenth or the eleventh possible implementation of the tenth aspect, in a twelfth possible implementation of the tenth aspect, the UE further includes a deletion unit configured to delete a second EPS bearer context, where a second EPS bearer is an EPS bearer that is of the UE and that is not included in the first message, or a second EPS bearer is an EPS bearer that is of the UE and that has no corresponding QoS flow information.

With reference to any one of the tenth aspect to the twelfth possible implementation of the tenth aspect, in a thirteenth possible implementation of the tenth aspect, the first communications system is a fourth generation communications system, the second communications system is a fifth generation communications system, and/or the first core network entity is a session management function entity+control plane PDN gateway (SMF+PGW-C).

According to an eleventh aspect, a core network entity is provided, and is configured to move UE from a first communications system to a second communications system. The core network entity includes: a receiving unit configured such that when the UE moves from the first communications system to the second communications system, the receiving unit receives first information sent by a second core network entity, where the first information includes a PDN connection context, the PDN connection context includes an EPS bearer context that can be moved to the second communications system, and the second core network entity is a core network entity that is in the second communications system and that is responsible for UE access and mobility management; and a determining unit configured to determine, based on a first condition, QoS flow information used by the UE in the second communications system, where the first condition includes the PDN connection context.

Alternatively, the core network entity includes: a receiving unit configured such that when the UE moves from the first communications system to the second communications system, the receiving unit receives second information sent by a second core network entity, where the second information includes a PDN connection that can be moved to the second communications system and QoS flow status information corresponding to the PDN, and the second core network entity is a core network entity that is in the second communications system and that is responsible for UE access and mobility management; and a determining unit configured to determine, based on a first condition, QoS flow information used by the UE in the second communications system, where the first condition includes the PDN connection and the QoS flow status information. Further, the PDN connection includes all PDN connections of the UE in the first communications system, and the core network entity further includes a deletion unit configured to delete a QoS flow that is in a QoS flow corresponding to an EPS bearer of the PDN connection and that is not in the QoS flow status information.

With reference to the eleventh aspect, in a first possible implementation of the eleventh aspect, the QoS flow information includes one or more of the following information: a session aggregation maximum bit rate, an SSC mode, a PDU session identifier, or a QoS rule.

With reference to the first possible implementation of the eleventh aspect, in a second possible implementation of the eleventh aspect, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier.

With reference to any one of the eleventh aspect to the second possible implementation of the eleventh aspect, in a third possible implementation of the eleventh aspect, the first communications system is a fourth generation communications system, the second communications system is a fifth generation communications system, and/or a first core network entity is a session management function entity+control plane PDN gateway (SMF+PGW-C).

According to a twelfth aspect, a core network entity is provided, and is configured to move a UE from a first communications system to a second communications system. The core network entity includes: an obtaining unit configured such that when the UE moves from the first communications system to the second communications system, the obtaining unit receives first QoS flow information, of the second communications system, corresponding to a first EPS bearer that is set up by the UE in the first communications system; and a sending unit configured to send a first message to the UE, where the first message includes the first QoS flow information.

With reference to the twelfth aspect, in a first possible implementation of the twelfth aspect, the first QoS flow information includes one or more of the following information: a session aggregation maximum bit rate, an SSC mode, a PDU session identifier, or a QoS rule.

With reference to the first possible implementation of the twelfth aspect, in a second possible implementation of the twelfth aspect, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier.

With reference to any one of the twelfth aspect to the second possible implementation of the twelfth aspect, in a third possible implementation of the twelfth aspect, the obtaining unit is further configured to obtain first EPS bearer status information and a PDN connection context, where the first EPS bearer status information is used to identify an active-state EPS bearer of the UE; and the core network entity further includes a determining unit configured to determine third information based on the first EPS bearer status information and the PDN connection context, where the third information includes a PDN connection that can be moved to the second communications system and an EPS bearer on the PDN connection, or includes a PDN connection context that can be moved to the second communications system.

With reference to any one of the twelfth aspect to the second possible implementation of the twelfth aspect, in a fourth possible implementation of the twelfth aspect, the obtaining unit is further configured to obtain first QoS flow status information and a PDN connection context, where the first QoS flow status information is used to identify a QoS flow corresponding to an active-state EPS bearer of the UE; the sending unit is further configured to send the first QoS flow status information and the PDN connection context to a first core network entity; and the obtaining unit is further configured to receive second QoS flow information sent by the first core network entity, where the second QoS flow information is used to identify a QoS flow that is corresponding to the active-state EPS bearer of the UE and that is determined by the first core network entity.

With reference to the twelfth aspect, in a fifth possible implementation of the twelfth aspect, the first message is a registration accept message, and an N1 session management information parameter of the registration accept message includes the first QoS flow information; or the first message is a PDU session modification message, and an N1 session management information parameter of the PDU session modification message includes the first QoS flow information.

With reference to the twelfth aspect, in a sixth possible implementation of the twelfth aspect, the first message is a handover command message, and the handover command message includes the first QoS flow information.

With reference to the sixth possible implementation of the twelfth aspect, in a seventh possible implementation of the twelfth aspect, a target to source transparent container of the handover command message includes the first QoS flow information.

With reference to any one of the twelfth aspect to the seventh possible implementation of the twelfth aspect, in an eighth possible implementation of the twelfth aspect, the first message further includes information about the first EPS bearer corresponding to the first QoS flow information.

With reference to the eighth possible implementation of the twelfth aspect, in a ninth possible implementation of the twelfth aspect, the information about the first EPS bearer includes a bearer identifier of the first EPS bearer.

With reference to any one of the twelfth aspect to the ninth possible implementation of the twelfth aspect, in a tenth possible implementation of the twelfth aspect, the first communications system is a fourth generation communications system, and the second communications system is a fifth generation communications system.

According to a thirteenth aspect, user equipment is provided. The UE includes a memory, a processor, a communications interface, and a bus. The memory stores code and data, the processor, the memory, and the communications interface are connected using the bus, and the processor runs the code in the memory, such that the user equipment performs the method for moving between communications systems provided in any one of the first aspect and the possible implementations of the first aspect, or performs the method for moving between communications systems provided in any one of the fourth aspect and the possible implementations of the fourth aspect.

According to a fourteenth aspect, a core network device is provided. The core network device includes a memory, a processor, a communications interface, and a bus. The memory stores code and data. The processor, the memory, and the communications interface are connected using the bus, and the processor runs the code in the memory, such that the core network device performs the method for moving between communications systems provided in any one of the second aspect and the possible implementations of the second aspect, or performs the method for moving between communications systems provided in any one of the fifth aspect and the possible implementations of the fifth aspect.

According to a fifteenth aspect, a core network device is provided. The core network device includes a memory, a processor, a communications interface, and a bus, where the memory stores code and data. The processor, the memory, and the communications interface are connected using the bus, and the processor runs the code in the memory, such that the core network device performs the method for moving between communications systems provided in any one of the third aspect and the possible implementations of the third aspect, or performs the method for moving between communications systems provided in any one of the sixth aspect and the possible implementations of the sixth aspect.

According to a sixteenth aspect, a system is provided. The system includes a UE, a first core network entity, and a second core network entity, where the user equipment is the user equipment provided in any one of the seventh aspect and the possible implementations of the seventh aspect, or provided in any one of the tenth aspect and the possible implementations of the tenth aspect, or provided in the thirteenth aspect; and/or the first core network entity is the core network device provided in any one of the eighth aspect and the possible implementations of the eighth aspect, or provided in any one of the eleventh aspect and the possible implementations of the eleventh aspect, or provided in the fourteenth aspect; and/or the second core network entity is the core network device provided in any one of the ninth aspect and the possible implementations of the ninth aspect, or provided in any one of the twelfth aspect and the possible implementations of the twelfth aspect, or provided in the fifteenth aspect.

Still another aspect of this application provides a computer readable storage medium. The computer readable storage medium stores an instruction, and when the instruction is run on a computer, the computer performs the methods in the foregoing aspects.

Yet still another aspect of this application provides a computer program product that includes an instruction. When the instruction is run on a computer, the computer performs the methods in the foregoing aspects.

DESCRIPTION OF EMBODIMENTS

Figure 1:
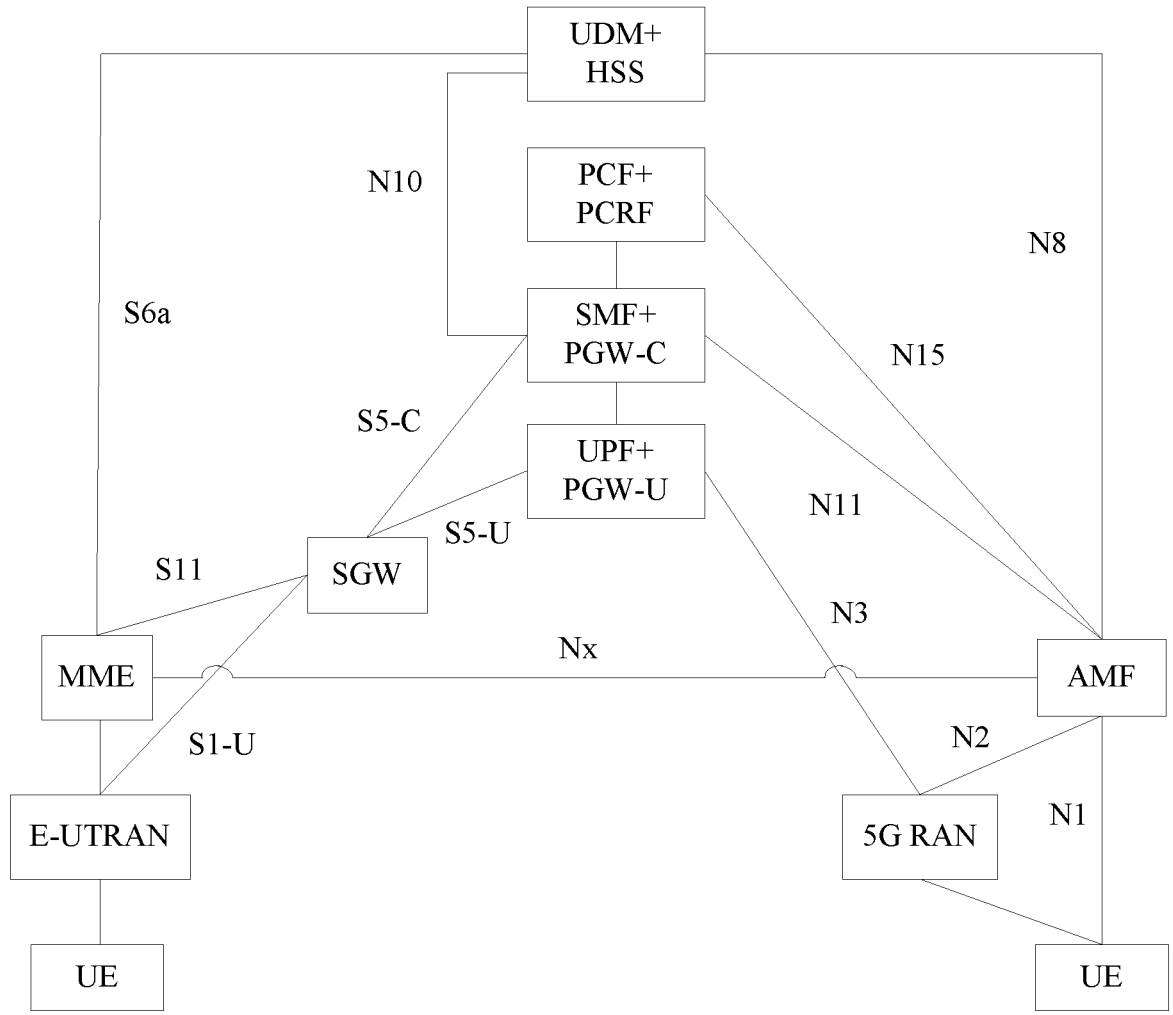
FIG. 1 is a system architectural diagram of a communications system according to an embodiment of this application.

Before this application is described, the technical terms involved in embodiments of this application are described first.

A protocol data network (PDN) connection (or Connectivity) is a combination of a group of EPS bearers that are set up on a UE in a first communications system (for example, a 4G network), and the EPS bearers have a same Internet Protocol (IP) address and a same access point name (APN). On a UE side and a network side, a PDN connection is identified using an IP address and an APN.

A PDN connection context includes an IP address, an APN, a PGW address, and context information of each EPS bearer that are used by a PDN connection.

An EPS bearer is a data transmission channel in the first communications system (for example, the 4G network). An active-state (or active) EPS bearer is an established data transmission channel with specific QoS in the first communications system. An inactive-state (or inactive) EPS bearer is a data transmission channel that has been deleted from the first communications system.

EPS bearer status information: In the first communications system (for example, the 4G network), each EPS bearer has an EPS bearer identifier (EBI), and the EPS bearer status information is used to indicate whether a bearer corresponding to each EBI exists. For example, EBIs shown in Table 1 are separately 0 to 15, and values corresponding to the EBIs are specifically shown in Table 1. In Table 1, when EBIs are 5 and 7, corresponding values are 1, and it indicates that corresponding EPS bearers exist; and values of other EBIs are 0, and it indicates that corresponding bearers do not exist.

TABLE 1

| EBI   | 7  | 6  | 5  | 4  | 3  | 2  | 1 | 0 |
|-------|----|----|----|----|----|----|---|---|
| Value | 1  | 0  | 1  | 0  | 0  | 0  | 0 | 0 |
| EBI   | 15 | 14 | 13 | 12 | 11 | 10 | 9 | 8 |
| Value | 0  | 0  | 0  | 0  | 0  | 0  | 0 | 0 |

An EPS bearer context includes information such as QoS information of an EPS bearer, an EPS bearer identifier, and a TFT.

A PDU session is a combination of a group of QoS flows flow established on the UE in a 5G network, and the QoS flows have a same IP address and a same data network name (DNN). On the UE side and the network side, a PDN session is identified using an IP address and a DNN.

A PDU session context includes an IP address, an APN, an SMF, and a UPF address that are used by a PDU session, and includes context information of each QoS flow.

A service and session continuity (SSC) mode of a PDU session: Each PDU session in a second communications system (for example, 5G) has a continuous description. An SSC mode 1 indicates that a PDU session can keep continuity in a moving process of the UE. An SSC mode 2 indicates that in a moving process, the UE can first release an existing PDU session and create a new PDU session to replace the released PDU session. An SSC mode 3 indicates that in a moving process, the UE can keep an existing PDU session for a period of time, and meanwhile create a new PDU session to replace the original PDU session, and after the existing PDU session expires, releases the existing PDU session and keeps only the new PDU session.

QoS flow information includes a combination of one or more of the following information: QoS information of a QoS flow, a QoS flow identifier (QFI), or a QoS flow template. For example, in the 5G communications system, the QoS information may further include a combination of one or more of the following information: a 5G QoS indicator (5QI), an allocation and retention priority (ARP), a guaranteed flow bit rate (GFBR), a maximum flow bit rate (MFBR), or notification control that correspond to the QoS. The QoS flow information is used to describe the QoS flow, and includes but is not limited to the previously described information. The QoS flow information may also be referred to as a QoS parameter, and the QoS flow information in the embodiments of this application may be replaced with the QoS parameter.

A protocol configuration option (PCO) is a parameter used for information transfer between the UE and a PDN Gateway (PGW), and a mobility management entity (MME) and a base station do not parse the PCO.

A difference between an extended PCO and the PCO is that because a size of the PCO is limited, the PCO is extended to carry more data, and therefore the extended PCO is obtained.

FIG. 1 shows a system architecture of a communications system applied to an embodiment of this application. The system architecture includes a first communications system and a second communications system. In FIG. 1, for example, the first communications system is a fourth generation (4G) communications system, and the second communications system is a fifth generation (5G) communications system.

Referring to FIG. 1, the communications system includes UE, an evolved Universal Mobile Telecommunications System (UMTS) terrestrial radio access network (E-UTRAN), a mobility management entity (MME), a serving gateway (SGW), a user plane function (UPF)+PDN gateway-user plane (PGW-U), a session management function (SMF)+PDN gateway-control plane (PGW-C), a policy control function (PCF)+policy and charging rules function (PCRF), a home subscriber server (HSS)+unified data management (UDM), an access and mobility management function (AMF), and a 5G radio access network (5G-RAN).

The E-UTRAN is a 4G-side base station, and the UE may access a 4G communications system using the base station. The 5G-RAN is a 5G-side base station, the UE may access a 5G communications system using the base station, and the 5G-RAN is a base station that is obtained after the E-UTRAN is further evolved and using which the UE can access the 5G communications system, or the 5G-RAN may be a base station that is dedicatedly used by the UE to access the 5G communications system. A core network entity in FIG. 1 may be referred to as a core network device.

The MME is a 4G core network device, and is responsible for performing authentication, authorization, mobility management, and session management on the UE, and a linked EPS bearer identifier (LBI) of a PDN connection of the UE in 4G is allocated by this entity.

The SGW is a 4G core network device (core network gateway), and is responsible for data forwarding, downlink data storage, and the like.

The UPF+PGW-U is a core network device shared by 4G and 5Q in other words, a core network device integrated in 4G and 5Q and includes a function of a UPF and a function of a PGW-U. The UPF is a user plane device of a 5G core network, provides a user plane service for a PDU session of the UE, and is an interface gateway between a carrier network and an external network. The PGW-U is a user plane device of a 4G core network, provides a user plane service for a PDN connection of the UE, and is an interface gateway between a carrier network and an external network. The UPF+PGW-U may also be referred to as a PGW-U+UPF provided that a device including the function of the UPF and the function of the PGW-U is the same as this device.

The SMF+PGW-C is a core network device shared by 4G and 5Q in other words, a core network device integrated in 4G and 5Q and includes a function of an SMF and a function of a PGW-C. The SMF is a control plane device of the 5G core network, provides a control plane service for the PDU session of the UE, manages a 5G PDU session and 5G QoS, and is responsible for allocating an IP address to the UE and selecting a UPF for the UE. The PGW-C is a control plane device of the 4G core network, provides a user plane service for the PDN connection of the UE, and is responsible for allocating an IP address to the UE and setting up an EPS bearer for the UE. The SMF+PGW-C may also be referred to as a PGW-C+SMF provided that a device including the function of the SMF and the function of the PGW-C is the same as this device.

The PCF+PCRF is a core network device shared by 4G and 5Q in other words, a core network device integrated in 4G and 5Q and includes a PCF and a PCRF. The PCRF is a 4G core network device, and is responsible for generating a policy used by a user to set up a data bearer. The PCF is a 5G core network device, and has a function similar to that of the PCRF. The PCF+PCRF may also be referred to as a PCRF+PCF provided that a device including a function of the PCF and a function of the PCRF is the same as this device.

The UDM+HSS is a core network device shared by 4G and 5Q in other words, a core network device integrated in 4G and 5Q and includes an HSS and a UDM. The HSS is a 4G core network device, and is configured to store subscription data of the user. The SDM is a 5G core network device, and is configured to store the subscription data of the user. The UDM+HSS may also be referred to as an HSS+UDM provided that a device including a function of the HSS and a function of the UDM is the same as this device.

The AMF is a 5G core network device, and is used to authenticate and authorize the user and manage mobility of the user.

An Nx interface is an interface between the MME and the AMF. Currently, this interface is optional. When the UE moves between 4G and 5G a UE context may be transferred using the Nx interface. When a PDN connection established by the UE in the 4G network can be seamlessly transferred to the 5G network, the MME selects, for the UE, the SMF+PGW-C integrated in 5G and 4G Seamless transfer means that an IP address remains unchanged and the PGW-C remains unchanged.

Figure 2:
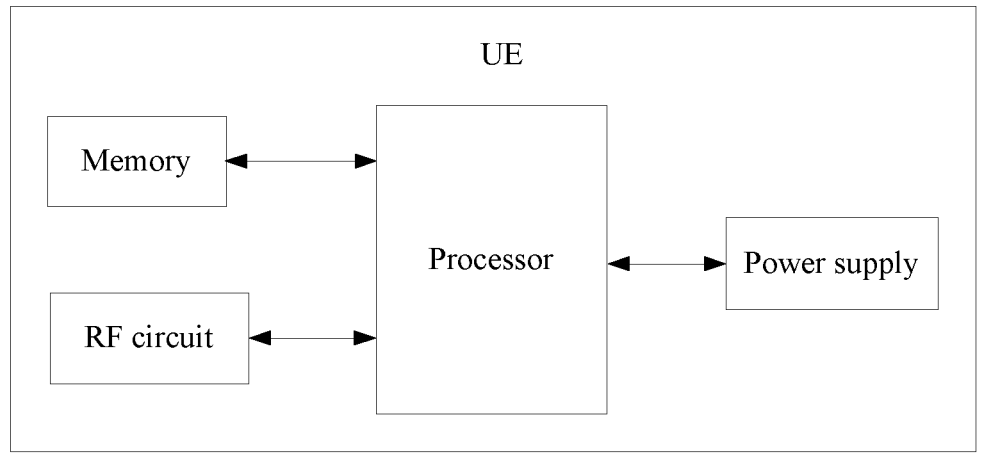
FIG. 2 is a schematic structural diagram of user equipment according to an embodiment of this application.

FIG. 2 is a schematic structural diagram of UE according to an embodiment of this application. The UE may be a mobile phone, a tablet computer, a notebook computer, a netbook, a portable electronic device, or the like. As shown in FIG. 2, the UE may include parts such as a memory, a processor, a radio frequency (RF) circuit, and a power supply. The memory may be configured to store a software program and a module. The processor runs the software program and the module that are stored in the memory, to execute various function applications of the UE and perform data processing. The memory may mainly include a program storage area and a data storage area. The program storage area may store an operating system, an application program required by at least one function, and the like, and the data storage area may store data created based on use of the UE, and the like. In addition, the memory may include a high-speed random access memory, and may further include a nonvolatile memory and the like. The processor is a control center of the UE, and is connected to all parts of the entire UE using various interfaces and cables. The processor runs or executes the software program and/or the module stored in the memory, and invokes data stored in the memory, to perform various functions of the UE and process data, such that overall monitoring is performed on the UE. Optionally, the processor may include one or more processing units. An application processor and a modem processor may be integrated into the processor. The application processor mainly processes an operating system, a user interface, an application program, and the like, and the modem processor mainly processes wireless communication. The RF circuit may be configured to receive and send information, or receive and send a signal during a call. Generally, the RF circuit includes but is not limited to an antenna, at least one amplifier, a transceiver, a coupler, a low noise amplifier (LNA), a duplexer, and the like. The UE further includes the power supply that supplies power to each part. The power supply may be logically connected to the processor using a power management system, in order to implement functions such as charging management, discharging management, and power consumption management using the power management system.

Although not shown, the UE may further include an input unit, a display unit, a sensor module, an audio module, a WiFi module, a Bluetooth module, and the like, and details are not described herein.

Figure 3:
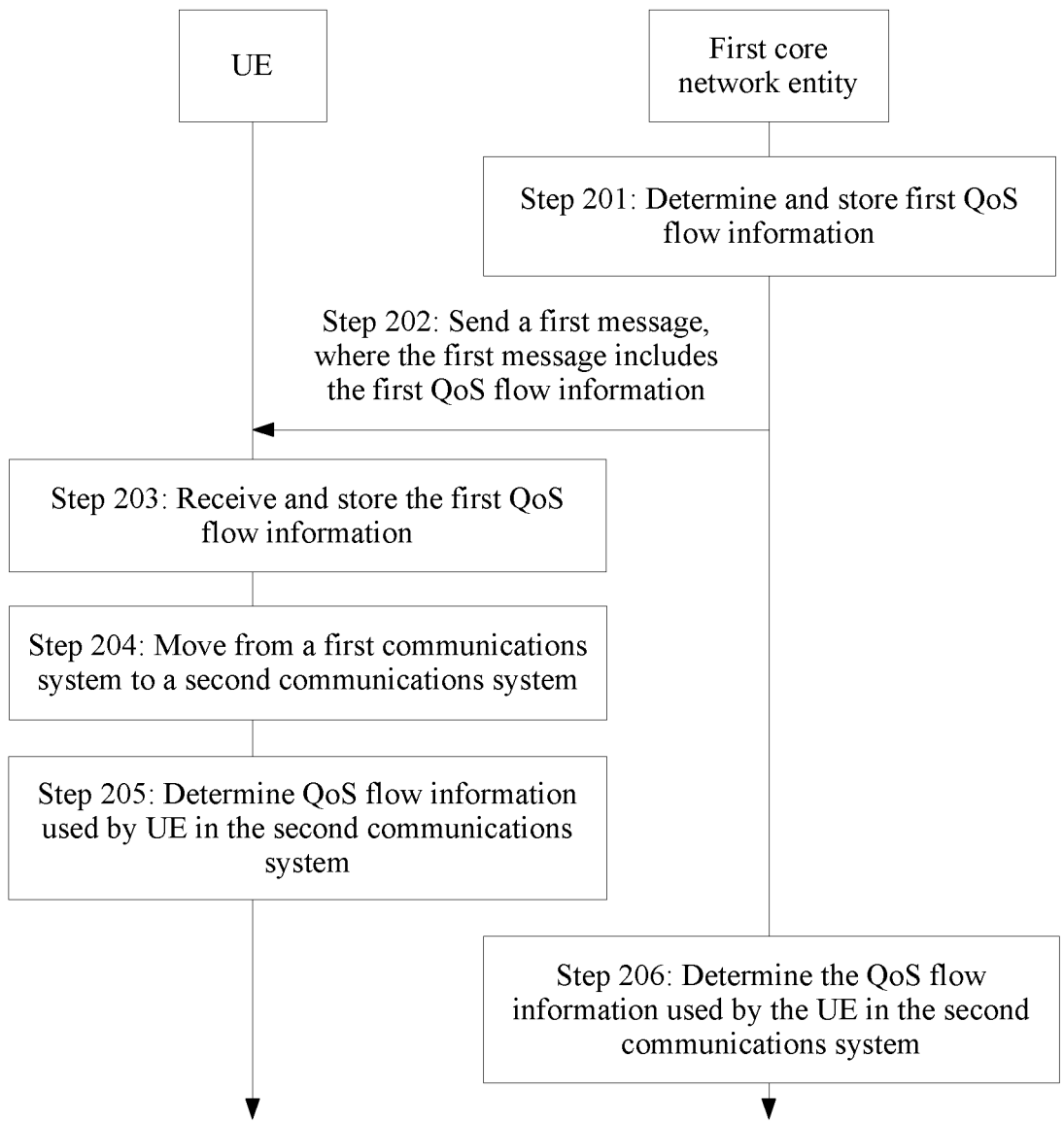
FIG. 3 is a flowchart of a first method for moving between communications systems according to an embodiment of this application.

FIG. 3 is a flowchart of a method for moving between communications systems according to an embodiment of this application. Referring to FIG. 3, the method is applied to the communications system shown in FIG. 1, and is used to move a UE from a first communications system to a second communications system. The method may include the following several steps.

Step 201: A first core network entity determines first QoS flow information that is of the second communications system and that is corresponding to a first EPS bearer of the UE in the first communications system, and stores the first QoS flow information.

A PDN connection in the first communications system corresponds to a PDU session in the second communications system. One PDN connection may include a plurality of EPS bearers, and one PDU session may include a plurality of QoS flows. The UE may establish a plurality of PDN connections in the first communications system, and there may be one or more PDN connections that can be moved to the second communications system in the plurality of PDN connections. The PDN connection that can be moved to the second communications system means that a PGW used by the PDN connection is an SMF+PGW-C integrated in 4G and 5G; or means that when the UE moves from the first communications system to the second communications system, a PDU session corresponding to the PDN connection can be established in the second communications system, and the PDN connection has a same IP address as the PDU session; or means that a PGW used by the PDN connection is an SMF+PGW-C integrated in 4G and 5G and when the UE moves from the first communications system to the second communications system, a PDU session corresponding to the PDN connection can be established in the second communications system, and the PDN connection has a same IP address as the PDU session.

The first EPS bearer is an EPS bearer included in the PDN connection established by the UE in the first communications system, and may be one EPS bearer or a group of EPS bearers. A first QoS flow corresponds to the first EPS bearer, and the first QoS flow may include one QoS flow or a group of QoS flows. One EPS bearer may correspond to one or more QoS flows. The first QoS flow information is information obtained after the first EPS bearer is mapped to a QoS flow in the second communications system, for example, mapping is performed based on a predefined mapping rule. Alternatively, the first QoS flow information is generated based on the first EPS bearer. Not all EPS bearers on the UE can be moved to the second communications system. For example, a non-GBR EPS bearer cannot be moved to the second communications system. Alternatively, when a PDN connection cannot be moved to the second communications system, none of EPS bearers corresponding to the PDN connection can be moved to the second communications system. An EPS bearer that cannot be moved to the second communications system has no corresponding QoS flow information.

In this embodiment of this application, the first QoS flow information may include one or more QoS rules. When the first EPS bearer is a default bearer, the first QoS flow information includes one or more of the following information: a session aggregation maximum bit rate (AMBR), an SSC mode, a PDU session identifier, or a QoS rule. The QoS rule may be one QoS rule, or may be a plurality of QoS rules. For example, the QoS rule includes one or more of the following information: a QoS rule identifier, a QoS flow identifier, precedence (precedence), or a packet filter. Alternatively, the QoS rule includes one or more of the following information: a QoS rule identifier, a QoS flow identifier, precedence, or a packet filter identifier. The packet filter includes a packet filter attribute and a packet filter identifier (ID). The first QoS flow information may further include a combination of one or more of the following information: a 5QI, an ARP, a GFBR, an MFBR, or notification control that are of the QoS flow. It may be understood that a default bearer of the UE is set up in a process in which the UE establishes a PDN connection in the first communications system. In other words, to set up a default bearer for the UE may be understood as establishing a PDN connection for the UE. For example, the UE may request, using an attach request or a PDN connection establishment request, to establish the PDN connection. In a process of establishing a PDN connection for the UE in the first communications system, information about a PDU session that is of the second communications system and that is corresponding to the PDN connection is sent to the UE using a request message used for setting up a default bearer. The information about the PDU session includes one or more of a session aggregation maximum bit rate (AMBR), an SSC mode, or a PDU session identifier.

For example, a method used by the SMF+PGW-C to determine first QoS flow information of a 5G communications system may be: The SMF+PGW-C generates a 5G QoS rule based on a traffic flow template (TFT) of an EPS context. The method specifically includes generating the QoS rule based on one or more policy and charging control (PCC) rules used for generating a TFT of an EPS bearer. Precedence of each PCC is set to precedence of the QoS rule, and one or more packet filters of the PCC are set to a packet filter of the QoS rule. In addition, the SMF+PGW-C may further allocate a QoS rule identifier to the QoS rule. For example, the SMF+PGW-C may further set a QCI of the EPS bearer to a 5G 5QI, set a GBR of the EPS bearer to a 5G GFBR, set an MBR of the EPS bearer to a 5G MFBR, and set an EBI of a default bearer of the PDN connection to a 5G PDU session identifier.

The method may further include: obtaining, by the UE, a first QoS flow identifier (QFI). The first QoS flow identifier is obtained after the UE adds a specific value to a first EPS bearer identifier (EBI), or the first QoS flow identifier is obtained after the UE adds a specific field to a first EPS bearer identifier.

For example, a QFI is obtained after a specific value is added to an EBI, and for example, the specific value is 10. If the EBI is 5, the QFI is 15, and if the EBI is 6, the QFI is 16. For another example, a QFI is obtained after a specific field is added to an EBI, and for example, the specific field is one byte. If the EBI is one byte, the QFI is obtained after one byte is added after the EBI. If the one byte of the EBI is 00000101, the QFI is two bytes obtained after one byte is added: 00000101 00000001.

It should be noted that specific numerical values of the specific value and the specific field may be set based on a requirement, and this is not specifically limited in this embodiment of the present disclosure.

In addition, that the first core network entity stores the first QoS flow information may include: storing, by the first core network entity, a correspondence between the first EPS bearer identifier (EBI) and the first QoS flow information; or storing, by the first core network entity, a correspondence between a first EPS bearer context and the first QoS flow information; or storing, by the first core network entity, a correspondence between the first QoS flow identifier and a first EPS bearer context; or storing, by the first core network entity, a correspondence between a first EPS bearer context and both the first QoS flow identifier and a session identifier, where the session identifier herein is an identifier of a PDU session to which the first QoS flow belongs; or storing a correspondence between the first EPS bearer and the first QoS flow; or storing a correspondence between the first EPS bearer and index information of the first QoS flow, where the index information includes the first QoS flow identifier or a combination of the first QoS flow identifier and a PDU session identifier. The first core network entity may store the first QoS flow information in a bearer context of the first EPS bearer of the UE; or the first core network entity generates a QoS flow context of the second communications system for the UE, and the QoS flow context includes an EBI or first EPS bearer information.

In this embodiment of this application, the first communications system may be a 4G communications system, the second communications system may be a 5G communications system, and the first core network entity may be a network element SMF+PGW-C integrated in the two communications systems, such that the SMF+PGW-C may determine first QoS flow information in the 5G communications system based on an EPS bearer context of the UE in the 4G communications system. The QoS flow information may also be referred to as a 5G QoS rule or a 5G QoS parameter. The first QoS flow information includes a combination of one or more of the following information: QoS information of the QoS flow, a QoS flow identifier (QFI), a QoS rule, information about a PDU session to which the QoS flow belongs, or a QoS flow template. The QoS information further includes a combination of one or more of the following information: a 5QI, an ARP, a GFBR, an MFBR, or notification control that are of the QoS.

For example, the SMF+PGW-C may generate QoS of a 5G QoS flow based on QoS of an EPS bearer in the first EPS bearer, and generate a 5G QoS flow template or a QoS rule based on a TFT of the EPS bearer.

Step 202: The first core network entity sends a first message, where the first message is used to set up or modify the first EPS bearer for the UE in the first communications system, and the first message includes the first QoS flow information.

When the first core network entity sets up or modifies the first EPS bearer for the UE in the first communications system, the first core network entity may send the first message that includes the first QoS flow information to the UE, such that the UE obtains the first QoS flow information corresponding to the first EPS bearer.

If the first message is used to set up the first EPS bearer for the UE in the first communications system, the foregoing step 201 includes: The first core network entity maps the first EPS bearer context to the first QoS flow information of the second communications system. If the first message is used to modify the first EPS bearer for the UE in the first communications system, the foregoing step 201 includes: The first core network entity maps a context of the modified first EPS bearer to the first QoS flow information of the second communications system. The mapping described herein may be understood as generating the first QoS flow information based on the first EPS bearer context, or performing mapping based on a predefined mapping rule. The first QoS flow information may be the complete first QoS flow information obtained after the first core network entity performs mapping; or the first QoS flow information may be partial information of the first QoS flow information obtained after the first core network entity performs mapping, and the partial information is first QoS flow information that the UE cannot obtain through local mapping. For example, the partial information includes partial QoS rule information and partial PDU session information. The partial QoS rule information includes one or more of a QoS rule ID, precedence, or a packet filter identifier, and the partial PDU session information includes one or more of a session AMBR, an SSC mode, or a PDU session identifier. Sending the partial information can reduce an amount of transmitted air interface data and save resources.

In the communications system shown in FIG. 1, the first core network entity SMF+PGW-C may send the first QoS flow information to the SGW using the first message, the SGW forwards the first QoS flow information to the MME, and then the MME sends the first QoS flow information to the UE; or the first core network entity SMF+PGW-C may send the first QoS flow information to the SGW, the SGW forwards the first QoS flow information to the MME, and then the MME sends the first QoS flow information to the UE using the first message. The first message may include a PCO, and the first QoS flow information may be included in the PCO. The PCO may be a common PCO, or may be an extended PCO.

If the first message is used to set up the first EPS bearer for the UE in the first communications system, the method further includes: allocating, by the first core network entity, a QoS flow identifier to the UE, such as allocating a corresponding QoS flow identifier to the QoS flow included in the first QoS flow information determined in step 201; or mapping the bearer identifier of the first EPS bearer to a QoS flow identifier. If the first message is used to modify the first EPS bearer for the UE in the first communications system, the method further includes: determining, by the first core network entity, that the first EPS bearer has the corresponding first QoS flow information of the second communications system, such as determining, by the first core network entity, whether the first EPS bearer of the UE in the first communications system has the corresponding first QoS flow information of the second communications system; and if the first core network entity determines that the first EPS bearer has the corresponding first QoS flow information, determining the first QoS flow information based on step 201. That the first EPS bearer has the corresponding first QoS flow information of the second communications system may be understood as: Context information of the first EPS bearer includes the first QoS flow information, or the UE separately stores the first EPS bearer context and the first QoS flow information. The context information of the first EPS bearer includes index information of the first QoS flow, and the index information may be a QoS flow ID or a combination of a QoS flow ID and a PDU session ID. In this embodiment of this application, the QoS flow information and the information about the QoS flow have a same meaning, and another part of this specification has a same understanding. Details are not described.

Step 203: When the UE receives the first message sent by the first core network entity, the UE may store the first QoS flow information.

When the UE receives the first message that is sent by the first core network entity and that includes the first QoS flow information, the UE may store the first QoS flow information. When the UE stores the first QoS flow information, the UE may store the correspondence between the bearer identifier of the first EPS bearer and the first QoS flow information; or the UE stores the correspondence between the first EPS bearer context and the first QoS flow information; or the UE stores the correspondence between the first EPS bearer context and the index information of the first QoS flow, where the index information may be a QoS flow ID or a combination of a QoS flow ID and a PDU session ID; or the UE adds the first QoS flow information to the first EPS bearer context; or the UE separately stores the first EPS bearer context and the first QoS flow information, and the UE adds the index information of the first QoS flow to the context information of the first EPS bearer, where the index information may be a QoS flow ID or a combination of a QoS flow ID and a PDU session ID; or the UE stores the correspondence between the first EPS bearer and the first QoS flow; or the UE stores the correspondence between the first EPS bearer and the index information of the first QoS flow, where the index information includes the first QoS flow identifier or a combination of the first QoS flow identifier and the PDU session identifier. Further, the UE may store the correspondence between the bearer identifier of the first EPS bearer and the first QoS flow information. This may be understood as storing, in the first EPS bearer context, the correspondence between the bearer identifier of the first EPS bearer and the first QoS flow information. That the UE stores the correspondence between the first EPS bearer and the first QoS flow information may be understood as storing the first QoS flow information in the first EPS bearer context, or adding the index information of the first QoS flow to the context information of the first EPS bearer, where the index information may be a QoS flow ID or a combination of a QoS flow ID and a PDU session ID. The PDU session ID herein is an ID of a PDU session to which a QoS flow belongs, to be specific, a PDU session indicated by the PDU session ID includes the first QoS flow.

Step 204: The UE moves from the first communications system to the second communications system.

Optionally, the UE moves from the first communications system to the second communications system using a handover process. The UE receives a handover command (handover command) in the handover process. The handover command includes index information of one or more QoS flows, and the index information includes a QoS flow identifier or a combination of a QoS flow identifier and a PDU session identifier. The handover command is sent by a base station in the first communications system to the UE, and the handover command includes configuration information allocated by a base station in the second communications system to the UE. The configuration information is used by the UE to access the base station in the second communications system. The configuration information includes a QoS flow identifier or a combination of a QoS flow identifier and a PDU session ID.

Step 205: The UE determines, based on a first condition, QoS flow information used by the UE in the second communications system, where the first condition includes the first QoS flow information.

The first QoS flow information in step 205 is consistent with the first QoS flow information in step 201. Similarly, for a method used by the UE to determine the first QoS flow information, refer to descriptions in step 201. Details are not described herein again in this embodiment of this application.

Optionally, after the UE receives the handover command, a method used by the UE to determine the QoS flow information used in the second communications system may be as follows: The UE associates a currently used EPS bearer with the index information that is of the QoS flow and that is included in the handover command, and the UE deletes an EPS bearer that is in the currently used EPS bearer and that fails to be associated with the index information of the QoS flow. The currently used EPS bearer may be understood as an ongoing EPS bearer on the UE, or an active-state EPS bearer on the UE.

That the UE associates a currently used EPS bearer with the index information that is of the QoS flow and that is included in the handover command includes: obtaining, by the UE, an EPS bearer context corresponding to the index information of the QoS flow; or obtaining, by the UE, an EPS bearer identifier corresponding to the index information of the QoS flow. For example, the UE obtains the index information of the QoS flow from the handover command, and the UE locally searches for the EPS bearer context or the EPS bearer identifier corresponding to the index information. The UE locally deletes an EPS bearer other than an EPS bearer that can be found on the UE.

Step 206: In a process in which the UE moves from the first communications system to the second communications system, or after the UE moves from the first communications system to the second communications system, the first core network entity determines, based on a fourth condition, the QoS flow information used by the UE in the second communications system, where the fourth condition includes the first QoS flow information.

The QoS flow information used by the UE in the second communications system may be QoS flow information corresponding to one or more PDU sessions of the UE; or may be information about one or more PDU sessions of the UE, and when the QoS flow information includes information about a plurality of PDU sessions, corresponding information may be referred to as an information set. For example, the QoS flow information may be understood as a set of one or more pieces of QoS flow information, or may be understood as a set of one or more pieces of PDU session information. It may be understood that if the QoS flow information includes only one piece of QoS flow information or only one piece of PDU session information, the set includes only one piece of QoS flow information or only one piece of PDU session information. Another part of this specification has a same understanding. Details are not described again.

For example, the UE and the first core network entity may determine, based on the first QoS flow information included in the first condition, the QoS flow information that may be used by the UE in the second communications system, such that the UE maps an EPS bearer in the first communications system to a QoS flow in the second communications system, and the UE is seamlessly transferred from the first communications system to the second communications system, and can communicate with or transmit data to the second communications system using the QoS flow information.

It should be noted that there may be no sequence between step 204 and both step 205 and step 206. For the UE, the UE may first move from the first communications system to the second communications system, and then determine the QoS flow information used in the second communications system; or the UE first determines the QoS flow information used in the second communications system, and then moves from the first communications system to the second communications system; or in the process of moving from the first communications system to the second communications system, the UE determines the QoS flow information used in the second communications system. This is not specifically limited in this embodiment of this application. In the example for description in FIG. 3, step 204 is performed before step 205 and step 206.

Figure 4:
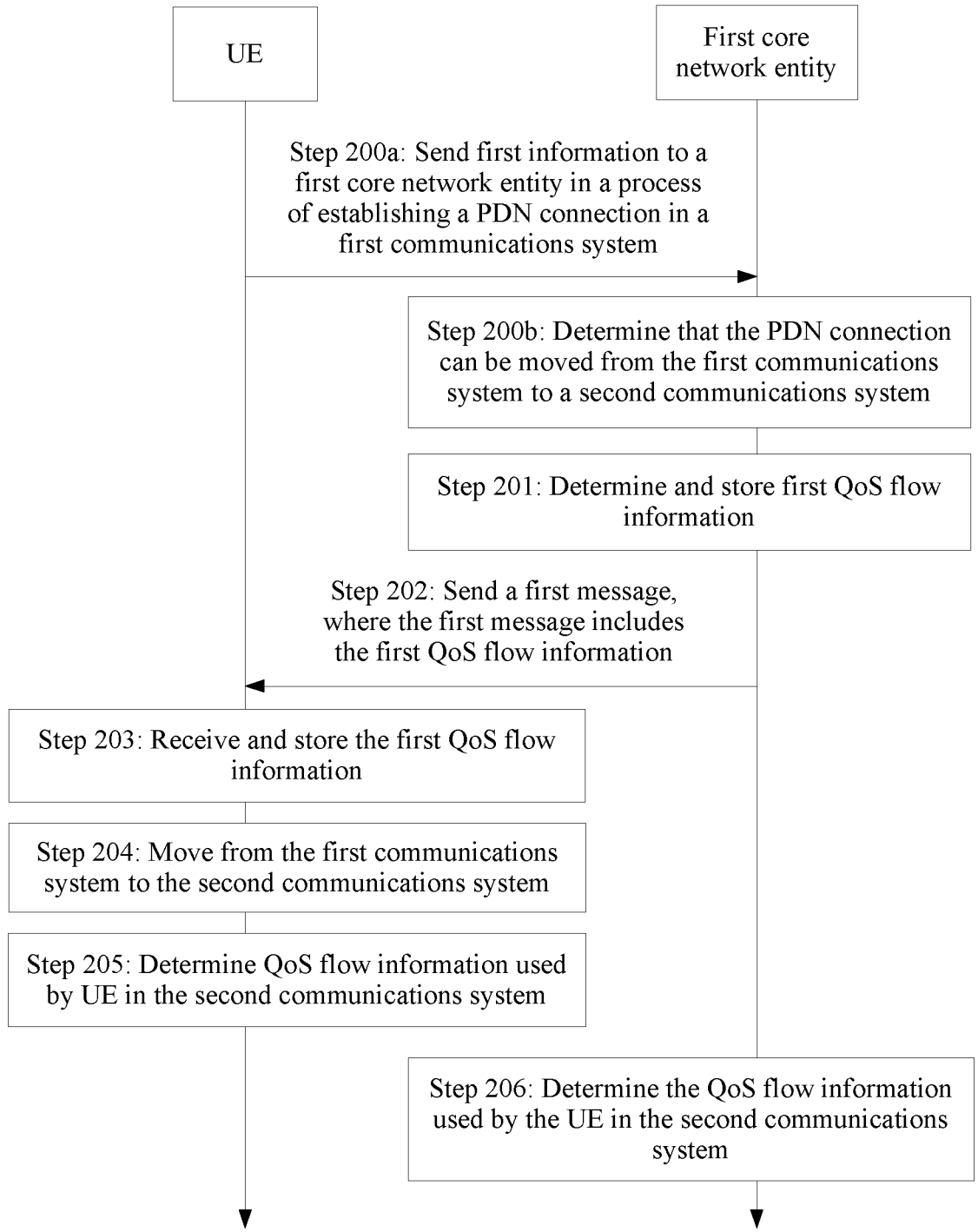
FIG. 4 is a flowchart of a second method for moving between communications systems according to an embodiment of this application.

Referring to FIG. 4, before step 201, the method further includes step 200a and step 200b.

Step 200a: The UE sends first information to the first core network entity in a process of establishing a PDN connection in the first communications system, where the first information is used by the first core network entity to determine that the PDN connection can be moved from the first communications system to the second communications system.

The PDN connection may be established in an attach process, or may be established based on a PDN connection establishment request requested by the UE.

In addition, the first information includes information used to indicate that the PDN connection can be moved to the second communications system, to be more specific, the first information includes information that is directly used to indicate that the PDN can be moved to the second communications system. Alternatively, the first information includes information used to indicate that a service and session continuity SSC mode of a PDU session corresponding to the PDN connection in the second communications system is a specified mode, and the specified mode may be preset. To be more specific, the first information includes information that is indirectly used to indicate that the PDN can be moved to the second communications system. For example, the specified mode may be a mode 1 in the SSC mode, to be specific, when the first information includes information used to indicate that the SSC mode of the PDU session corresponding to the PDN connection in the second communications system is the mode 1, it indicates that the PDN connection can be moved to the second communications system.

In the process of establishing the PDN connection in the first communications system, the UE may send the first information to the first core network entity using a PCO, to be more specific, the first information is included in the PCO. The PCO may be a common PCO, or may be an extended PCO.

Step 200b: When the first core network entity receives the first information sent by the UE, the first core network entity determines, based on the first information, that the PDN connection can be moved from the first communications system to the second communications system.

If the first information includes the information used to indicate that the PDN connection can be moved to the second communications system, when the first core network entity receives the first information sent by the UE, the first core network entity may directly determine that the PDN connection can be moved from the first communications system to the second communications system. If the first information includes the information used to indicate that the SSC mode of the PDU session corresponding to the PDN connection in the second communications system is the specified mode, when the first core network entity receives the first information sent by the UE, the first core network information determines whether the SSC mode indicated in the first information is the specified mode, and if the SSC mode is the specified mode, the first core network entity determines that the PDN connection can be moved from the first communications system to the second communications system.

Figure 4A:
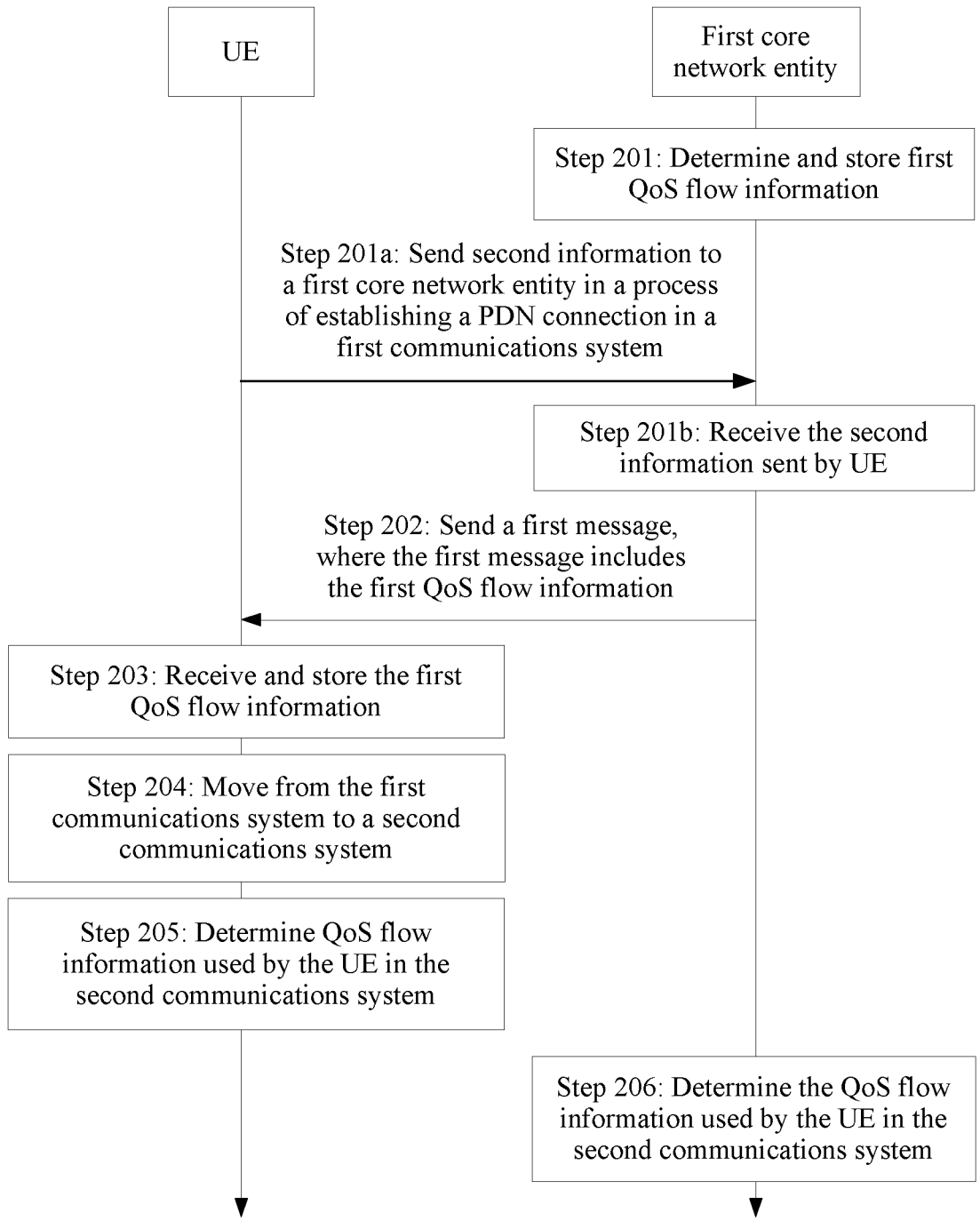
FIG. 4A is a flowchart of a third method for moving between communications systems according to an embodiment of this application.

Referring to FIG. 4A, in the process of establishing the PDN connection in the first communications system, before step 202 in which the first core network entity sends the first message, the method further includes step 201a and step 201b. A function of the SSC mode in FIG. 4 is different from a function of an SSC mode in FIG. 4A. The SSC mode in FIG. 4 is the specified mode, and is used to indicate that the PDN connection can be moved to the second communications system. The SSC mode in FIG. 4A is an SSC mode that is expected by the UE and that is of the PDU session corresponding to the PDN connection in the second communications system.

Step 201a: The UE sends second information to the first core network entity in a process of establishing a PDN connection in the first communications system, where the second information is used to indicate an SSC mode of a PDU session corresponding to the PDN connection in the second communications system.

For example, in the process of establishing the PDN connection in the first communications system, the UE may send the second information to the first core network entity using a PCO, to be more specific, the second information is included in the PCO. The PCO may be a common PCO, or may be an extended PCO.

In step 201a, the UE may first send an attach request message or a PDU session create request message to an MME, and add the second information to a PCO of the message. The MME sends a session create request to the first core network entity using an SGW, and the session create request carries the PCO.

Step 201b: The first core network entity receives the second information sent by the UE, where the second information is used to indicate an SSC mode of a PDU session corresponding to the PDN connection in the second communications system.

After receiving the second information, the first core network entity may determine, based on the SSC mode indicated by the second information, the SSC mode of the PDU session corresponding to the PDN connection in the second communications system, or the first core network entity determines, based on the SSC mode indicated by the second information and based on subscription data of the UE, the SSC mode of the PDU session corresponding to the PDN connection in the second communications system. The determined SSC mode of the PDU session may be an indicated SSC mode, or may be another SSC mode. For example, if the UE requests an SSC mode 1, and subscription of the UE supports SSC modes 1 and 2, the determined SSC mode of the PDU session is 1; and if the UE requests an SSC mode 1, and subscription of the UE supports an SSC mode 2, the determined SSC mode of the PDU session is 2.

Further, the process in which the UE moves from the first communications system to the second communications system in step 204 may have two different cases based on whether the UE is in an idle state or a connected state. The two cases are separately described below. That the UE moves from the first communications system to the second communications system in an idle state is such that the UE moves to the second communications system using a reselect process. For example, when the UE detects that a signal of the base station in the first communications system weakens, the UE starts a cell search process, and after finding a signal of the base station in the second communications system, reselects the base station in the second communications system. That the UE moves from the first communications system to the second communications system in a connected state is such that the UE moves to the second communications system using a handover process. For example, when the base station in the first communications system receives a measurement report reported by the UE, and determines that the UE needs to be handed over to the base station in the second communications system, the base station in the first communications system initiates a handover process, and when the UE receives a handover command sent by the base station in the first communications system, the UE moves from the first communications system to the second communications system.

Case 1: The UE moves from the first communications system to the second communications system in an idle state. The UE may move from the first communications system to the second communications system in an idle state in the following two manners (I) and (II) that are specifically described as follows:

(I). The UE generates first EPS bearer status information based on a second condition, and sends the first EPS bearer status information to a second core network entity, such that the second core network entity returns a second message. The second message includes second EPS bearer status information, and the second core network entity is a core network entity such as an AMF that is in the second communications system and that is responsible for UE access and mobility management. Accordingly, the first condition in step 205 may further include the second EPS bearer status information.

The second condition includes the correspondence stored by the UE in step 203, to be more specific, the correspondence between the EBI of the first EPS bearer and the first QoS flow information, or the correspondence between the first EPS bearer and the first QoS flow information.

In addition, EPS bearer status information is a phrase, and the "first" in the first EPS bearer status information and the "second" in the second EPS bearer status information are used to define and differentiate between different EPS bearer status information. The first EPS bearer status information is used to identify an active-state (or Active) EPS bearer that is of the UE and that has corresponding QoS flow information, to be more specific, an EPS bearer identified in the first EPS bearer status information is an active-state EPS bearer that is of the UE and has corresponding QoS flow information and that is determined by the UE based on the correspondence. The second EPS bearer status information is used to identify an active-state EPS bearer that is of the UE and has corresponding QoS flow information and that is determined by the second core network entity. For example, the UE has four active-state EPS bearers in the first communications system, and EBIs corresponding to the four EPS bearers are separately 5, 6, 7, and 8. EPS bearers whose EBIs are 5 and 7 have corresponding QoS flow information, and EPS bearers whose EBIs are 6 and 8 have no corresponding QoS flow information. In the first EPS bearer status information reported by the UE, only EPS bearers whose EBIs are 5 and 7 are identified as active-state, and other bearers are identified as inactive-state (or inactive). Details are shown in the following Table 2.

TABLE 2

| EBI | 7 | 6 | 5 | 4 | 3 | 2 | 1 | 0 |
|---|---|---|---|---|---|---|---|---|
| Value | 1 | 0 | 1 | 0 | 0 | 0 | 0 | 0 |
| EBI | 15 | 14 | 13 | 12 | 11 | 10 | 9 | 8 |
| Value | 0 | 0 | 0 | 0 | 0 | 0 | 0 | 0 |

The UE generates the first EPS bearer status information based on the second condition, and sends the first EPS bearer status information to the second core network entity. The second core network entity may receive the first EPS bearer status information, obtain a PDN connection context of the UE from a core network entity MME in the first communications system, and determine the second information based on a sixth condition. The sixth condition includes the first EPS bearer status information and the PDN connection context. The second core network entity sends the second information to the first core network entity, and the first core network entity generates, based on a fifth condition, the QoS flow information used by the UE in the second communications system. The QoS flow information includes QoS flow information corresponding to the active-state EPS bearer that is of the UE and that is determined by the second core network entity, and the fifth condition includes the second information and the correspondence stored by the first core network entity. Then, the first core network entity may send third information to the second core network entity, where the third information is a generated bearer identifier of an EPS bearer corresponding to QoS flow information, such that the second core network entity generates the second EPS bearer status information based on a seventh condition, and sends the second EPS bearer status information to the UE using the second message. The seventh condition includes the third information. The QoS flow information may be understood as a set of one or more pieces of QoS flow information, or may be understood as a set of one or more pieces of PDU session information. It may be understood that if the QoS flow information includes only one piece of QoS flow information or only one piece of PDU session information, the set includes only one piece of QoS flow information or only one piece of PDU session information. Another part of this specification has a same understanding. Details are not described again.

The second information includes an EPS bearer identifier EBI that can be moved to the second communications system; or includes a linked bearer identifier LBI) and an EPS bearer identifier (EBI); or includes a PDN connection context, where the PDN connection context includes an EPS bearer context that can be moved to the second communications system. If the second information includes the EBI that can be moved to the second communications system, or includes the linked bearer identifier and the EPS bearer identifier, the first core network entity generates the QoS flow information based on the EPS bearer identifier and the stored correspondence, or generates second QoS flow information based on the linked bearer identifier, the EPS bearer identifier, and the stored correspondence. If the second information includes the PDN connection context, the first core network entity maps the PDN connection context to second QoS flow information based on the stored correspondence.

Figure 5:
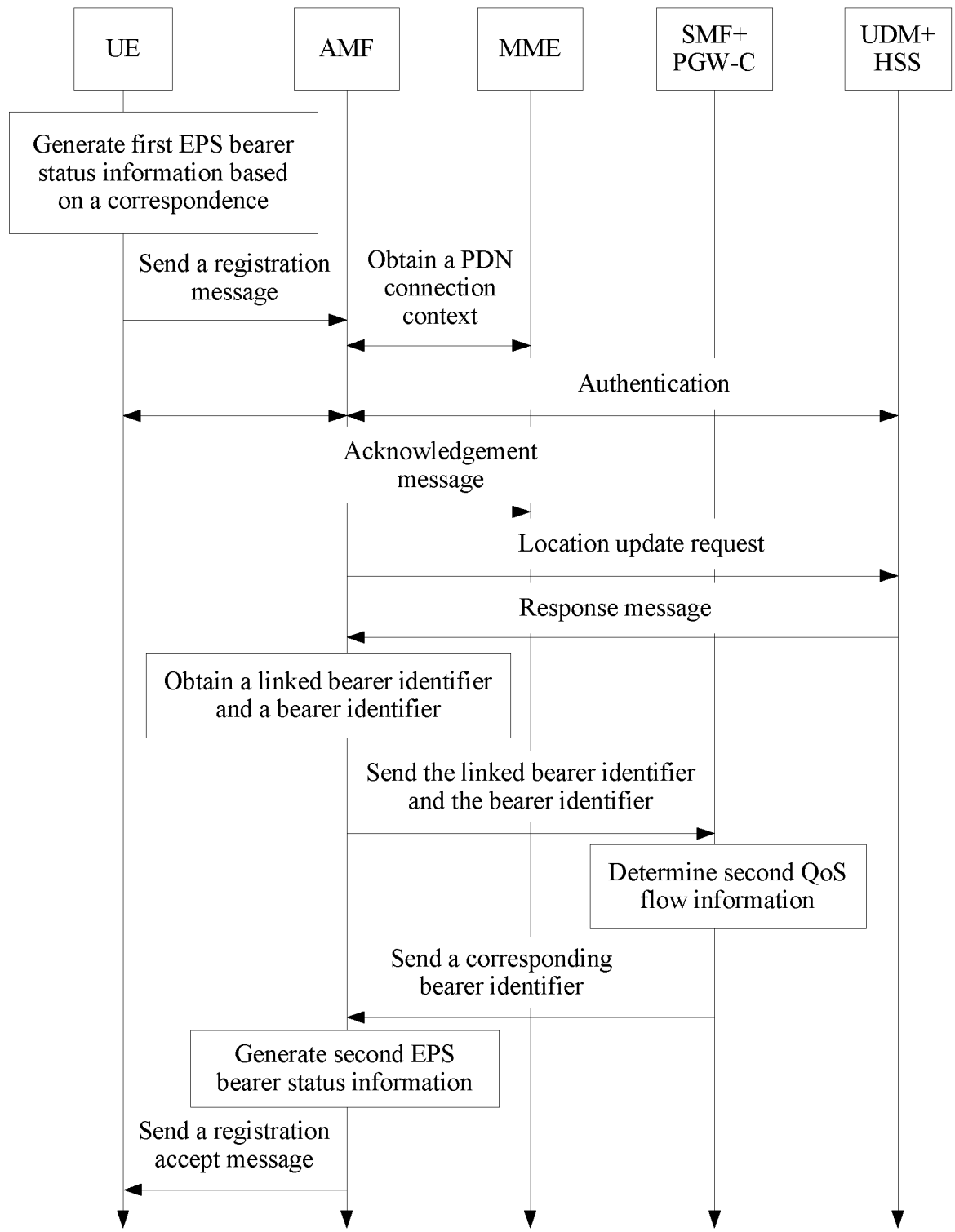
FIG. 5 is a flowchart of moving, by a UE, to a second communications system according to an embodiment of this application.

In this embodiment of this application, the first core network entity may be an SMF+PGW-C, and the second core network entity may be an AMF. As shown in FIG. 5, the UE may send a registration request to the AMF, and the registration request may carry an identifier of the UE and the first EPS bearer status information. When the AMF receives the registration request, the AMF may obtain, based on the identifier of the UE, an MME that serves the UE, and request the MME for the PDN connection context of the UE. The AMF performs an authentication and authentication process on the UE, returns a PDN connection context acknowledgement message to the MME, and sends a location update request to a UDM+HSS, and the UDM+HSS returns a response message. The AMF obtains, based on the first EPS bearer status information sent by the UE and based on the PDN connection context obtained from the MME, a PDN connection that can be moved from the first communications system (for example, 4G) to the second communications system (for example, 5G) and an EPS bearer on the PDN connection, and obtains a corresponding SMF+PGW-C address. Then, the AMF obtains a linked bearer identifier and a bearer identifier corresponding to the PDN connection that can be moved to the second communications system, and sends the linked bearer identifier and the bearer identifier to the SMF+PGW-C, and the SMF+PGW-C generates the second QoS flow information based on a stored correspondence, the linked bearer identifier, and the bearer identifier. Alternatively, the AMF obtains a PDN connection context that can be moved to the second communications system, and sends the PDN connection context to the SMF+PGW-C, and the SMF+PGW-C maps the received PDN connection context to the second QoS flow information based on a stored correspondence. Finally, the SMF+PGW-C sends, to the AMF, a generated bearer identifier of an EPS bearer corresponding to the second QoS flow information, such that the AMF generates the second EPS bearer status information based on the bearer identifier, and returns the second EPS bearer status information to the UE using a registration accept message.

Accordingly, step 205 includes: The UE determines, based on the stored correspondence and the second EPS bearer status information, the QoS flow information used by the UE in the second communications system.

Optionally, a process in which the AMF obtains the PDN connection that can be moved from the first communications system (for example, 4G) to the second communications system (for example, 5G) and the EPS bearer on the PDN connection, and obtains the corresponding SMF+PGW-C address may include: The AMF obtains, based on an EPS bearer intersection set between the first EPS bearer status information and a bearer context in the PDN connection context, the PDN connection that can be moved to the second communications system and the EPS bearer on the PDN connection, and the AMF may obtain the SMF+PGW-C address based on the PDN connection context.

For example, when the first message is a registration accept message, an N1 session management (SM) information parameter includes the first QoS flow information; or when the first message is a PDU session modification message, an N1 session management information parameter of the PDU session modification message includes the first QoS flow information.

(II). The UE generates first QoS flow status information based on a third condition, and sends the first QoS flow status information to a second core network entity, such that the second core network entity returns a second message. The second message includes second QoS flow status information, and the second core network entity is a core network entity that is in the second communications system and that is responsible for UE access and mobility management. Accordingly, the first condition in step 205 may further include the second QoS flow status information.

The third condition includes the correspondence stored by the UE in step 203, to be more specific, the correspondence between the EBI of the first EPS bearer and the first QoS flow information, or the correspondence between the first EPS bearer context and the first QoS flow information, or the correspondence between the first EPS bearer context and the index information of the first QoS flow.

In addition, QoS flow status information is a phrase, and the "first" in the first QoS flow status information and the "second" in the second QoS flow status information are used to define and differentiate between different QoS flow status information. The first QoS flow status information is used to identify a QoS flow corresponding to an active-state EPS bearer of the UE, to be specific, a QoS flow identified in the first QoS flow status information is a QoS flow that is corresponding to an active-state EPS bearer and that is determined by the UE based on the correspondence. The second QoS flow status information is used to identify a QoS flow that is corresponding to an active-state EPS bearer of the UE and that is determined by the second core network entity. Herein, the QoS flow corresponding to the active-state EPS bearer of the UE may be understood as a QoS flow corresponding to an active-state EPS bearer that has the corresponding QoS flow. In other words, the active-state EPS bearer may be understood as an EPS bearer that is in an active state and that has a corresponding QoS flow. Another part of this specification has a same understanding. Details are not described again.

The UE generates the first QoS flow status information based on the third condition, and sends the first QoS flow status information to the second core network entity. The second core network entity receives the first QoS flow status information, obtains a PDN connection context of the UE from a core network entity MME in the first communications system, and sends the first QoS flow status information and the PDN connection context to the first core network entity, such that the first core network entity generates second QoS flow information of the UE in the second communications system based on a fifth condition. The fifth condition includes the first QoS flow status information and the PDN connection context. Then, the first core network entity may return the second QoS flow information to the second core network entity, such that the second core network entity generates the second QoS flow status information, to be more specific, the second information determined by the second core network entity, and returns the second QoS flow status information to the UE using the second message.

Figure 6:
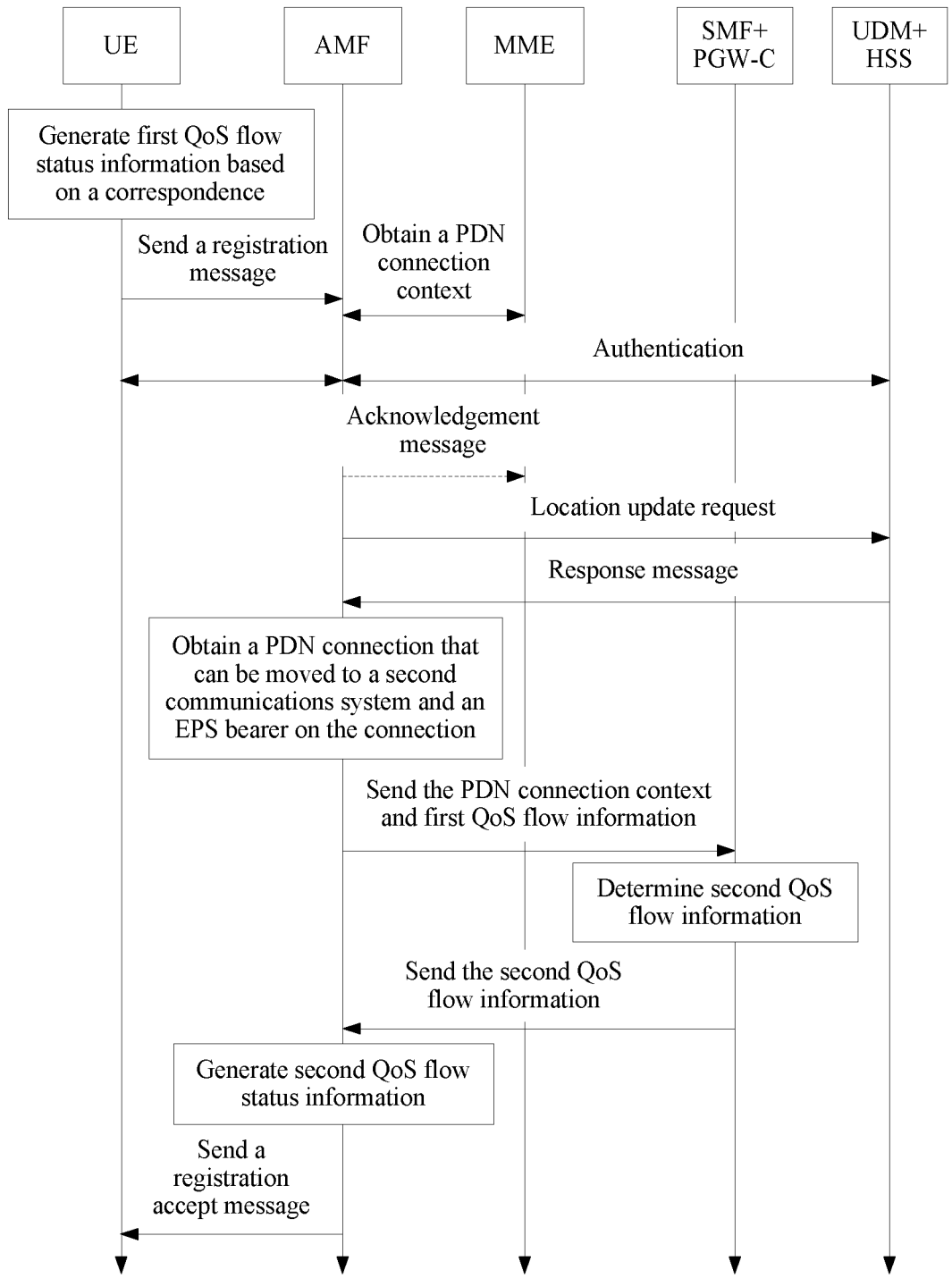
FIG. 6 is another flowchart of moving, by a UE, to a second communications system according to an embodiment of this application.

In this embodiment of this application, the first core network entity may be an SMF+PGW-C, and the second core network entity may be an AMF. As shown in FIG. 6, the UE may send a registration request to the AMF, and the registration request may carry an identifier of the UE and the first QoS flow status information. When the AMF receives the registration request, the AMF may obtain, based on the identifier of the UE, an MME that serves the UE, and request the MME for the PDN connection context of the UE. The AMF performs an authentication and authentication process on the UE, returns a PDN connection context acknowledgement message to the MME, and sends a location update request to a UDM+HSS, and the UDM+HSS returns a response message. The AMF learns, based on the SMF+PGW-C that is in the PDN connection context and that is a network element shared by the first communications system (for example, 4G) and the second communications system (for example, 5G), that the PDN connection can be moved to the second communications system. The AMF sends the obtained PDN connection context and the first QoS flow status information to the SMF+PGW-C. The SMF+PGW-C maps the PDN connection context to QoS flow information, determines, as the second QoS flow information, an intersection set between the first QoS flow status information and the QoS flow information obtained through mapping, and may further delete a QoS flow that is not described in the QoS flow information. Then, the SMF+PGW-C returns the second QoS flow information to the AMF, and the AMF generates the second QoS flow status information based on the second QoS flow information, and returns the second QoS flow status information to the UE using a registration accept message.

Accordingly, step 205 specifically includes: The UE determines, based on the stored correspondence and the second QoS flow status information, the QoS flow information used by the UE in the second communications system.

It should be noted that in the foregoing manners (I) and (II), the first EPS bearer status information and the first QoS flow status information may be collectively referred to as first status information, and the second EPS bearer status information and the second QoS flow status information may be collectively referred to as second status information.

Case 2: A process in which the UE moves from the first communications system to the second communications system in a connected state may include: The UE receives a handover command sent by the base station in the first communications system, where the handover command includes a session identifier and a QoS flow identifier. Accordingly, the first condition in step 205 may further include the session identifier and the QoS flow identifier.

Figure 7:
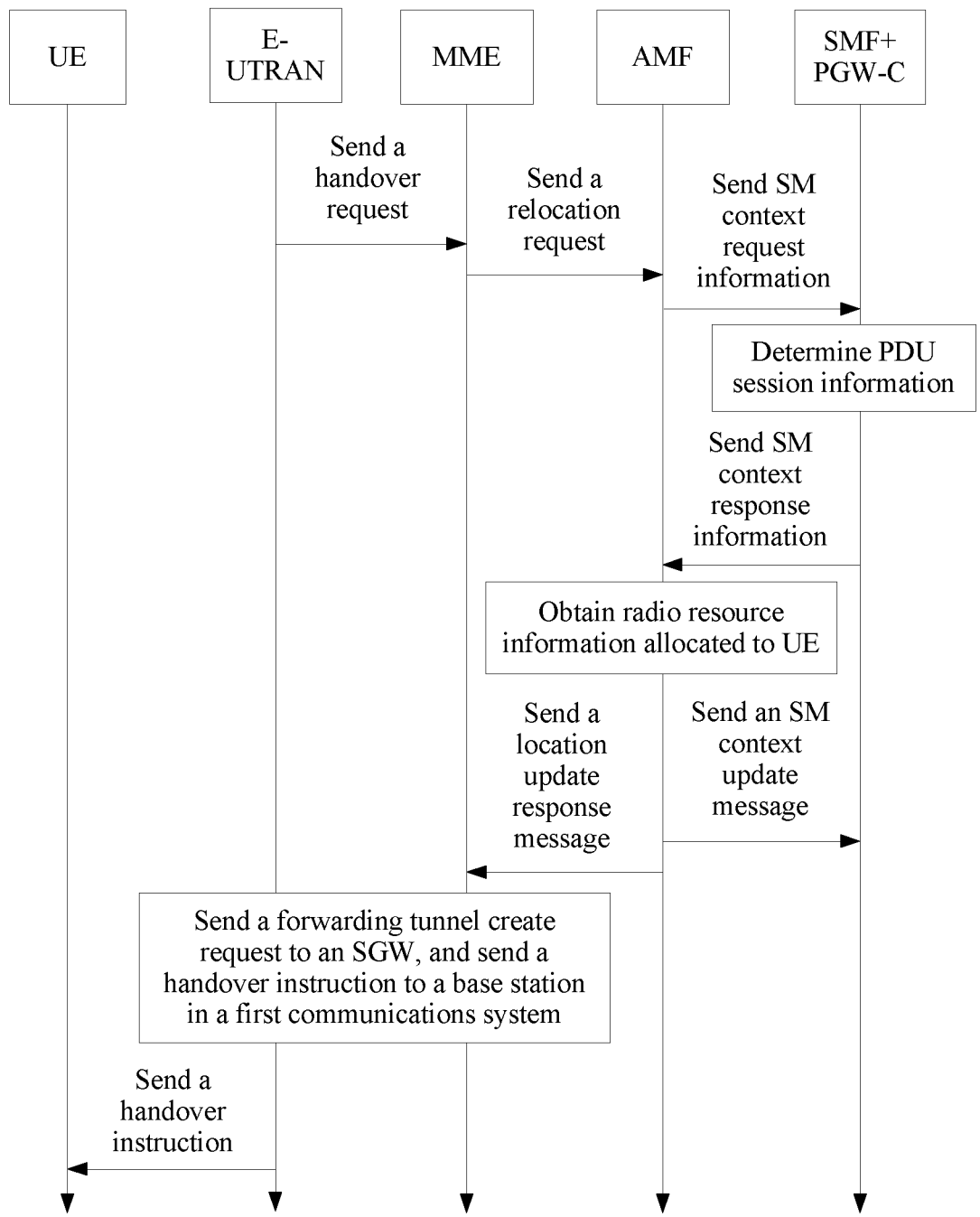
FIG. 7 is still another flowchart of moving, by a UE, to a second communications system according to an embodiment of this application.

In this embodiment of this application, the first core network entity may be an SMF+PGW-C, and the second core network entity may be an AMF. For example, as shown in FIG. 7, when the base station (for example, a 4G base station) in the first communications system determines that the UE needs to move from the first communications system to the second communications system, the base station sends a handover request to the core network entity MME in the first communications system. When the MME receives the handover request, the MME sends a relocation request to the core network entity AMF in the second communications system, and the relocation request includes a PDN connection context of the UE. The AMF obtains, based on the PDN connection context, an SMF+PGW-C that serves the UE, and sends a session management (SM) context request message to the SMF+PGW-C. The request message includes the PDN connection context. When receiving the SM context request message, the SMF+PGW-C determines, based on the PDN connection context and the stored correspondence, PDU session information (which may also be a PDU session context) that is in the second communications system and that is corresponding to the PDN connection context. Then, the SMF+PGW-C sends an N4 session create request to a UPF+PGW-U, and sends an SM context response message to the AMF. The response message includes the PDU session information. The AMF sends a handover request to the base station in the second communications system, and the handover request includes the PDU session information. The base station in the second communications system returns, to the AMF, radio resource information allocated to the UE. The AMF sends an SM context update message to the SMF+PGW-C, and the update message is used to create a tunnel between the UPF+PGW-U and the base station in the second communications system. The AMF sends a location update response message to the MME, and the response message includes the radio resource information allocated by the base station in the second communications system to the UE. The MME sends a forwarding tunnel create request to an SGW, and sends, to the base station in the first communications system, a handover command that includes the radio resource information allocated to the UE. The base station in the first communications system sends a handover command to the UE. The handover command includes the radio resource information allocated to the UE, and the radio resource information includes a session identifier and a QoS flow identifier.

For example, a process in which the SMF sends the SM context request message to the SMF+PGW-C and the SMF+PGW-C determines the PDU session information in the second communications system may include: The AMF obtains a PDN connection that can be moved from the first communications system to the second communications system and an EPS bearer on the PDN connection, and obtains a corresponding SMF+PGW-C address, a linked bearer identifier, and a bearer identifier, the AMF sends the linked bearer identifier and the bearer identifier to the SMF+PGW-C, and the SMF+PGW-C determines the PDU session information based on the linked bearer identifier, the bearer identifier, and a stored correspondence; or the AMF obtains a PDN connection that can be moved from the first communications system to the second communications system and an EPS bearer on the PDN connection, and obtains a corresponding SMF+PGW-C address and a PDN connection context including an EPS bearer context that can be moved to the second communications system, the AMF sends the PDN connection context to the SMF+PGW-C, and the SMF+PGW-C determines the PDU session information based on the PDN connection context and a stored correspondence.

Accordingly, step 205 specifically includes: The UE determines, based on the first QoS flow information, the session identifier, and the QoS flow identifier, the QoS flow information used by the UE in the second communications system.

Further, after step 203 and before step 204, to be more specific, after the UE receives the first message and before the UE moves from the first communications system to the second communications system, the method further includes step 203a and step 203b.

Step 203a: The UE receives a fourth message, where the fourth message is used to delete the first EPS bearer.

The fourth message may be sent to the UE by the MME in the first communications system shown in FIG. 1. To be specific, the MME sends, to the UE, the fourth message used to instruct the UE to delete the first EPS bearer.

Step 203b: The UE deletes the first EPS bearer and the first QoS flow information corresponding to the first EPS bearer.

For example, when the UE deletes the first QoS flow information corresponding to the first EPS bearer, if the UE stores the first QoS flow information in step 203, the UE deletes the stored first QoS flow information; if the UE stores, in step 203, the correspondence between the bearer identifier of the first EPS bearer and the first QoS flow information, or the correspondence between the first EPS bearer context and the first QoS flow information, or the correspondence between the first EPS bearer context and the index information of the first QoS flow, the UE deletes the stored correspondence.

Figure 8:
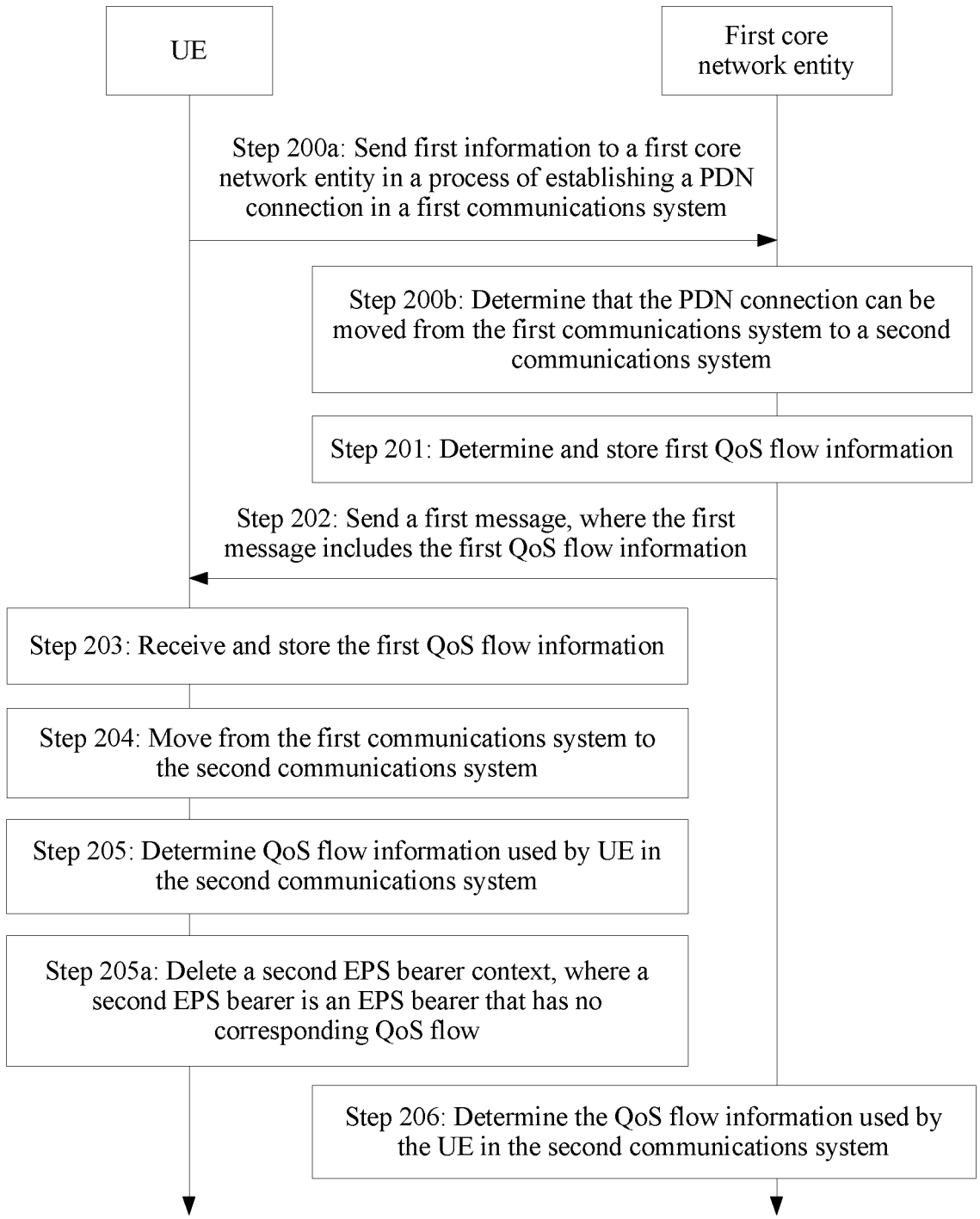
FIG. 8 is a flowchart of a fourth method for moving between communications systems according to an embodiment of this application.

Referring to FIG. 8, after the UE determines, based on the first condition, the QoS flow information used by the UE in the second communications system, the method may further include step 205a. FIG. 8 is merely described based on FIG. 4 as an example, and the method for moving between communications systems shown in FIG. 5 is also applicable.

Step 205a: The UE deletes a second EPS bearer context, where a second EPS bearer is an EPS bearer that is on the UE and that has no corresponding QoS flow information. In the method for moving between communications systems provided in this embodiment of this application, when the UE establishes the PDN connection, the UE instructs, using the first information, the first core network entity to determine the first QoS flow information that is of the second communications system and that is corresponding to the first EPS bearer of the UE in the first communications system. Then, the first core network entity determines and stores the first QoS flow information, and sends the first QoS flow information to the UE using the first message. When the UE moves from the first communications system to the second communications system, the UE and the first core network entity may determine, based on the first QoS flow information, the QoS flow information used by the UE in the second communications system, such that when the UE moves from the first communications system to the second communications system, mapping between the first EPS bearer and the first QoS flow information is implemented, and active bearers are aligned, in order to ensure that the UE is seamlessly transferred to the second communications system.

Figure 9:
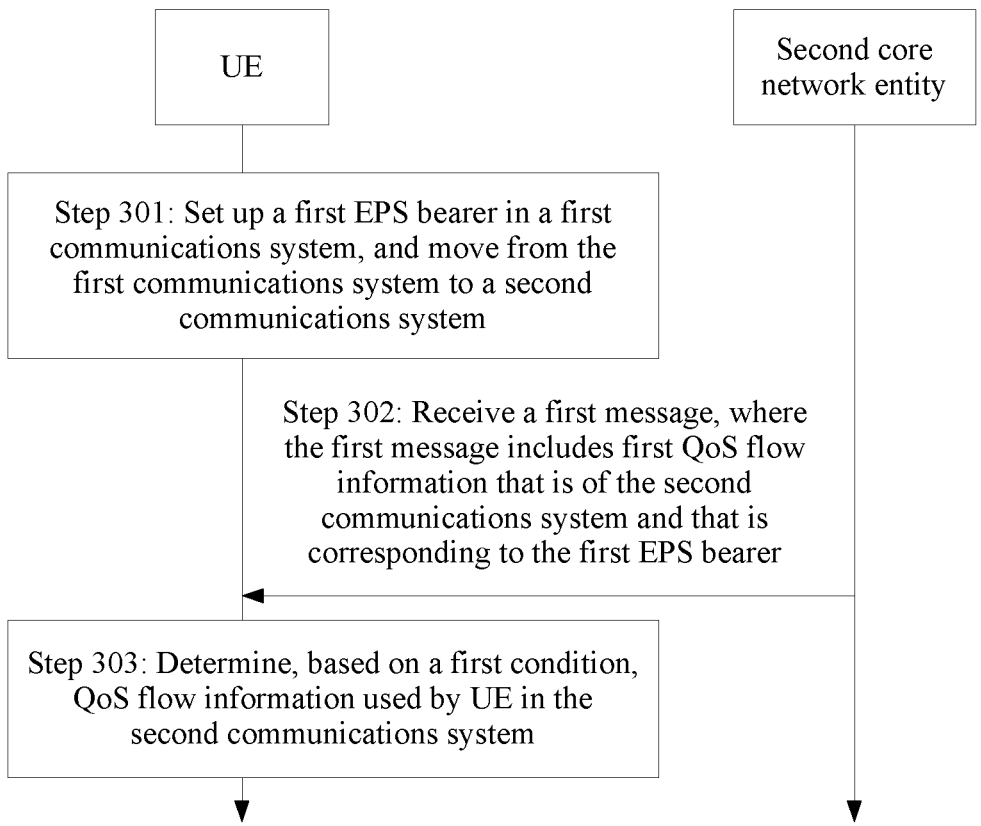
FIG. 9 is a flowchart of a fifth method for moving between communications systems according to an embodiment of this application.

FIG. 9 is a flowchart of a method for moving between communications systems according to an embodiment of this application. Referring to FIG. 9, the method is applied to the communications system shown in FIG. 1, and is used to move a UE from a first communications system to a second communications system. The method may include the following several steps.

Step 301: The UE sets up a first EPS bearer in the first communications system, and moves from the first communications system to the second communications system.

A PDN connection in the first communications system is corresponding to a PDU session in the second communications system. One PDN connection may include a plurality of EPS bearers, and one PDU session may include a plurality of QoS flows. The UE may establish a plurality of PDN connections in the first communications system, and there may be one or more PDN connections that can be moved to the second communications system in the plurality of PDN connections. The PDN connection that can be moved to the second communications system means that a PGW used by the PDN connection is an SMF+PGW-C integrated in 4G and 5G; or means that when the UE moves from the first communications system to the second communications system, a PDU session corresponding to the PDN connection can be established in the second communications system, and the PDN connection has a same IP address as the PDU session; or means that a PGW used by the PDN connection is an SMF+PGW-C integrated in 4G and 5G and when the UE moves from the first communications system to the second communications system, a PDU session corresponding to the PDN connection can be established in the second communications system, and the PDN connection has a same IP address as the PDU session. The first EPS bearer is an EPS bearer included in the PDN connection established by the UE in the first communications system, and may be one EPS bearer or a group of EPS bearers.

In this embodiment of this application, the first communications system may be a 4G communications system, and the second communications system may be a 5G communications system, such that the UE may set up a first EPS bearer in the 4G communications system, and move from the 4G communications system to the 5G communications system after setting up the first EPS bearer.

Step 302: The UE receives a first message, where the first message includes first QoS flow information that is of the second communications system and that is corresponding to the first EPS bearer.

A first QoS flow is corresponding to the first EPS bearer, and the first QoS flow may include one QoS flow or a group of QoS flows. The first QoS flow information is information obtained after the first EPS bearer is mapped to a QoS flow in the second communications system, and the first QoS flow information includes QoS information of the QoS flow, for example, mapping is performed based on a predefined mapping rule. Alternatively, the first QoS flow information is generated based on the first EPS bearer. The first QoS flow information is a combination of one or more of the following information: a QoS flow identifier QFI or a QoS flow template. The QoS information may further include a combination of one or more of the following information: a 5QI, an ARP, a GFBR, an MFBR, or notification control that are of the QoS. Not all EPS bearers on the UE can be moved to the second communications system. For example, a non-GBR EPS bearer cannot be moved to the second communications system. Alternatively, when a PDN connection cannot be moved to the second communications system, none of EPS bearers corresponding to the PDN connection can be moved to the second communications system. An EPS bearer that cannot be moved to the second communications system has no corresponding QoS flow information.

In this embodiment of this application, the first QoS flow information may include one or more QoS rules. When the first EPS bearer is a default bearer, the first QoS flow information includes one or more of the following information: a session aggregation maximum bit rate (AMBR), an SSC mode, a PDU session identifier, or a QoS rule. The QoS rule may be one QoS rule, or may be a plurality of QoS rules. For example, the QoS rule includes one or more of the following information: a QoS rule identifier, a QoS flow identifier, precedence, or a packet filter. Alternatively, the QoS rule includes one or more of the following information: a QoS rule identifier, a QoS flow identifier, precedence, or a packet filter identifier. The packet filter includes a packet filter attribute and a packet filter identifier. The first QoS flow information may further include a combination of one or more of the following information: a 5QI, an ARP, a GFBR, an MFBR, or notification control that are of the QoS flow. It may be understood that a default bearer of the UE is set up in a process in which the UE establishes a PDN connection in the first communications system. In other words, to set up a default bearer for the UE may be understood as establishing a PDN connection for the UE. Specifically, the UE may request, using an attach request or a PDN connection establishment request, to establish the PDN connection. In a process of establishing a PDN connection for the UE in the first communications system, information about a PDU session that is of the second communications system and that is corresponding to the PDN connection is sent to the UE using a request message used for setting up a default bearer. The information about the PDU session includes one or more of a session AMBR, an SSC mode, or a PDU session identifier.

For example, a method used by an SMF+PGW-C to determine first QoS flow information of the 5G communications system may be: The SMF+PGW-C generates a 5G QoS rule based on a traffic flow template (TFT) of an EPS context. The method specifically includes generating the QoS rule based on one or more policy and charging control (PCC) rules used for generating a TFT of an EPS bearer. Precedence of each PCC is set to precedence of the QoS rule, and one or more packet filters of the PCC are set to a packet filter of the QoS rule. In addition, the SMF+PGW-C may further allocate a QoS rule identifier to the QoS rule. For example, the SMF+PGW-C may further set a QCI of the EPS bearer to a 5G 5QI, set a GBR of the EPS bearer to a 5G GFBR, set an MBR of the EPS bearer to a 5G MFBR, and set an EBI of a default bearer of the PDN connection to a 5G PDU session identifier.

The method may further include obtaining, by the UE, a first QoS flow identifier (QFI). The first QoS flow identifier is obtained after the UE adds a specific value to a first EPS bearer identifier (EBI), or the first QoS flow identifier is obtained after the UE adds a specific field to a first EPS bearer identifier.

For example, a QFI is obtained after a specific value is added to an EBI, and for example, the specific value is 10. If the EBI is 5, the QFI is 15, and if the EBI is 6, the QFI is 16. For another example, a QFI is obtained after a specific field is added to an EBI, and for example, the specific field is one byte. If the EBI is one byte, the QFI is obtained after one byte is added after the EBI. If the one byte of the EBI is 00000101, the QFI is two bytes obtained after one byte is added: 00000101 00000001.

It should be noted that specific numerical values of the specific value and the specific field may be set based on a requirement, and this is not specifically limited in this embodiment of the present disclosure.

In addition, the first message may be sent by a second core network entity to the UE. For example, before the second core network entity sends the first message, the second core network entity may determine the first QoS flow information, and send the first QoS flow information to the UE using the first message, such that the UE receives the first message, sent by the second core network entity, that includes the first QoS flow information that is of the second communications system and that is corresponding to the first EPS bearer. The second core network entity may be a core network entity that is in the second communications system and that is responsible for UE access and mobility management, and the second core network entity may be the AMF in the second communications system shown in FIG. 1.

In this embodiment of this application, the first message may be a registration accept message, and an N1 session management (SM) information parameter of the registration accept message includes the first QoS flow information; or the first message is a PDU session modification message, and an N1 session management information parameter of the PDU session modification message includes the first QoS flow information. Alternatively, the first message is a handover command message, and the handover command message includes the first QoS flow information. QoS flow information in the 5G communications system may also be referred to as a 5G QoS parameter.

For example, when the first message is a handover command message, a target to source transparent container of the handover command message includes the first QoS flow information. An access stratum of the UE may obtain the first QoS flow information from the target to source transparent container, and send the first QoS flow information to a non-access stratum of the UE.

The first message may further include information about the first EPS bearer corresponding to the first QoS flow information, and the information about the first EPS bearer may include a bearer identifier of the first EPS bearer. For example, the second core network entity may add the information about the first EPS bearer and the first QoS flow information to the first message, and send the information about the first EPS bearer and the first QoS flow information to the UE using the first message.

Step 303: The UE determines, based on a first condition, QoS flow information used by the UE in the second communications system, where the first condition includes the first QoS flow information.

The QoS flow information used by the UE in the second communications system may be QoS flow information corresponding to one or more PDU sessions of the UE, or may be information about one or more PDU sessions of the UE. This is not specifically limited in this embodiment of this application.

For example, the UE determines, based on the first QoS flow information included in the first condition, the QoS flow information that can be used by the UE in the second communications system, such that mapping between an EPS bearer of the UE in the first communications system and a QoS flow in the second communications system is implemented, and the UE is seamlessly transferred from the first communications system to the second communications system.

It should be noted that there may be no sequence between step 303 and a process in which the UE moves from the first communications system to the second communications system in step 301. For example, the UE may first move from the first communications system to the second communications system, and then determine the QoS flow information used in the second communications system; or the UE first determines the QoS flow information used in the second communications system, and then moves from the first communications system to the second communications system; or in the process of moving from the first communications system to the second communications system, the UE determines the QoS flow information used in the second communications system. This is not specifically limited in this embodiment of this application. In an example in FIG. 9, the process in which the UE moves from the first communications system to the second communications system is before step 303.

Further, the process in which the UE moves from the first communications system to the second communications system in step 301 may have two different cases based on whether the UE is in an idle state or a connected state. The two cases are separately described below. That the UE moves from the first communications system to the second communications system in an idle state is such that the UE moves to the second communications system using a reselect process. For example, when the UE detects that a signal of a base station in the first communications system weakens, the UE starts a cell search process, and after finding a signal of a base station in the second communications system, reselects the base station in the second communications system. That the UE moves from the first communications system to the second communications system in a connected state is such that the UE moves to the second communications system using a handover process. For example, when the base station in the first communications system receives a measurement report reported by the UE, and determines that the UE needs to be handed over to the base station in the second communications system, the base station in the first communications system initiates a handover process, and when the UE receives a handover command sent by the base station in the first communications system, the UE moves from the first communications system to the second communications system.

Case 1: The UE moves from the first communications system to the second communications system in an idle state. The UE may move from the first communications system to the second communications system in an idle state in the following two manners (1) and (2) that are specifically described as follows.

(1). The UE sends first EPS bearer status information to the second core network entity, where the first EPS bearer status information is used to identify an active-state EPS bearer of the UE, and the second core network entity is a core network entity that is in the second communications system and that is responsible for UE access and mobility management.

EPS bearer status information is a phrase, and the "first" in the first EPS bearer status information and "second" in second EPS bearer status information are used to define and differentiate between different EPS bearer status information. The first EPS bearer status information is used to identify an active-state EPS bearer, to be more specific, an EPS bearer identified in the first EPS bearer status information is an active-state EPS bearer that is determined by the UE. For example, the UE has four active-state EPS bearers in the first communications system, and EBIs corresponding to the four EPS bearers are separately 5, 6, 7, and 8. EPS bearers whose EBIs are 5 and 7 have corresponding QoS flow information, and EPS bearers whose EBIs are 6 and 8 have no corresponding QoS flow information. In the first EPS bearer status information reported by the UE, only EPS bearers whose EBIs are 5 and 7 are identified as active-state, and other bearers are identified as inactive-state (or inactive). Details are shown in the foregoing Table 2.

For example, the UE may determine a first EPS bearer status based on the active-state EPS bearer, and send the first EPS bearer status to the second core network entity. The second core network entity receives the first EPS bearer status information, obtains a PDN connection context that includes all PDN connections of the UE from a core network entity MME in the first communications system, determines second information based on the first EPS bearer status information and the PDN connection context, and obtains a PDN connection context corresponding to an EPS that can be moved to the second communications system. The second information includes the EPS bearer that can be moved to the second communications system. The second core network entity sends the obtained PDN connection context to the first core network entity, such that the first core network entity generates the QoS flow information used by the UE in the second communications system. The QoS flow information includes QoS flow information that is corresponding to an active-state EPS bearer of the UE and that is determined by the first core network entity. Then, the first core network entity may send second QoS flow information to the second core network entity, such that the second core network entity sends the second QoS flow information to the UE. The QoS flow information may be understood as a set of one or more pieces of QoS flow information, or may be understood as a set of one or more pieces of PDU session information. It may be understood that if the QoS flow information includes only one piece of QoS flow information or only one piece of PDU session information, the set includes only one piece of QoS flow information or only one piece of PDU session information. Another part of this specification has a same understanding. Details are not described again.

Figure 10:
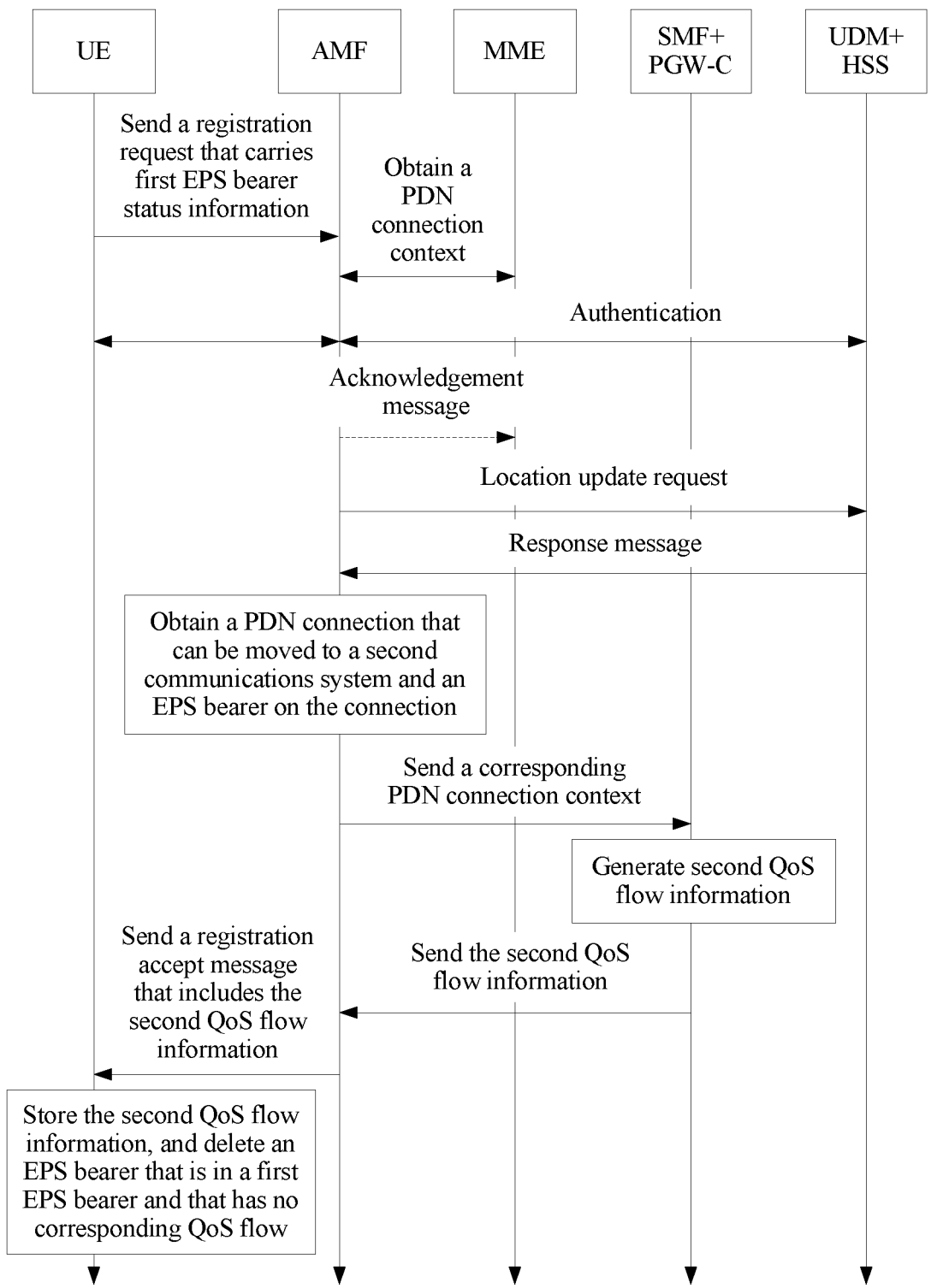
FIG. 10 is a flowchart of moving, by a UE, to a second communications system according to an embodiment of this application.

In this embodiment of this application, the first core network entity may be an SMF+PGW-C, and the second core network entity may be an AMF. As shown in FIG. 10, the UE may send a registration request to the AMF, and the registration request may carry an identifier of the UE and the first EPS bearer status information. When the AMF receives the registration request, the AMF may obtain, based on the identifier of the UE, an MME that serves the UE, and request the MME for the PDN connection context of the UE. The AMF performs an authentication and authentication process on the UE, returns a PDN connection context acknowledgement message to the MME, and sends a location update request to a UDM+HSS, and the UDM+HSS returns a response message. The AMF obtains, based on the first EPS bearer status information sent by the UE and based on the PDN connection context obtained from the MME, a PDN connection that can be moved from the first communications system (for example, 4G) to the second communications system (for example, 5G) and an EPS bearer on the PDN connection, and obtains a corresponding SMF+PGW-C address and a corresponding PDN connection context. Then, the AMF obtains the PDN connection context that can be moved to the second communications system, and sends the PDN connection context to the SMF+PGW-C. The SMF+PGW-C generates the second QoS flow information based on the received PDN connection context. Finally, the SMF+PGW-C sends the second QoS flow information to the AMF, such that the AMF returns the second QoS flow information to the UE using a registration accept message. Further, the UE may store the second QoS flow information, and delete an EPS bearer that is in the first EPS bearer and that has no corresponding QoS flow.

Accordingly, step 303 includes: The UE determines, based on the first QoS flow information and the second QoS flow information, the QoS flow information used by the UE in the second communications system.

Optionally, a process in which the AMF obtains the PDN connection that can be moved from the first communications system (for example, 4G) to the second communications system (for example, 5G) and the EPS bearer on the PDN connection, and obtains the corresponding SMF+PGW-C address may include: The AMF obtains, based on an EPS bearer intersection set between the first EPS bearer status information and a bearer context in the PDN connection context, the PDN connection that can be moved to the second communications system and the EPS bearer on the PDN connection, and the AMF obtains the SMF+PGW-C address based on the PDN connection context that can be moved to the second communications system.

(2). The UE generates first QoS flow status information based on a second condition, where the second condition includes an active-state EPS bearer of the UE, and the UE sends the first QoS flow status information to the second core network entity.

QoS flow status information is a phrase, and the "first" in the first QoS flow status information and "second" in the following second QoS flow status information are used to define and differentiate between different QoS flow status information. The first QoS flow status information is used to identify a QoS flow corresponding to an active-state EPS bearer of the UE, to be specific, a QoS flow identified in the first QoS flow status information is a QoS flow that is corresponding to an active-state EPS bearer and that is determined by the UE based on the correspondence. The second QoS flow status information is used to identify a QoS flow that is corresponding to an active-state EPS bearer of the UE and that is determined by the second core network entity.

For example, the UE generates the first QoS flow status information based on the active-state EPS bearer of the UE, and sends the first QoS flow status information to the second core network entity. The second core network entity receives the first QoS flow status information, obtains a PDN connection context of the UE from a core network entity MME in the first communications system, and sends the first QoS flow status information and the PDN connection context to the first core network entity, such that the first core network entity generates second QoS flow information of the UE in the second communications system based on the first QoS flow status information and the PDN connection context. Then, the first core network entity may return the second QoS flow information to the second core network entity, such that the second core network entity sends the second QoS flow information to the UE using a registration accept message.

Figure 11:
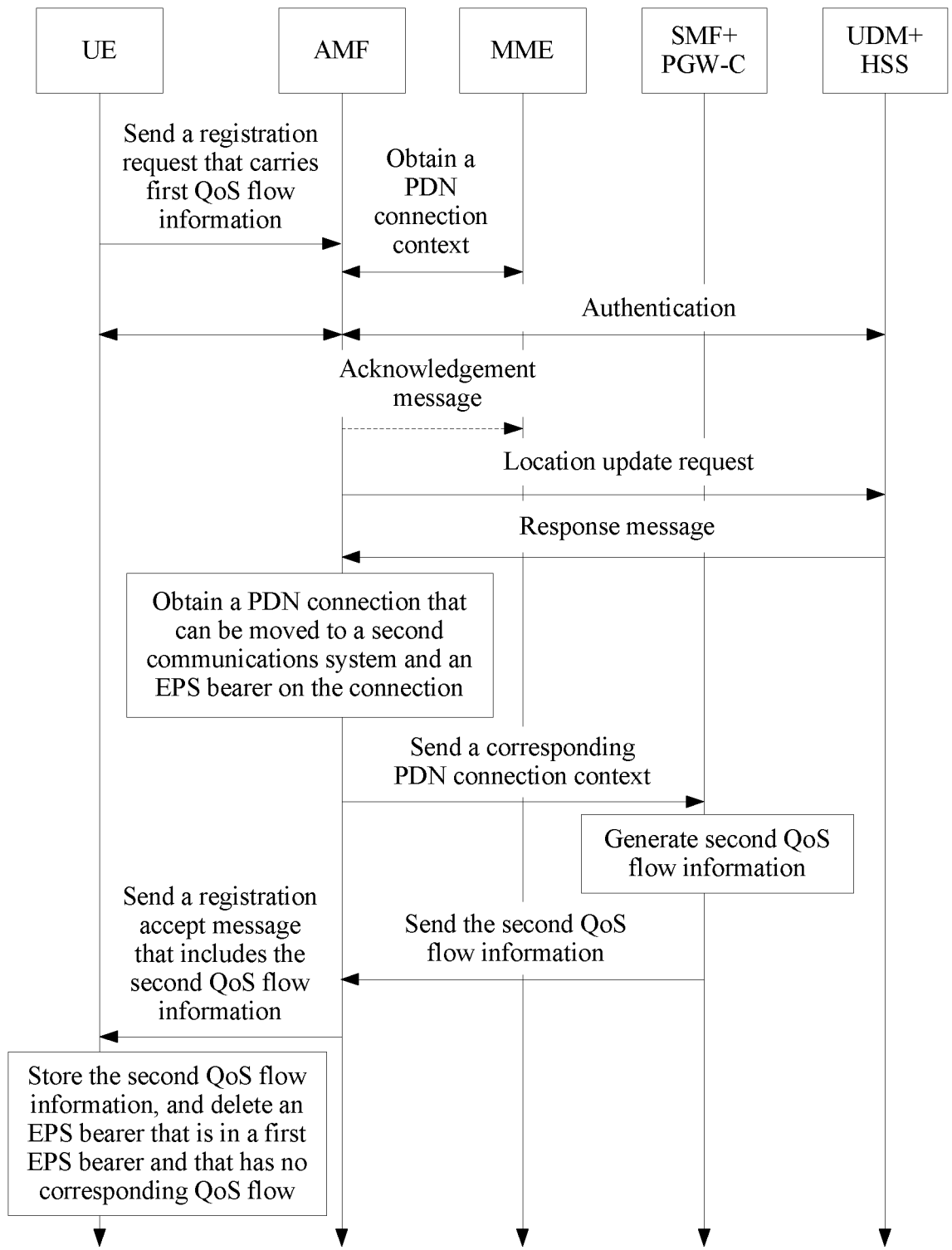
FIG. 11 is another flowchart of moving, by a UE, to a second communications system according to an embodiment of this application.

In this embodiment of this application, the first core network entity may be an SMF+PGW-C, and the second core network entity may be an AMF. As shown in FIG. 11, the UE may send a registration request to the AMF, and the registration request may carry an identifier of the UE and the first QoS flow status information. When the AMF receives the registration request, the AMF may obtain, based on the identifier of the UE, an MME that serves the UE, and request the MME for the PDN connection context of the UE. The AMF performs an authentication and authentication process on the UE, returns a PDN connection context acknowledgement message to the MME, and sends a location update request to a UDM+HSS, and the UDM+HSS returns a response message. The AMF learns, based on the SMF+PGW-C that is in the PDN connection context and that is a network element shared by the first communications system (for example, 4G) and the second communications system (for example, 5G), that the PDN connection can be moved to the second communications system. The AMF sends the obtained PDN connection context and the first QoS flow status information to the S1VIF+PGW-C. The SMF+PGW-C maps the PDN connection context to QoS flow information, determines, as the second QoS flow information, an intersection set between the first QoS flow status information and the QoS flow information obtained through mapping, and may further delete a QoS flow that is not described in the QoS flow information. Then, the SMF+PGW-C returns the second QoS flow information to the AMF, and the AMF generates the second QoS flow status information based on the second QoS flow information, and returns the second QoS flow status information to the UE using the registration accept message. Further, the UE may store the second QoS flow information, and delete an EPS bearer that is in the first EPS bearer and that has no corresponding QoS flow.

Accordingly, step 303 includes: The UE determines, based on the first QoS flow information and the second QoS flow information, the QoS flow information used by the UE in the second communications system.

Case 2: A process in which the UE moves from the first communications system to the second communications system in a connected state may include: The UE receives a handover command sent by the base station in the first communications system, where the handover command includes a session identifier and a QoS flow identifier.

Figure 12:
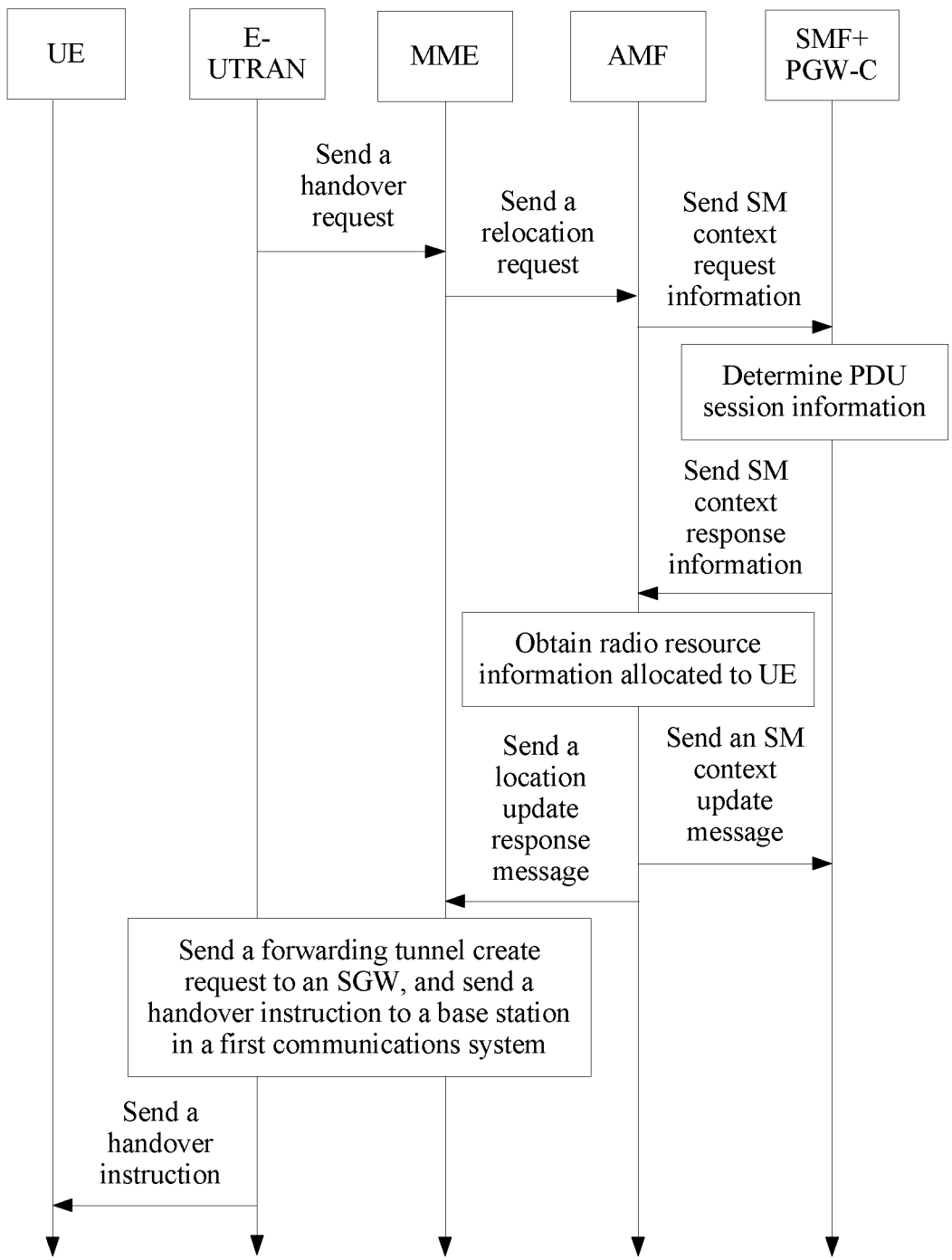
FIG. 12 is still another flowchart of moving, by a UE, to a second communications system according to an embodiment of this application.

In this embodiment of this application, the first core network entity may be an SMF+PGW-C, and the second core network entity may be an AMF. As shown in FIG. 12, when the base station (for example, an E-UTRAN) in the first communications system determines that the UE needs to move from the first communications system to the second communications system, the base station sends a handover request to the core network entity MME in the first communications system. When the MME receives the handover request, the MME sends a relocation request to the core network entity AMF in the second communications system, and the relocation request includes a PDN connection context of the UE. The AMF obtains, based on the PDN connection context, an SMF+PGW-C that serves the UE, and sends a session management (SM) context request message to the SMF+PGW-C. The request message includes the PDN connection context. When receiving the SM context request message, the SMF+PGW-C determines, based on the PDN connection context, a PDU session context that is in the second communications system and that is corresponding to the PDN connection context. Then, the SMF+PGW-C sends an N4 session create request to a UPF+PGW-U, and sends an SM context response message to the AMF. The response message includes PDU session information. The AMF sends a handover request to the base station in the second communications system, and the handover request includes the PDU session information. The base station in the second communications system returns, to the AMF, radio resource information allocated to the UE. The AMF sends an SM context update message to the SMF+PGW-C, and the update message is used to create a tunnel between the UPF+PGW-U and the base station in the second communications system. The AMF sends a location update response message to the MME, and the response message includes the PDU session context and the radio resource information that is allocated by the base station in the second communications system to the UE. The MME sends a forwarding tunnel create request to an SGW, and sends, to the base station in the first communications system, a handover command including the PDU session context and the radio resource information that is allocated to the UE. The base station in the first communications system sends a handover command to the UE. The handover command includes the PDU session context and the radio resource information that is allocated to the UE, and the radio resource information includes a session identifier and a QoS flow identifier.

Optionally, a process in which the AMF sends the PDU session context to the UE may further be: The AMF sends the PDU session context to the base station in the second communications system, and the base station in the second communications system encapsulates the PDU session context in a target to source transparent container and sends the PDU session context to the AMF. Then, the AMF sends the PDU session context to the UE using the MME and the base station in the first communications system. A process in which the AMF allocates the radio resource information to the UE is consistent with the foregoing description.

For example, a process in which the SMF sends the SM context request message to the SMF+PGW-C and the SMF+PGW-C determines the PDU session information in the second communications system may include: The AMF obtains a PDN connection that can be moved from the first communications system to the second communications system and an EPS bearer on the PDN connection, and obtains a corresponding SMF+PGW-C address, a linked bearer identifier, and a bearer identifier, the AMF sends the linked bearer identifier and the bearer identifier to the SMF+PGW-C, and the SMF+PGW-C determines the PDU session information based on the linked bearer identifier, the bearer identifier, and a stored correspondence; or the AMF obtains a PDN connection that can be moved from the first communications system to the second communications system and an EPS bearer on the PDN connection, and obtains a corresponding SMF+PGW-C address and a PDN connection context including an EPS bearer context that can be moved to the second communications system, the AMF sends the PDN connection context to the SMF+PGW-C, and the SMF+PGW-C determines the PDU session information based on the PDN connection context and a stored correspondence.

Accordingly, step 303 includes: The UE determines, based on the first QoS flow information, the session identifier, and the QoS flow identifier, the QoS flow information used by the UE in the second communications system.

Figure 13:
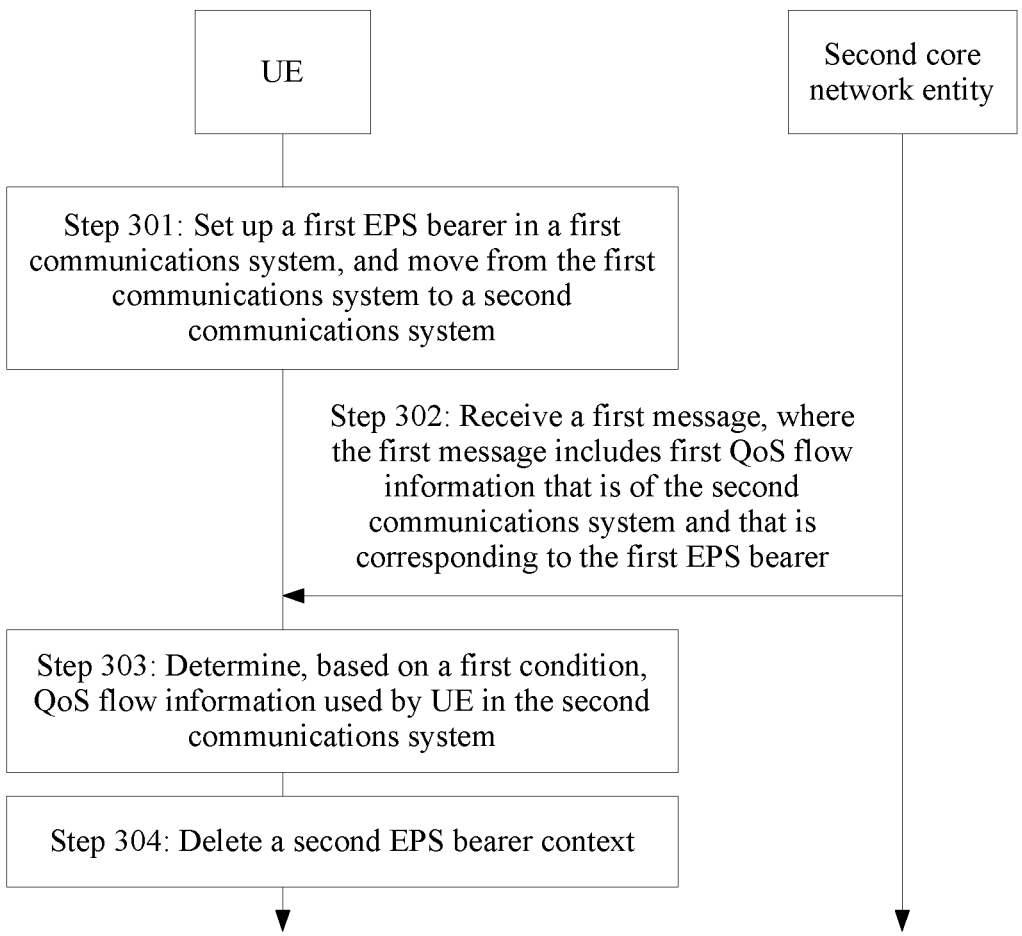
FIG. 13 is a flowchart of a sixth method for moving between communications systems according to an embodiment of this application.

Referring to FIG. 13, after step 303, the method may further include step 304.

Step 304: The UE deletes a second EPS bearer context, where a second EPS bearer is an EPS bearer that is not included in the first message, or a second EPS bearer is an EPS bearer that is of the UE and that has no corresponding QoS flow information.

In the method for moving between communications systems provided in this embodiment of this application, the UE sets up the first EPS bearer in the first communications system, moves from the first communications system to the second communications system, receives the first QoS flow information that is corresponding to the first EPS bearer and that is sent by the second core network entity, and determines, based on the first condition that includes the first QoS flow information, the QoS flow information used by the UE in the second communications system, such that when the UE moves from the first communications system to the second communications system, mapping between the first EPS bearer and the first QoS flow information is implemented, and active bearers are aligned, in order to ensure that the UE is seamlessly transferred to the second communications system.

The solution provided in the embodiments of this application is mainly described from a perspective of interaction between network elements. It may be understood that, to implement the foregoing functions, each network element such as the UE, the first core network device, or the second core network device includes a corresponding hardware structure and/or software module used to perform the functions. A person skilled in the art can easily be aware that, network elements and algorithm steps in the examples described with reference to the embodiments disclosed in this specification may be implemented in a form of hardware or in a form of a combination of hardware and computer software in this application. Whether a function is implemented by hardware or is implemented in a manner in which computer software drives hardware depends on a particular application and a design constraint of a technical solution. A person skilled in the art may use different methods to implement the described functions for each particular application, but it should not be considered that such implementation goes beyond the scope of this application.

In this embodiment of the present disclosure, the user equipment, the first core network device, and the second core network device may be divided into function modules based on the foregoing method examples. For example, each function module may be obtained through division for each function, or two or more functions may be integrated into one processing module. The integrated module may be implemented in a form of hardware, or may be implemented in a form of a software function module. It should be noted that the module division in the embodiments of this application is an example, and is merely logical function division and there may be another division manner in actual implementation.

Figure 14:
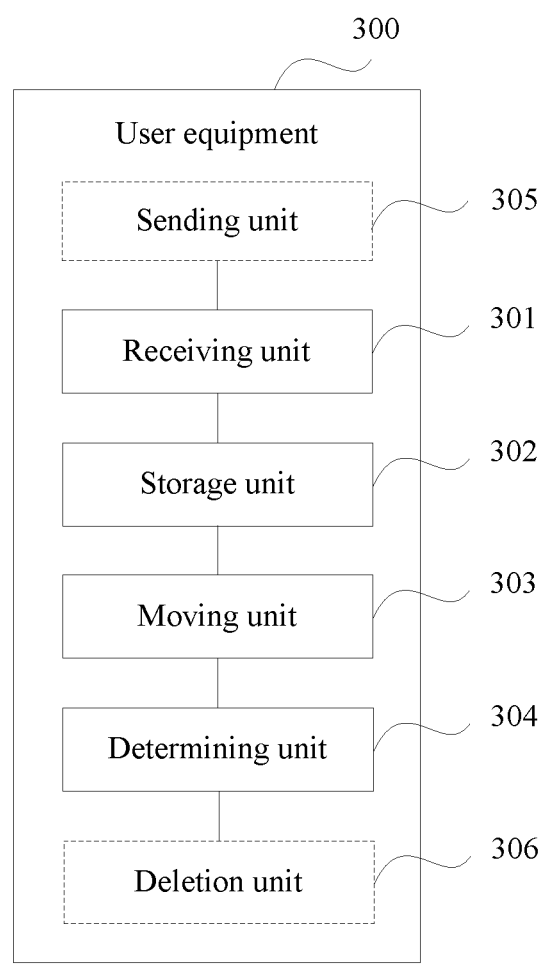
FIG. 14 is a schematic structural diagram of a user equipment according to an embodiment of this application.

When each function module is obtained through division for each function, FIG. 14 is a possible schematic structural diagram of a user equipment involved in the foregoing embodiments. User equipment 300 includes a receiving unit 301, a storage unit 302, a moving unit 303, and a determining unit 304. The receiving unit 301 is configured to perform the step of receiving the first QoS flow information in FIG. 3, FIG. 4, or FIG. 8. The storage unit 302 is configured to perform the step of storing the first QoS flow information in FIG. 3, FIG. 4, or FIG. 8. The moving unit 303 is configured to perform step 204 in FIG. 3, FIG. 4, or FIG. 8. The determining unit 304 is configured to perform step 205 in FIG. 3, FIG. 4, or FIG. 8. The user equipment 300 further includes a sending unit 305 and/or a deletion unit 306. The sending unit 305 is configured to perform step 200a in FIG. 4 or FIG. 8 and step 201a in FIG. 4A. The deletion unit 306 is configured to perform step 205a in FIG. 8. All related content of the steps involved in the foregoing method embodiments may be cited in function descriptions of corresponding function modules, and details are not described herein again.

In hardware implementation, the moving unit 303, the determining unit 304, and the deletion unit 306 may be processors, the receiving unit 301 may be a receiver, and the sending unit 305 may be a transmitter. The transmitter and the receiver may form a communications interface.

Figure 15:
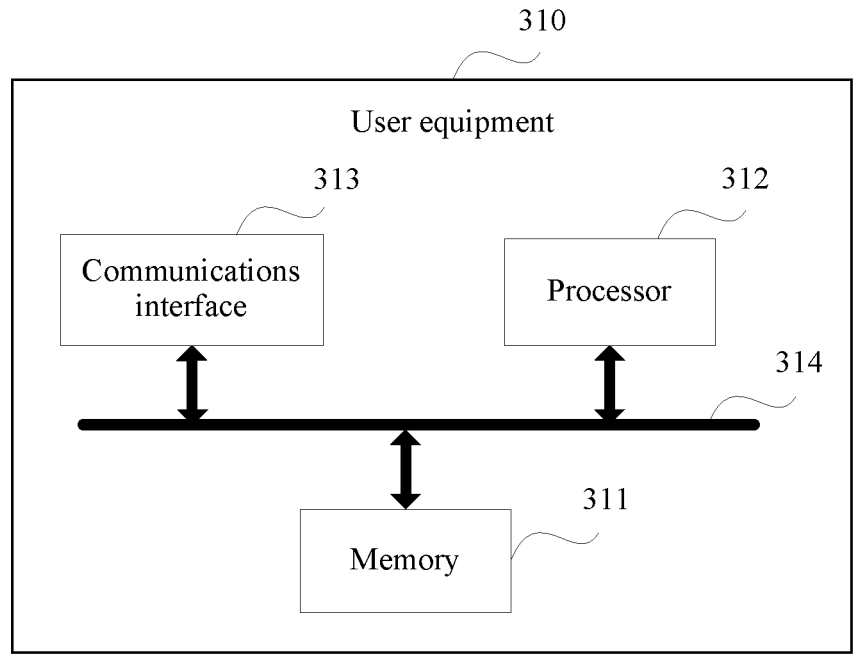
FIG. 15 is a schematic structural diagram of another user equipment according to an embodiment of this application.

FIG. 15 is a possible schematic logical structure diagram of a user equipment 310 involved in the foregoing embodiment according to an embodiment of this application. The user equipment 310 includes a processor 312, a communications interface 313, a memory 311, and a bus 314. The processor 312, the communications interface 313, and the memory 311 are connected to each other using the bus 314. In this embodiment of the present disclosure, the processor 312 is configured to control and manage an action of the user equipment 310. For example, the processor 312 is configured to perform step 203 and step 204 in FIG. 3, FIG. 4, or FIG. 8, step 205a in FIG. 8, and/or another process of the technology described in this specification. The communications interface 313 is configured to support communication of the user equipment 310. The memory 311 is configured to store program code and data of the user equipment 310.

The processor 312 may be a central processing unit, a general-purpose processor, a digital signal processor, an application-specific integrated circuit, a field programmable gate array or another programmable logic device, a transistor logic device, a hardware component, or any combination thereof. The processor 312 may implement or execute various example logical blocks, modules, and circuits described with reference to content disclosed in this application. Alternatively, the processor may be a combination for implementing a computing function, for example, a combination of one or more microprocessors, or a combination of a digital signal processor and a microprocessor. The bus 314 may be a peripheral component interconnect (PCI) bus or an extended industry standard architecture (EISA) bus, or the like. The bus may be classified into an address bus, a data bus, a control bus, and the like. For ease of representation, only one thick line is used in FIG. 15 to represent the bus, but it does not indicate that there is only one bus or one type of bus.

Figure 16:
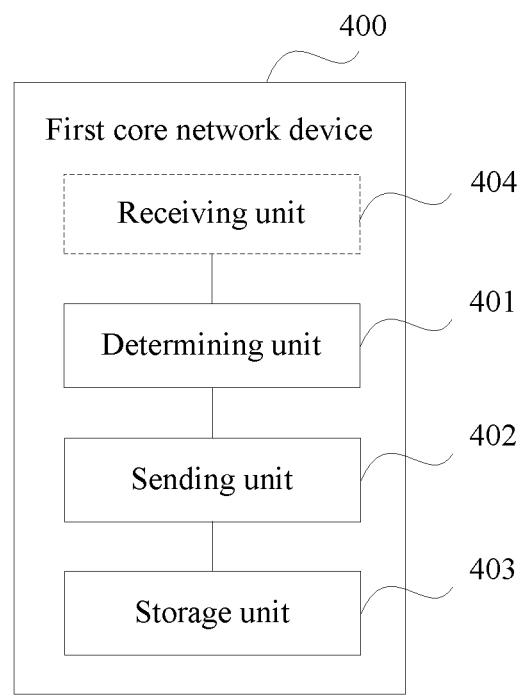
FIG. 16 is a schematic structural diagram of a first core network device according to an embodiment of this application.

When each function module is obtained through division for each function, FIG. 16 is a possible schematic structural diagram of a first core network device involved in the foregoing embodiments. A first core network device 400 includes a determining unit 401, a sending unit 402, and a storage unit 403. The determining unit 401 is configured to perform the step of determining the first QoS flow information in step 201 in FIG. 3 or FIG. 4, or the step of determining the first QoS flow information in step 200b and step 201 in FIG. 8. The sending unit 402 is configured to perform step 202 in FIG. 3, FIG. 4, or FIG. 8. The storage unit 403 is configured to perform the step of storing the first QoS flow information in step 201 in FIG. 3, FIG. 4, or FIG. 8. The first core network device 400 further includes a receiving unit 404, and the receiving unit 404 is configured to perform the step of receiving the first information sent by the UE in FIG. 4, step 201b in FIG. 4A, and/or another process of the technology described in this specification. All related content of the steps involved in the foregoing method embodiments may be cited in function descriptions of corresponding function modules, and details are not described herein again.

In hardware implementation, the determining unit 401 may be a processor, the sending unit 402 may be a transmitter, and the receiving unit 404 may be a receiver. The receiver and the transmitter may form a communications interface.

Figure 17:
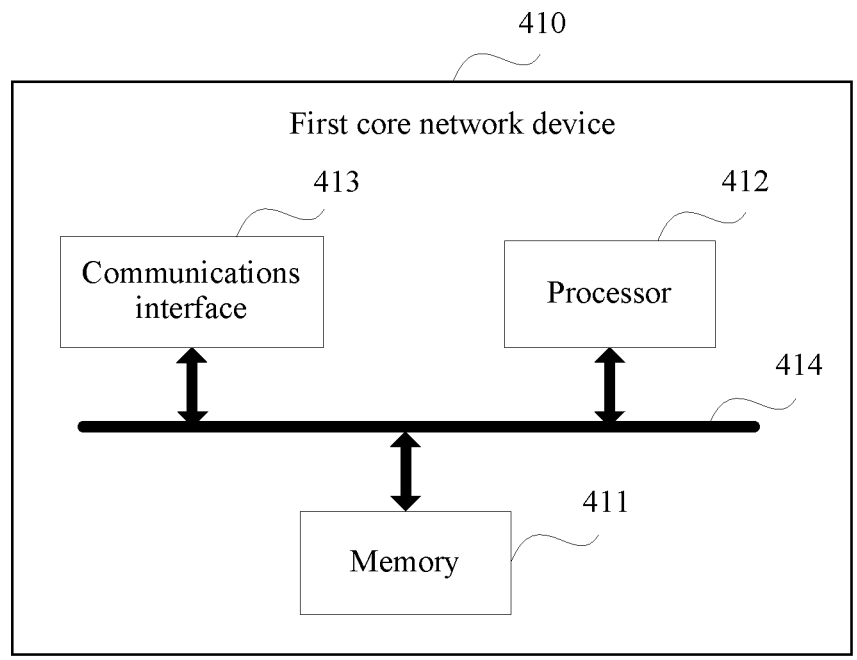
FIG. 17 is a schematic structural diagram of another first core network device according to an embodiment of this application.

FIG. 17 is a possible schematic logical structure diagram of a first core network device 410 involved in the foregoing embodiment according to an embodiment of this application. The first core network device 410 includes a processor 412, a communications interface 413, a memory 411, and a bus 414. The processor 412, the communications interface 413, and the memory 411 are connected to each other using the bus 414. In this embodiment of the present disclosure, the processor 412 is configured to control and manage an action of the first core network device 410. For example, the processor 412 is configured to perform step 201 and step 206 in FIG. 3 or FIG. 8, step 200b, step 201, and step 206 in FIG. 4, and/or another process of the technology described in this specification. The communications interface 413 is configured to support communication of the first core network device 410. The memory 411 is configured to store program code and data of the first core network device 410.

The processor 412 may be a central processing unit, a general-purpose processor, a digital signal processor, an application-specific integrated circuit, a field programmable gate array or another programmable logic device, a transistor logic device, a hardware component, or any combination thereof. The processor 412 may implement or execute various example logical blocks, modules, and circuits described with reference to content disclosed in this application. Alternatively, the processor may be a combination for implementing a computing function, for example, a combination of one or more microprocessors, or a combination of a digital signal processor and a microprocessor. The bus 414 may be a PCI bus or an EISA bus. The bus may be classified into an address bus, a data bus, a control bus, and the like. For ease of representation, only one thick line is used in FIG. 17 to represent the bus, but it does not indicate that there is only one bus or one type of bus.

Figure 18:
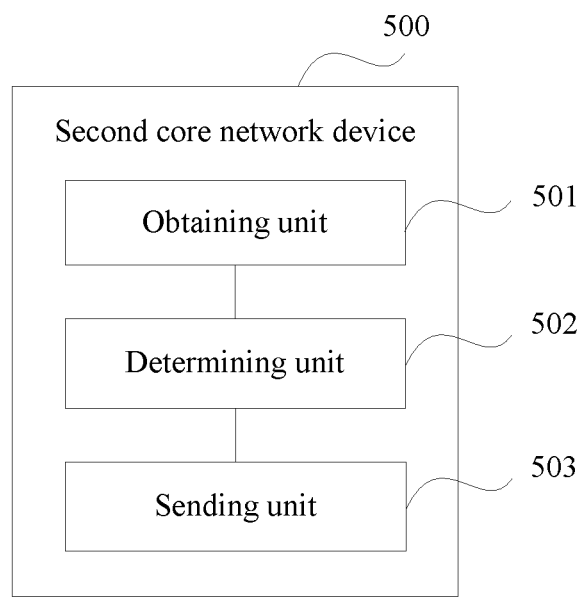
FIG. 18 is a schematic structural diagram of a second core network device according to an embodiment of this application.

When each function module is obtained through division for each function, FIG. 18 is a possible schematic structural diagram of a second core network device involved in the foregoing embodiments. A second core network device 500 includes an obtaining unit 501, a determining unit 502, and a sending unit 503. The obtaining unit 501 is configured to perform the step of obtaining the first status information and the PDN connection context, and perform the step of receiving the third information sent by the first core network entity. The determining unit 502 is configured to perform the step of determining the second information, and/or another process of the technology described in the specification. The sending unit 503 is configured to perform the step of sending the second information, and the step of sending the second message to the UE. All related content of the steps involved in the foregoing method embodiments may be cited in function descriptions of corresponding function modules, and details are not described herein again.

In hardware implementation, the determining unit 502 may be a processor, the obtaining unit 501 may be a receiver, and the sending unit 503 may be a transmitter. The transmitter and the receiver may form a communications interface.

Figure 19:
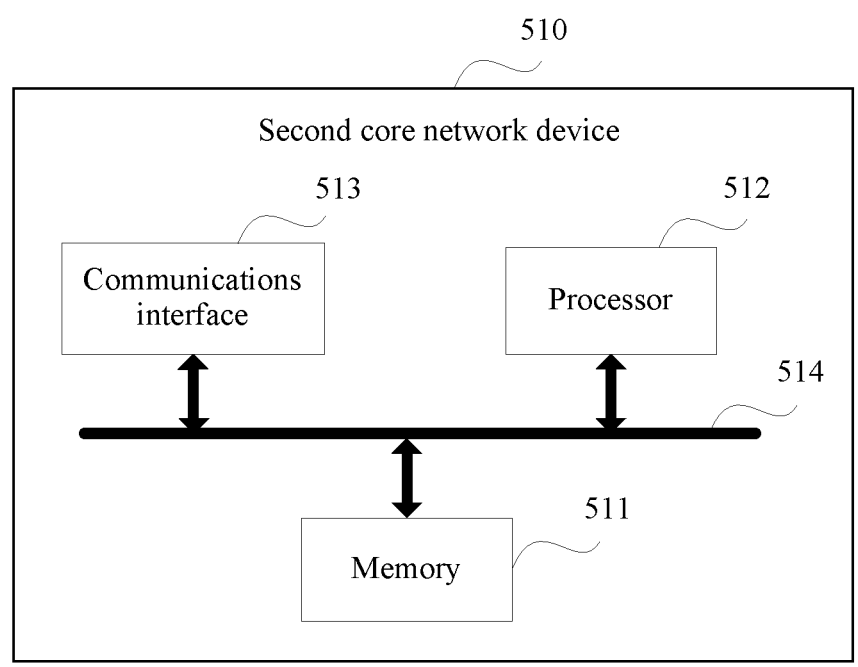
FIG. 19 is a schematic structural diagram of another second core network device according to an embodiment of this application.

FIG. 19 is a possible schematic logical structure diagram of a second core network device 510 involved in the foregoing embodiment according to an embodiment of this application. The second core network device 510 includes a processor 512, a communications interface 513, a memory 511, and a bus 514. The processor 512, the communications interface 513, and the memory 511 are connected to each other using the bus 514. In this embodiment of the application, the processor 512 is configured to control and manage an action of the second core network device 510. For example, the processor 512 is configured to perform the step of determining the second information, and/or another process of the technology described in this specification. The communications interface 513 is configured to support communication of the second core network device 510. The memory 511 is configured to store program code and data of the second core network device 510.

The processor 512 may be a central processing unit, a general-purpose processor, a digital signal processor, an application-specific integrated circuit, a field programmable gate array or another programmable logic device, a transistor logic device, a hardware component, or any combination thereof. The processor 512 may implement or execute various example logical blocks, modules, and circuits described with reference to content disclosed in this application. Alternatively, the processor may be a combination for implementing a computing function, for example, a combination of one or more microprocessors, or a combination of a digital signal processor and a microprocessor. The bus 514 may be a PCI bus or an EISA bus. The bus may be classified into an address bus, a data bus, a control bus, and the like. For ease of representation, only one thick line is used in FIG. 19 to represent the bus, but it does not indicate that there is only one bus or one type of bus.

Figure 20:
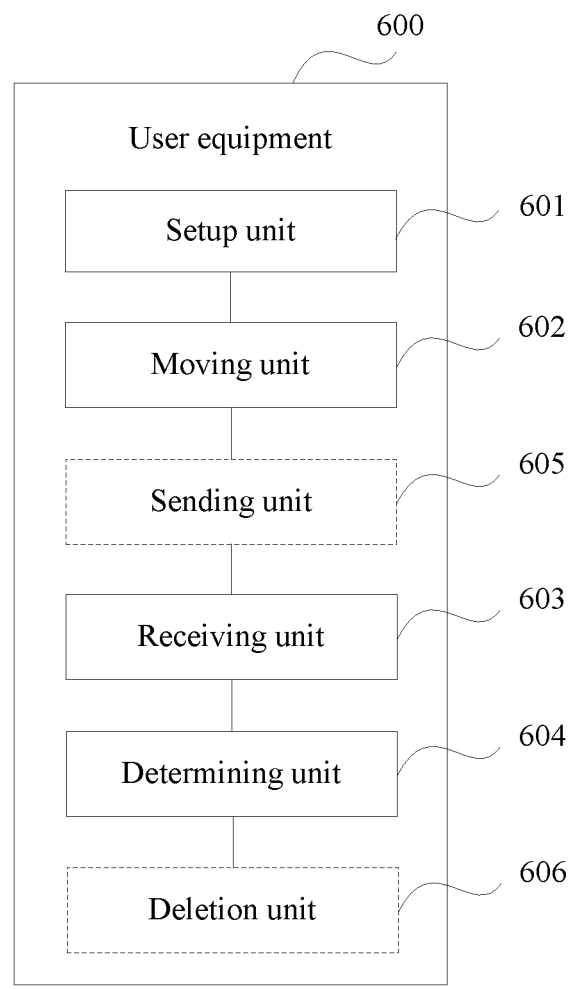
FIG. 20 is a schematic structural diagram of a user equipment according to an embodiment of this application.

When each function module is obtained through division for each function, FIG. 20 is a possible schematic structural diagram of user equipment involved in the foregoing embodiments. User equipment 600 includes a setup unit 601, a moving unit 602, a receiving unit 603, and a determining unit 604. The setup unit 601 is configured to perform the step of setting up the EPS bearer in the first communications system in step 301 in FIG. 9 or FIG. 13. The moving unit 602 is configured to perform the step of moving from the first communications system to the second communications system in step 301 in FIG. 9 or FIG. 13. The receiving unit 603 is configured to perform step 302 in FIG. 9 or FIG. 13. The determining unit 604 is configured to perform step 303 in FIG. 9 or FIG. 13. The user equipment 600 further includes a sending unit 605 and/or a deletion unit 606. The sending unit 605 is configured to perform the step of sending the first EPS bearer status information to the second core network device, or the step of sending the first QoS flow status information to the second core network device. The deletion unit 606 is configured to perform step 304 in FIG. 13. All related content of the steps involved in the foregoing method embodiments may be cited in function descriptions of corresponding function modules, and details are not described herein again.

In hardware implementation, the determining unit 604 and the deletion unit 606 may be processors, the receiving unit 603 may be a receiver, and the sending unit 605 may be a transmitter. The transmitter and the receiver may form a communications interface.

Figure 21:
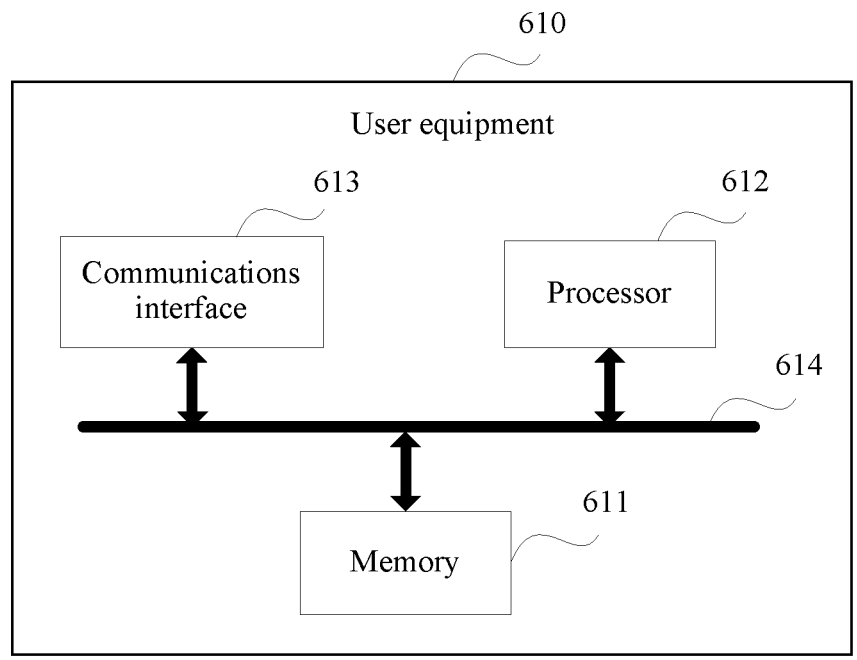
FIG. 21 is a schematic structural diagram of another user equipment according to an embodiment of this application.

FIG. 21 is a possible schematic logical structure diagram of user equipment 610 involved in the foregoing embodiment according to an embodiment of this application. The user equipment 610 includes a processor 612, a communications interface 613, a memory 611, and a bus 614. The processor 612, the communications interface 613, and the memory 611 are connected to each other using the bus 614. In this embodiment of this application, the processor 612 is configured to control and manage an action of the user equipment 610. For example, the processor 612 is configured to perform step 303 in FIG. 9 or FIG. 13, step 304 in FIG. 13, and/or another process of the technology described in this specification. The communications interface 613 is configured to support communication of the user equipment 610. The memory 611 is configured to store program code and data of the user equipment 610.

The processor 612 may be a central processing unit, a general-purpose processor, a digital signal processor, an application-specific integrated circuit, a field programmable gate array or another programmable logic device, a transistor logic device, a hardware component, or any combination thereof. The processor 612 may implement or execute various example logical blocks, modules, and circuits described with reference to content disclosed in this application. Alternatively, the processor may be a combination for implementing a computing function, for example, a combination of one or more microprocessors, or a combination of a digital signal processor and a microprocessor. The bus 614 may be a PCI bus or an EISA bus. The bus may be classified into an address bus, a data bus, a control bus, and the like. For ease of representation, only one thick line is used in FIG. 21 to represent the bus, but it does not indicate that there is only one bus or one type of bus.

Figure 22:
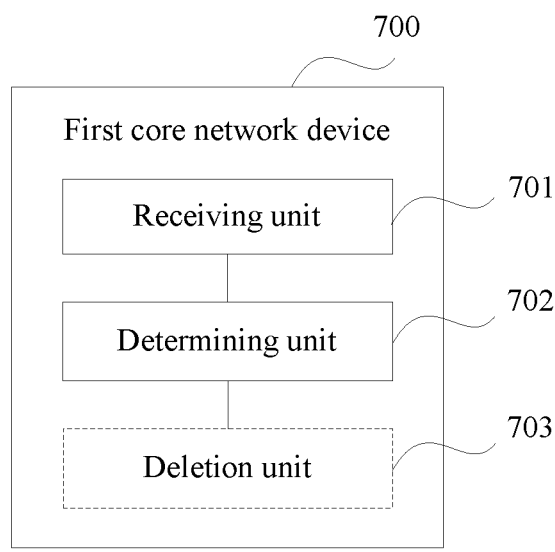
FIG. 22 is a schematic structural diagram of a first core network device according to an embodiment of this application.

When each function module is obtained through division for each function, FIG. 22 is a possible schematic structural diagram of a first core network device involved in the foregoing embodiments. A first core network device 700 includes a receiving unit 701 and a determining unit 702. The receiving unit 701 is configured to perform the step of receiving, when the UE moves from the first communications system to the second communications system, the first information sent by the second core network device, or the step of receiving the second information sent by the second core network device. The determining unit is configured to determine the QoS flow status information used by the UE in the second communications system, and/or another process of the technology described in this specification. The first core network device 700 further includes a deletion unit 703, configured to delete a QoS flow that is in a QoS flow corresponding to an EPS bearer of a PDN connection and that is not in the QoS flow status information. All related content of the steps involved in the foregoing method embodiments may be cited in function descriptions of corresponding function modules, and details are not described herein again.

In hardware implementation, the determining unit 702 may be a processor, and the receiving unit 701 may be a receiver. The receiver and the transmitter may form a communications interface.

Figure 23:
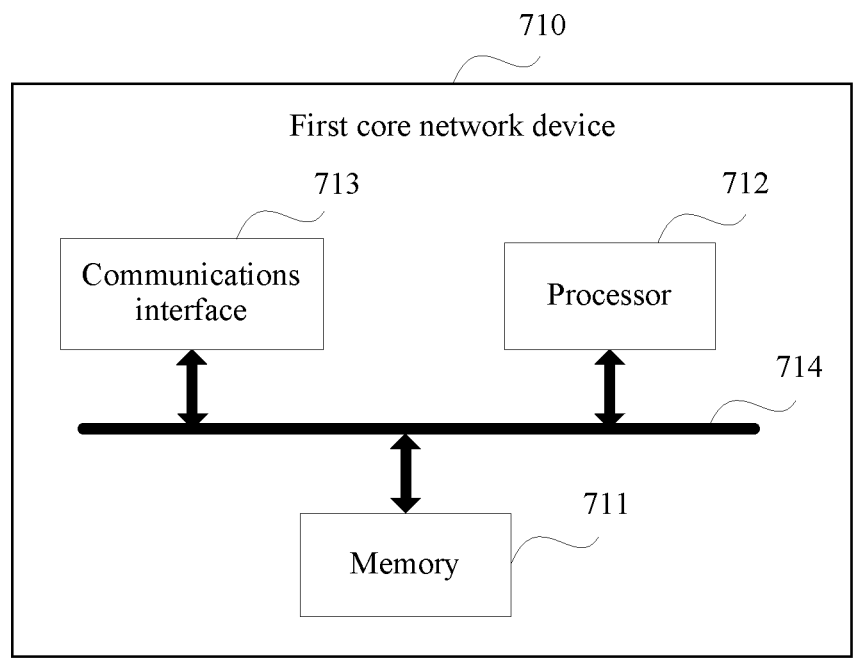
FIG. 23 is a schematic structural diagram of another first core network device according to an embodiment of this application.

FIG. 23 is a possible schematic logical structure diagram of a first core network device 710 involved in the foregoing embodiment according to an embodiment of this application. The first core network device 710 includes a processor 712, a communications interface 713, a memory 711, and a bus 714. The processor 712, the communications interface 713, and the memory 711 are connected to each other using the bus 714. In this embodiment of the application, the processor 712 is configured to control and manage an action of the first core network device 710. For example, the processor 712 is configured to determine the QoS flow status information used by the UE in the second communications system, and/or perform another process of the technology described in this specification. The communications interface 713 is configured to support communication of the first core network device 710. The memory 711 is configured to store program code and data of the first core network device 710.

The processor 712 may be a central processing unit, a general-purpose processor, a digital signal processor, an application-specific integrated circuit, a field programmable gate array or another programmable logic device, a transistor logic device, a hardware component, or any combination thereof. The processor 712 may implement or execute various example logical blocks, modules, and circuits described with reference to content disclosed in this application. Alternatively, the processor may be a combination for implementing a computing function, for example, a combination of one or more microprocessors, or a combination of a digital signal processor and a microprocessor. The bus 714 may be a PCI bus or an EISA bus. The bus may be classified into an address bus, a data bus, a control bus, and the like. For ease of representation, only one thick line is used in FIG. 23 to represent the bus, but it does not indicate that there is only one bus or one type of bus.

Figure 24:
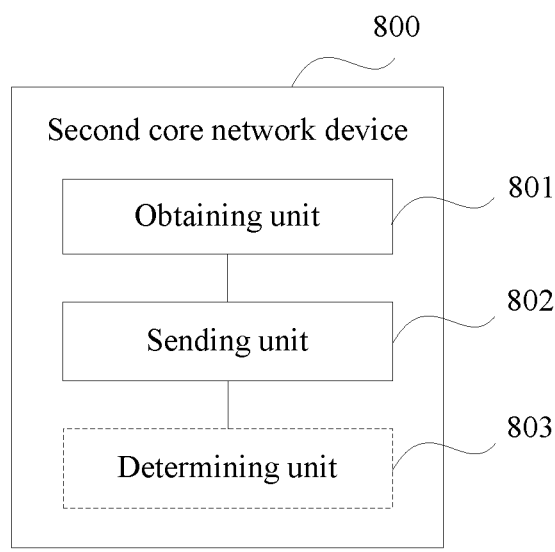
FIG. 24 is a schematic structural diagram of a second core network device according to an embodiment of this application.

When each function module is obtained through division for each function, FIG. 24 is a possible schematic structural diagram of a second core network device involved in the foregoing embodiments. A second core network device 800 includes an obtaining unit 801 and a sending unit 802. The obtaining unit 501 is configured to perform the step of obtaining the first QoS flow information, and/or another process described in this specification, and the sending unit 802 is configured to perform the step of sending the first QoS flow information to the UE, and/or another process described in this specification. The second core network device 800 further includes a determining unit 803, configured to perform the step of determining the third information based on the first EPS bearer status information and the PDN connection context, and/or another process described in this specification. All related content of the steps involved in the foregoing method embodiments may be cited in function descriptions of corresponding function modules, and details are not described herein again.

In hardware implementation, the determining unit 803 may be a processor, the obtaining unit 801 may be a receiver, and the sending unit 802 may be a transmitter. The transmitter and the receiver may form a communications interface.

Figure 25:
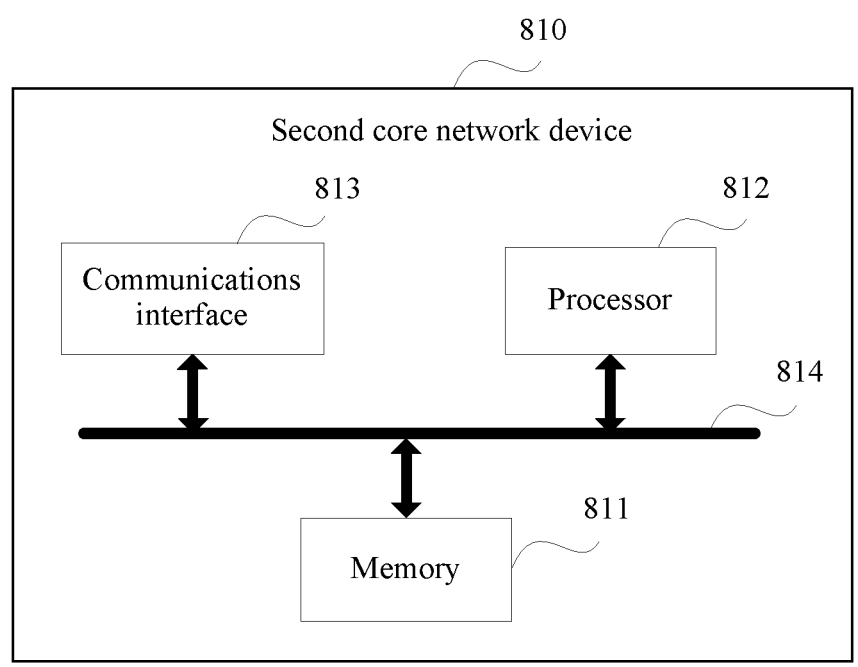
FIG. 25 is a schematic structural diagram of another second core network device according to an embodiment of this application.

FIG. 25 is a possible schematic logical structure diagram of a second core network device 810 involved in the foregoing embodiment according to an embodiment of this application. The second core network device 810 includes a processor 812, a communications interface 813, a memory 811, and a bus 814. The processor 812, the communications interface 813, and the memory 811 are connected to each other using the bus 814. In this embodiment of the application, the processor 812 is configured to control and manage an action of the second core network device 810. For example, the processor 812 is configured to perform the step of determining the third information based on the first EPS bearer status information and the PDN connection context, and/or perform another process of the technology described in this specification. The communications interface 813 is configured to support communication of the second core network device 810. The memory 811 is configured to store program code and data of the second core network device 810.

The processor 812 may be a central processing unit, a general-purpose processor, a digital signal processor, an application-specific integrated circuit, a field programmable gate array or another programmable logic device, a transistor logic device, a hardware component, or any combination thereof. The processor 812 may implement or execute various example logical blocks, modules, and circuits described with reference to content disclosed in this application. Alternatively, the processor may be a combination for implementing a computing function, for example, a combination of one or more microprocessors, or a combination of a digital signal processor and a microprocessor. The bus 814 may be a PCI bus or an EISA bus. The bus may be classified into an address bus, a data bus, a control bus, and the like. For ease of representation, only one thick line is used in FIG. 25 to represent the bus, but it does not indicate that there is only one bus or one type of bus.

In another embodiment of this application, a system is further provided. The system includes a UE, a first core network device, and a second core network device. The user equipment is the user equipment provided in FIG. 14 or FIG. 15, or the user equipment provided in FIG. 20 or FIG. 21; and/or the first core network device is the first core network device provided in FIG. 16 or FIG. 17, or the first core network device provided in FIG. 22 and FIG. 23; and/or the second core network device is the second core network device provided in FIG. 18 or FIG. 19, or the second core network device provided in FIG. 24 or FIG. 25.

In another embodiment of this application, a computer readable storage medium is further provided. The computer readable storage medium stores a computer execution instruction, and when at least one processor of the device executes the computer execution instruction, the device performs the method for moving between communications systems provided in FIG. 3, FIG. 4, or FIG. 8, or performs the method for moving between communications systems provided in FIG. 9 or FIG. 13.

In another embodiment of this application, a computer program product is provided. The computer program product includes a computer execution instruction, and the computer execution instruction is stored in a computer readable storage medium. At least one processor of the device may read the computer execution instruction from the computer readable storage medium, and the at least one processor executes the computer execution instruction, such that the device implements the method for moving between communications systems provided in FIG. 3, FIG. 4, or FIG. 8, or implements the method for moving between communications systems provided in FIG. 9 or FIG. 13.

In the embodiments of this application, when the UE establishes the PDN connection, the UE instructs, using the first information, the first core network entity to determine the first QoS flow information that is of the second communications system and that is corresponding to the first EPS bearer of the UE in the first communications system. Then, the first core network entity determines and stores the first QoS flow information, and sends the first QoS flow information to the UE using the first message. When the UE moves from the first communications system to the second communications system, the UE and the first core network entity may determine, based on the first QoS flow information, the QoS flow information used by the UE in the second communications system, such that when the UE moves from the first communications system to the second communications system, mapping between the first EPS bearer and the first QoS flow information is implemented, and active bearers are aligned, in order to ensure that the UE is seamlessly transferred to the second communications system.

Finally, it should be noted that the foregoing descriptions are merely example implementations of this application, but are not intended to limit the protection scope of this application. Any variation or replacement disclosed in this application shall fall within the protection scope of this application. Therefore, the protection scope of this application shall be subject to the protection scope of the claims.

The invention claimed is:
1. An apparatus comprising:
   one or more processors; and
   a memory coupled to the one or more processors and configured to store instructions that, when executed by the one or more processors, cause the apparatus to:

receive a first message indicating an establishment of a first evolved packet system (EPS) bearer or a modification of the first EPS bearer in a first communications system, wherein the first message comprises a quality of service (QOS) rule for a second communications system and a session aggregation maximum bit rate (AMBR) for the second communications system, wherein the QoS rule and the session AMBR correspond to the first EPS bearer, and wherein the first EPS bearer is a default bearer;

store the QoS rule and the session AMBR;

move from the first communications system to the second communications system; and determine, based on the session AMBR, a session AMBR used in the second communications system, and communicate with the second communications system by using the QOS rule.

2. The apparatus of claim 1, wherein the instructions, when executed by the one or more processors, cause the apparatus to store the QoS rule and the session AMBR by storing a correspondence between an EPS bearer context of the first EPS bearer, and the QoS rule and the session AMBR.

3. The apparatus of claim 1, wherein the instructions, when executed by the one or more processors, further cause the apparatus to send first information to a first core network entity in a process of establishing a packet data network (PDN) connection in the first communications system, and wherein the first information indicates that the PDN connection can be moved from the first communications system to the second communications system.

4. The apparatus of claim 1, wherein the QoS rule and the session AMBR are comprised in a protocol configuration option (PCO) field of the first message.

5. The apparatus of claim 1, wherein the QoS rule comprises at least one of a QoS rule identifier, a QoS flow identifier, a packet filter, or a precedence.

6. The apparatus of claim 1, wherein the first communications system is a fourth generation communications system, and wherein the second communications system is a fifth generation communications system.

7. The apparatus of claim 1, wherein the instructions, when executed by the one or more processors, cause the apparatus to move from the first communications system to the second communications system by receiving a handover command from a base station in the first communications system, and wherein the handover command comprises a QoS flow identifier and a session identifier.

8. The apparatus of claim 1, wherein the instructions, when executed by the one or more processors, cause the apparatus to receive the first message by receiving the first message from a session management function entity +control plane PDN gateway.

9. The apparatus of claim 1, wherein the first message further comprises at least one of a service and session continuity mode or a PDU session identifier.

10. The apparatus of claim 1, wherein the one or more processors are further configured to cause the apparatus to:

establish the first EPS bearer or the modification of the first EPS bearer in the first communication system; and receive, in response to establishing the first EPS bearer or the modification of the first EPS bearer in the first communication system, the first message.

11. A computer program product comprising instructions stored on a non-transitory computer-readable medium that, when executed by one or more processors, cause an apparatus to:

receive a first message indicating an establishment of a first evolved packet system (EPS) bearer or a modification of the first EPS bearer in a first communications system, wherein the first message comprises a quality of service (QOS) rule for a second communications system and a session aggregation maximum bit rate (AMBR) for the second communications system, wherein the QOS rule and the session AMBR correspond to the first EPS bearer, and wherein the first EPS bearer is a default bearer;

store the QoS rule and the session AMBR;

move from the first communications system to the second communications system; and determine, based on the session AMBR, a session AMBR used in the second communications system, and communicate with the second communications system by using the QoS rule.

12. The computer program product of claim 11, wherein the instructions, when executed by the one or more processors, cause the apparatus to store the QoS rule and the session AMBR by storing a correspondence between an EPS bearer context of the first EPS bearer, and the QoS rule and the session AMBR.

13. A method, comprising:

receiving a first message indicating an establishment of a first evolved packet system (EPS) bearer or a modification of the first EPS bearer in a first communications system, wherein the first message comprises a quality of service (QOS) rule for a second communications system and a session aggregation maximum bit rate (AMBR) for the second communications system, wherein the QoS rule and the session AMBR correspond to the first EPS bearer, and wherein the first EPS bearer is a default bearer;

storing the QoS rule and the session AMBR;

moving from the first communications system to the second communications system; and determining, based on the session AMBR, a session AMBR used in the second communications system, and communicating with the second communications system by using the QoS rule.

14. The method of claim 13, wherein storing the QoS rule and the session AMBR comprises storing a correspondence between an EPS bearer context of the first EPS bearer, and the QoS rule and the session AMBR.

15. The method of claim 13, wherein before receiving the first message, the method further comprises sending first information to a first core network entity in a process of establishing a packet data network (PDN) connection in the first communications system, and wherein the first information indicates that the PDN connection can be moved from the first communications system to the second communications system.

16. The method of claim 13, wherein the QoS rule and the session AMBR are comprised in a protocol configuration option (PCO) field of the first message.

17. The method of claim 13, wherein the QoS rule comprises at least one of a QoS rule identifier, a QOS flow identifier, a packet filter, or a precedence.

18. The method of claim 13, wherein the first communications system is a fourth generation communications system, and wherein the second communications system is a fifth generation communications system.

19. The method of claim 13, wherein moving from the first communications system to the second communications system comprises receiving a handover command from a base station in the first communications system, and wherein the handover command comprises a QoS flow identifier and a session identifier.

20. The method of claim 13, wherein receiving the first message comprises receiving the first message from a session management function entity+control plane PDN gateway.

21. The method of claim 13, wherein the first message further comprises at least one of a service and session continuity mode or a PDU session identifier.

* * * * *

UNITED STATES PATENT AND TRADEMARK OFFICE
CERTIFICATE OF CORRECTION

PATENT NO. : 12,114,219 B2
APPLICATION NO. : 17/328825
DATED : October 8, 2024
INVENTOR(S) : Hui Jin et al.

Page 1 of 1

It is certified that error appears in the above-identified patent and that said Letters Patent is hereby corrected as shown below:

On the Title Page

Page 3, item (56) References, Other Publications: "ZTE, "TS q23.502 P-CR to handover from EPS to NGS," S2-172154, SA WG2 Meeting #120, March 27-31, 2017, Busan, Korea, 4 pages." Should be included Signed and Sealed this
Nineteenth Day of November, 2024

Katherine Kelly Vidal
*Director of the United States Patent and Trademark Office*